(12) United States Patent
Iwanicki et al.

(10) Patent No.: US 9,665,304 B2
(45) Date of Patent: May 30, 2017

(54) STORAGE SYSTEM WITH FAST SNAPSHOT TREE SEARCH

(75) Inventors: Konrad Iwanicki, Warsaw (PL); Kamil Nowosad, Warsaw (PL)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 13/818,226

(22) PCT Filed: Sep. 3, 2012

(86) PCT No.: PCT/JP2012/005549
§ 371 (c)(1),
(2), (4) Date: Aug. 30, 2013

(87) PCT Pub. No.: WO2013/035295
PCT Pub. Date: Mar. 14, 2013

(65) Prior Publication Data
US 2014/0189270 A1    Jul. 3, 2014

Related U.S. Application Data

(60) Provisional application No. 61/531,966, filed on Sep. 7, 2011.

(51) Int. Cl.
*G06F 3/06* (2006.01)
*G06F 17/30* (2006.01)

(52) U.S. Cl.
CPC ............ *G06F 3/0641* (2013.01); *G06F 3/067* (2013.01); *G06F 3/0619* (2013.01);
(Continued)

(58) Field of Classification Search
CPC ......... G06F 17/30067; G06F 17/30088; G06F 17/30106
See application file for complete search history.

(56) References Cited

U.S. PATENT DOCUMENTS

| 5,778,368 | A | * | 7/1998 | Hogan | G06F 8/36 |
| 7,567,188 | B1 | * | 7/2009 | Anglin | G06F 3/0608 |
| | | | | | 341/63 |

(Continued)

FOREIGN PATENT DOCUMENTS

| CN | 101685468 A | 3/2010 |
| JP | 2005-235171 A | 9/2005 |

(Continued)

OTHER PUBLICATIONS

International Search Report of PCT/JP2012/005549, dated Oct. 2, 2012.

(Continued)

*Primary Examiner* — Charles Rones
*Assistant Examiner* — Tian-Pong Chang
(74) *Attorney, Agent, or Firm* — Sughrue Mion, PLLC

(57) ABSTRACT

A storage system of the present invention includes: a data writing means for storing actual data configuring storage data into a storage device and, for every update of the content of the storage data, newly storing; and a data specifying means for specifying the latest storage data among the same storage data stored in the storage device. The data writing means is configured to store actual data configuring storage data in association with update information whose value increases by 1 for every update. The data specifying means is configured to check whether update information whose value is $2^i$ (i represents an integer of 0 or more) exists in the storage device in increasing order of the value of i, and specify the largest value of the existing update information among values between the largest value of $2^i$ that corresponding update information exists and $2^{i+1}$.

9 Claims, 38 Drawing Sheets

(a)

(b)

(52) U.S. Cl.
CPC .... *G06F 17/3023* (2013.01); *G06F 17/30067* (2013.01); *G06F 17/30159* (2013.01); *G06F 17/30088* (2013.01); *G06F 17/30106* (2013.01)

(56) References Cited

U.S. PATENT DOCUMENTS

| | | | | |
|---|---|---|---|---|
| 7,849,057 | B1* | 12/2010 | Kazar | G06F 17/30088 707/637 |
| 8,412,688 | B1* | 4/2013 | Armangau | G06F 17/30088 707/690 |
| 2006/0041823 | A1* | 2/2006 | Wolfgang | G06F 11/2071 714/763 |
| 2008/0005141 | A1 | 1/2008 | Zheng et al. | |
| 2009/0006496 | A1* | 1/2009 | Shoens | G06F 17/3023 |
| 2009/0217091 | A1 | 8/2009 | Miyamoto et al. | |
| 2009/0248954 | A1 | 10/2009 | Hiraiwa et al. | |
| 2010/0064166 | A1 | 3/2010 | Dubnicki et al. | |
| 2010/0070698 | A1* | 3/2010 | Ungureanu | G06F 17/30067 711/108 |
| 2010/0179959 | A1* | 7/2010 | Shoens | G06F 17/30088 707/758 |
| 2010/0299494 | A1* | 11/2010 | Van Acht | G06F 12/0246 711/166 |

FOREIGN PATENT DOCUMENTS

| | | |
|---|---|---|
| JP | 2009-205201 A | 9/2009 |
| JP | 2009-230624 A | 10/2009 |
| JP | 2010-157204 A | 7/2010 |
| WO | 2008/005211 A2 | 1/2008 |

OTHER PUBLICATIONS

Communication dated Sep. 2, 2015 from the State Intellectual Property Office of the People's Republic of China in counterpart application No. 2012800434349.

* cited by examiner (a) single client-data block-tree of height 0 under construction
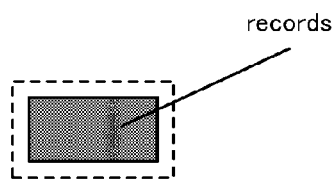
(b) tree of height 1 under construction
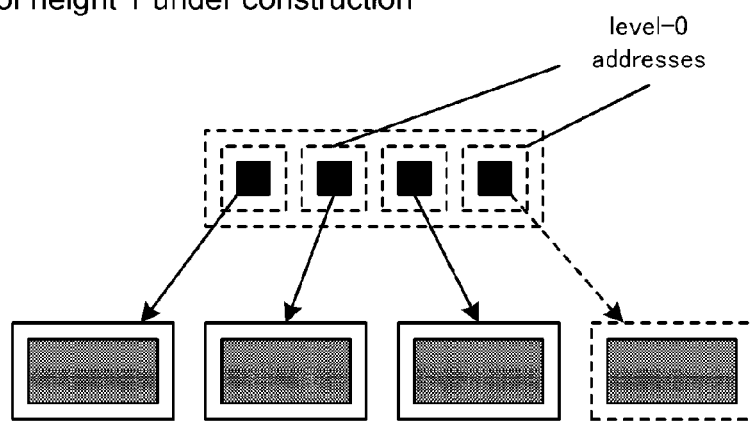
(c) tree of height 2 under construction (some client-data blocks skipped)
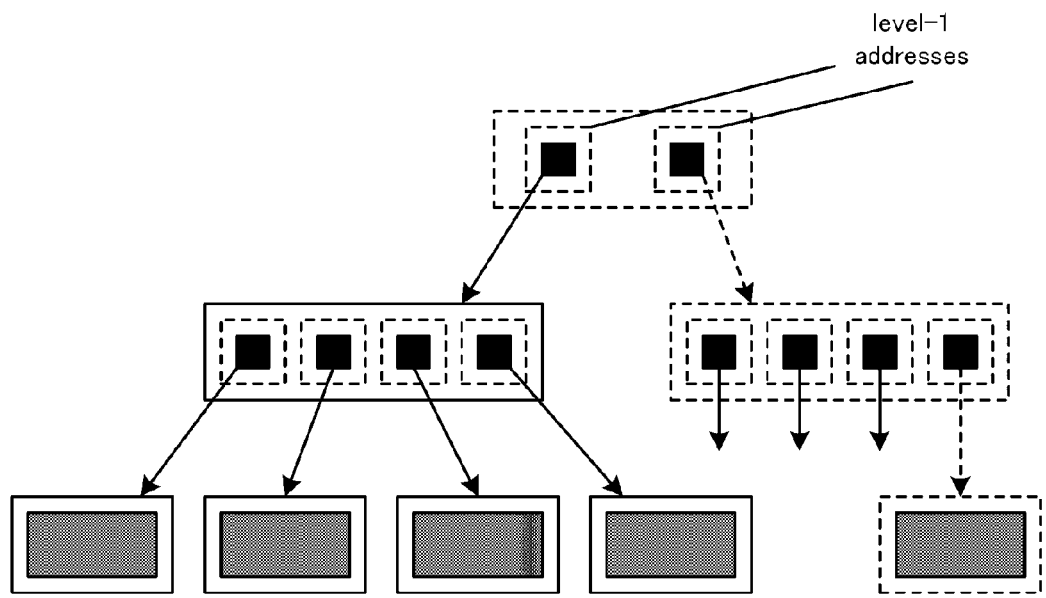
Fig. 14

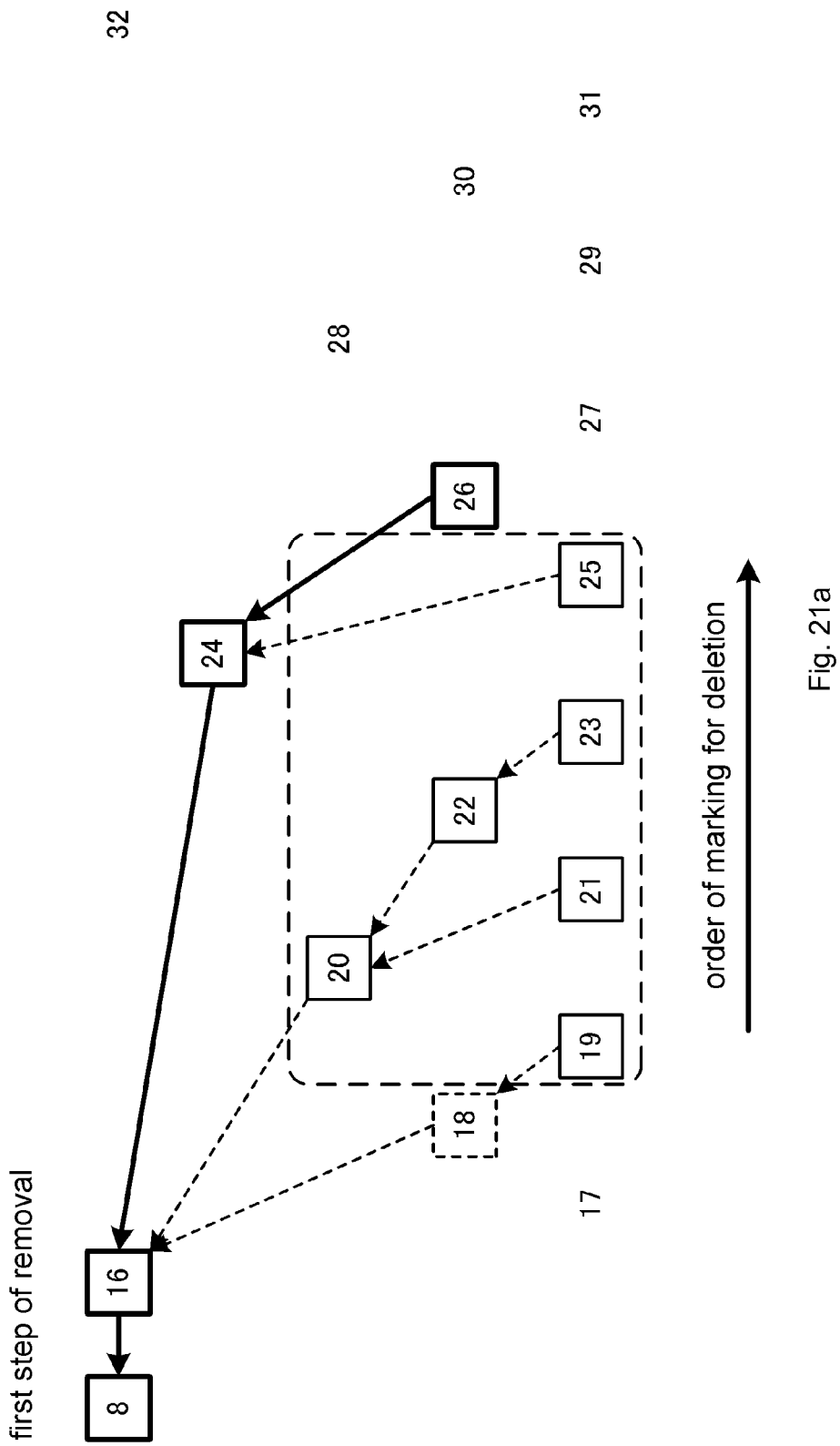

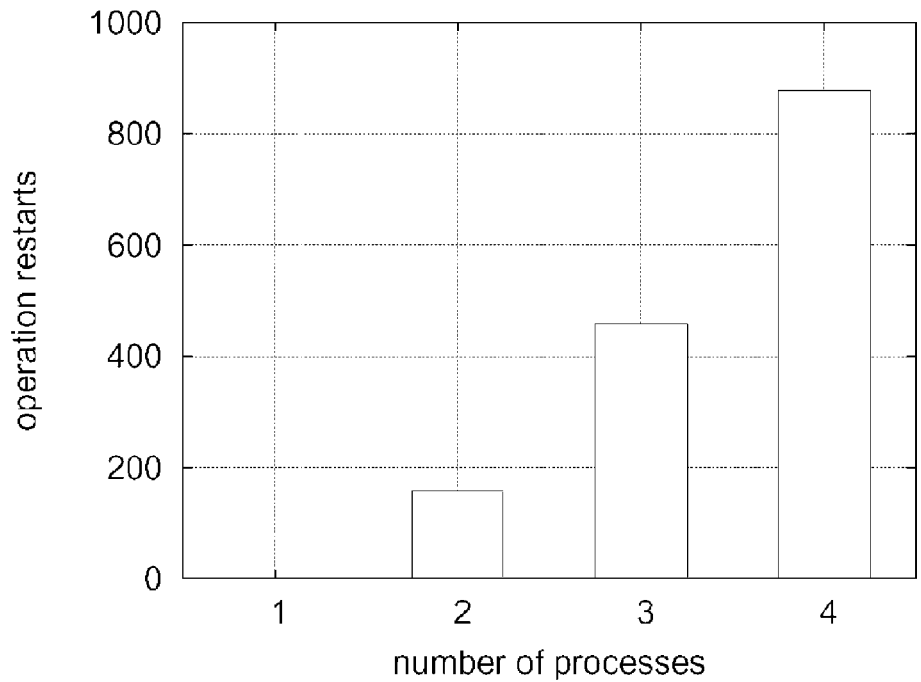
(a) Number of operation restarts
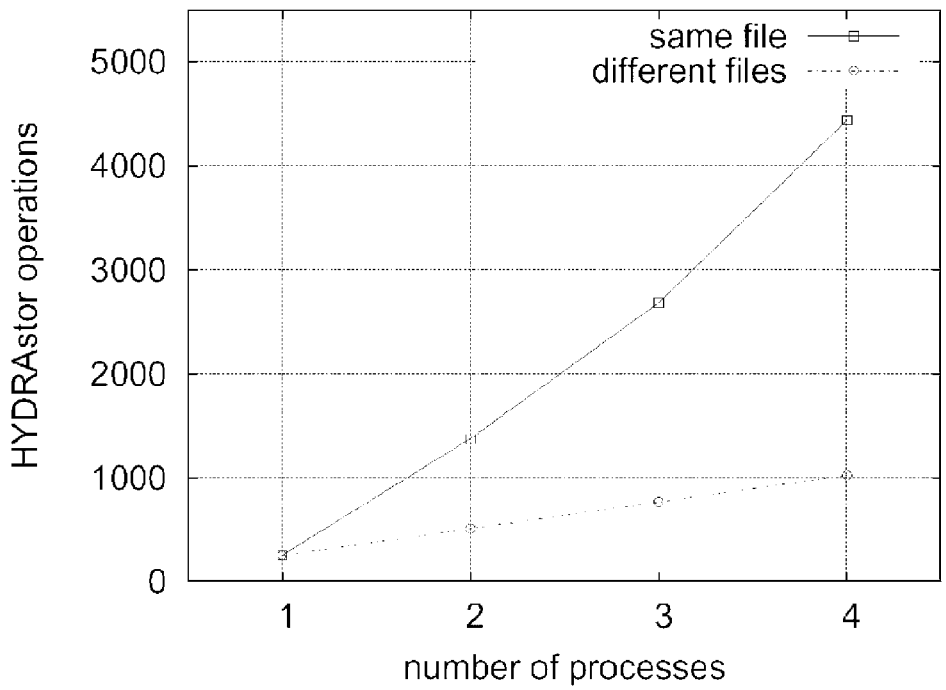
(b) Number of HYDRAstor operations
Fig. 29

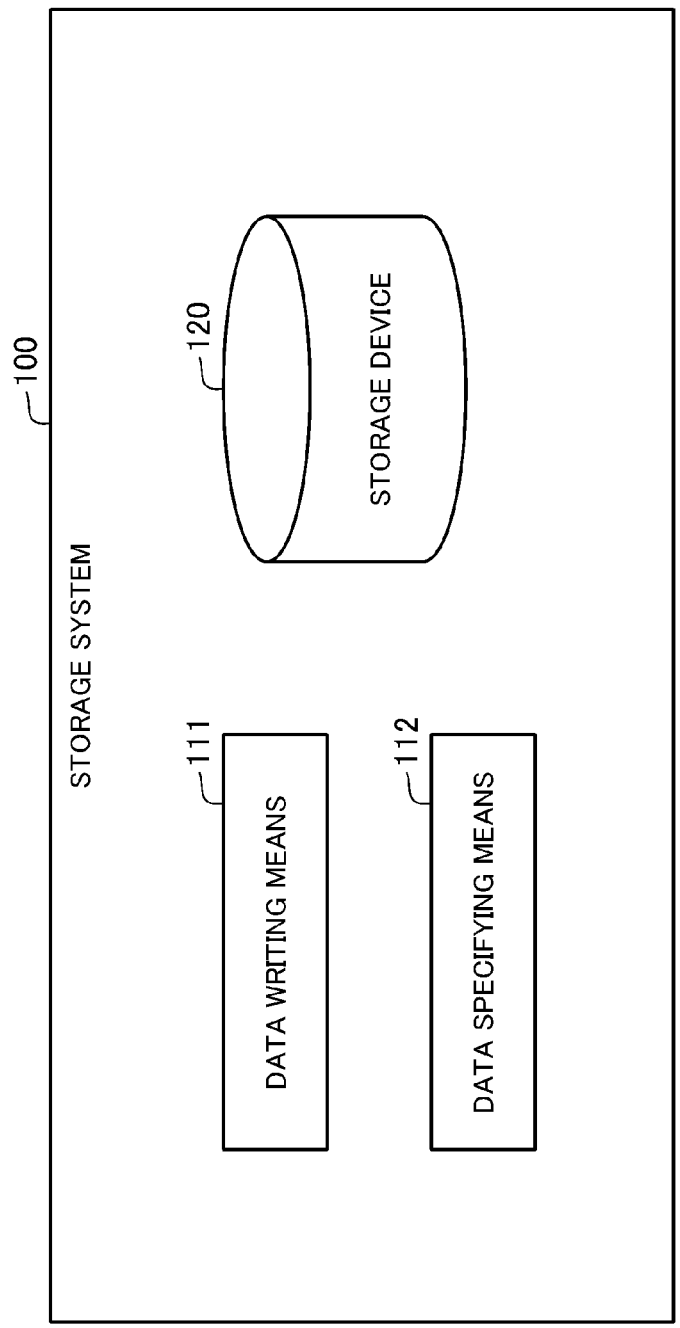

STORAGE SYSTEM WITH FAST SNAPSHOT TREE SEARCH

CROSS REFERENCE TO RELATED APPLICATIONS

This is a National Stage of International Application No. PCT/JP2012/005549 filed Sep. 3, 2012, claiming priority based on U.S. Provisional Patent Application No. 61/531,966 filed Sep. 7, 2011, the contents of all of which are incorporated herein by reference in their entirety.

TECHNICAL FIELD

The present invention relates to a storage system, more specifically, a storage system that eliminates duplicated storage of data of the same content.

BACKGROUND ART

In recent years, various kinds of information are digitalized with development and spread of computers. As a device for storing such digital data, there is a storage device such as a magnetic tape and a magnetic disk. Because the amount of data that should be stored increases day by day and reaches a huge amount, a mass storage system is required. Moreover, as well as reduction of the cost spent for a storage device, reliability is also required. In addition, it is also required that data can be easily retrieved later. As a result, a storage system that can automatically realize increase of storage capacity and performance, eliminates duplicated storage to reduce a storage cost and has high redundancy is desired.

Under such a circumstance, in recent years, as shown in PTL 1, a content-addressable storage system has been developed. This content-addressable storage system distributes and stores data into a plurality of storage devices and, by a unique content address specified depending on the content of the data, specifies a storage location where the data is stored. To be specific, a content-addressable storage system divides predetermined data into a plurality of fragments and adds a fragment as redundant data, and then stores these fragments into a plurality of storage devices, respectively.

Later, it is possible to designate a content address to retrieve data, namely, fragments stored in a storage location specified by the content address and restore the predetermined data before being divided from the fragments.

Further, for example, a hash value of data, which is generated so as to be unique depending on the content of data, is used as the content address. Therefore, in the case of duplicated data, it is possible to refer to data in the same storage location and acquire data of the same content. Consequently, it is unnecessary to store the duplicated data separately, and it is possible to eliminate duplicated recording and reduce the data capacity.

CITATION LIST

Patent Literature

PTL 1: Japanese Unexamined Patent Application Publication No. 2005-235171

SUMMARY OF INVENTION

Technical Problem

In the content-addressable storage system described above, when the content of stored data is changed, the data after change is newly written into the storage device, and a content address corresponding to the content of the newly written data is generated. By setting so as to refer to a storage location of the newly written data with this content address and, on the other hand, so as not to refer to a content address for the data before change, a process of storing the changed data is completed.

When accessing the data having been changed as described above, it is obviously necessary to access the latest data. Therefore, it is necessary to specify the latest data stored in the storage device. The data before change remain stored in the storage device and include data that will not be used afterward. Then, increase of the data that will not be used makes waste of storage capacity. Accordingly, there is a need to delete the data that will not be used from the storage device and, also in this case, it is necessary to specify the latest data.

However, in the case of frequently updated data, old data before change reaches a huge amount, and it may take time to execute a process of specifying the latest data. Then, there arises a problem that a writing process and a reading process may delay. In particular, a plurality of upper hosts and applications execute management of written data and control writing and reading of data independently from each other, it is difficult to manage the latest data, and a problem that it takes a time to specify.

Accordingly, an object of the present invention is to provide a storage system capable of improving that it takes time to specify the latest data.

Solution to Problem

A storage system of an exemplary embodiment of the present invention includes:

a data writing means for storing actual data configuring storage data to be written into a storage device and, every time a content of the storage data is updated, newly storing actual data configuring the updated storage data into the storage device; and a data specifying means for specifying latest storage data among same storage data stored in the storage device, wherein:

the data writing means is configured to store actual data configuring the storage data into the storage device in association with update information whose value increases by 1 every time the storage data is updated; and the data specifying means is configured to check whether the update information whose value is $2^i$ (i represents an integer equal to or more than 0) exists in the storage device in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data.

Further, a program of another exemplary embodiment of the present invention is a program including instructions for causing an information processing device to realize:

a data writing means for storing actual data configuring storage data to be written into a storage device and, every time a content of the storage data is updated, newly storing actual data configuring the updated storage data into the storage device; and a data specifying means for specifying latest storage data among same storage data stored in the storage device, wherein:

the data writing means is configured to store actual data configuring the storage data into the storage device in association with update information whose value increases by 1 every time the storage data is updated; and the data specifying means is configured to check whether the update information whose value is $2^i$ (i represents an integer equal to or more than 0) exists in the storage device in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data.

Further, an information processing method of another exemplary embodiment of the present invention includes:

storing actual data configuring storage data to be written into a storage device and, every time a content of the storage data is updated, newly storing actual data configuring the updated storage data and writing the data into the storage device, and at this moment, storing the actual data configuring the storage data into the storage device in association with update information whose value increases by 1 every time the storage data is updated; and when specifying latest storage data among same storage data stored in the storage device, checking whether the update information whose value is $2^i$ (i represents an integer equal to or more than 0) exists in the storage device in an increasing order of a value of i, specifying a largest value of the existing update information from among values between a largest value of $2^i$ that the corresponding update information exists and a value of $2^{i+1}$, and specifying storage data configured by actual data associated with the largest value of the update information, as the latest storage data.

Advantageous Effects of Invention

The present invention is thus configured, and therefore, can provide a storage system capable of shortening a time for a process of specifying latest data.

BRIEF DESCRIPTION OF DRAWINGS

FIG. 14 is a view referred to in the report explained in the second exemplary embodiment of the present invention;

FIG. 21a is a view referred to in the report explained in the second exemplary embodiment of the present invention;

FIG. 29 is a view referred to in the report explained in the second exemplary embodiment of the present invention;

FIG. 31 is a block diagram showing a configuration of a storage system in supplementary note 1 of the present invention.

DESCRIPTION OF EMBODIMENTS

First Exemplary Embodiment

Figure 1:
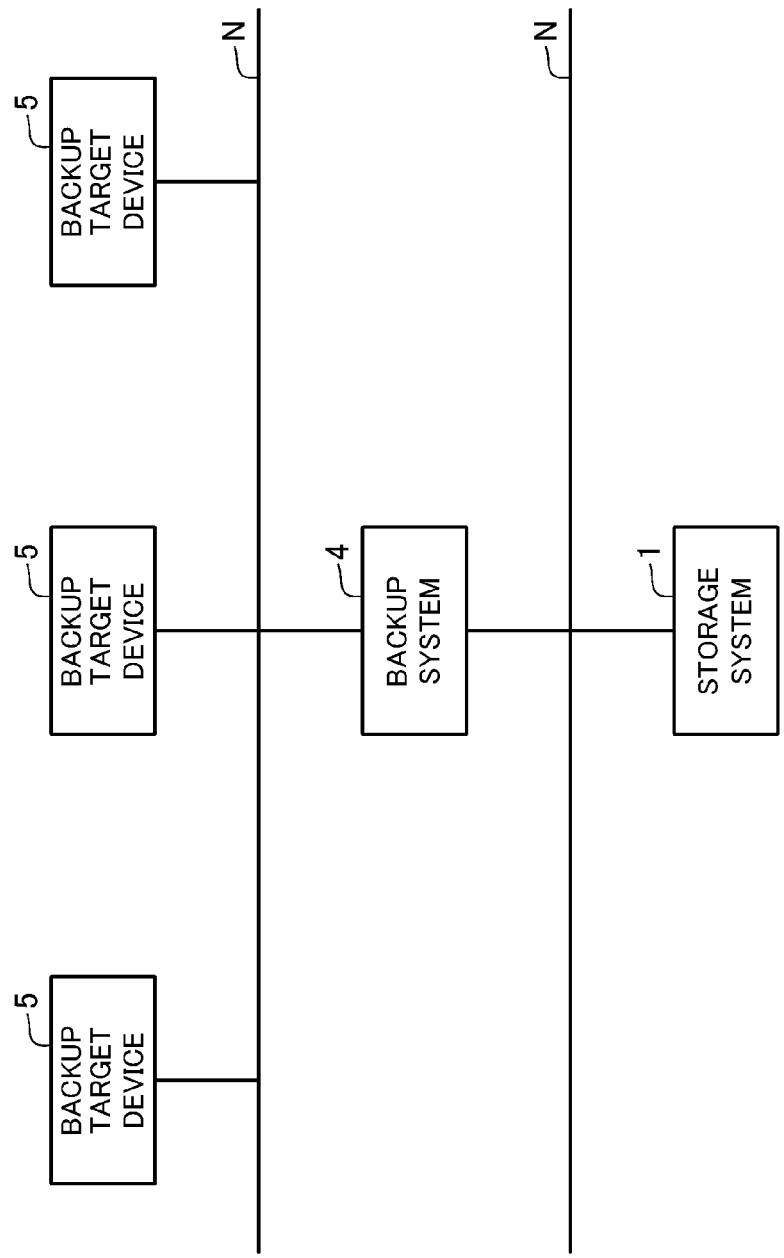
FIG. 1 is a block diagram showing a configuration of a whole system including a storage system according to a first exemplary embodiment of the present invention.
Figure 2:
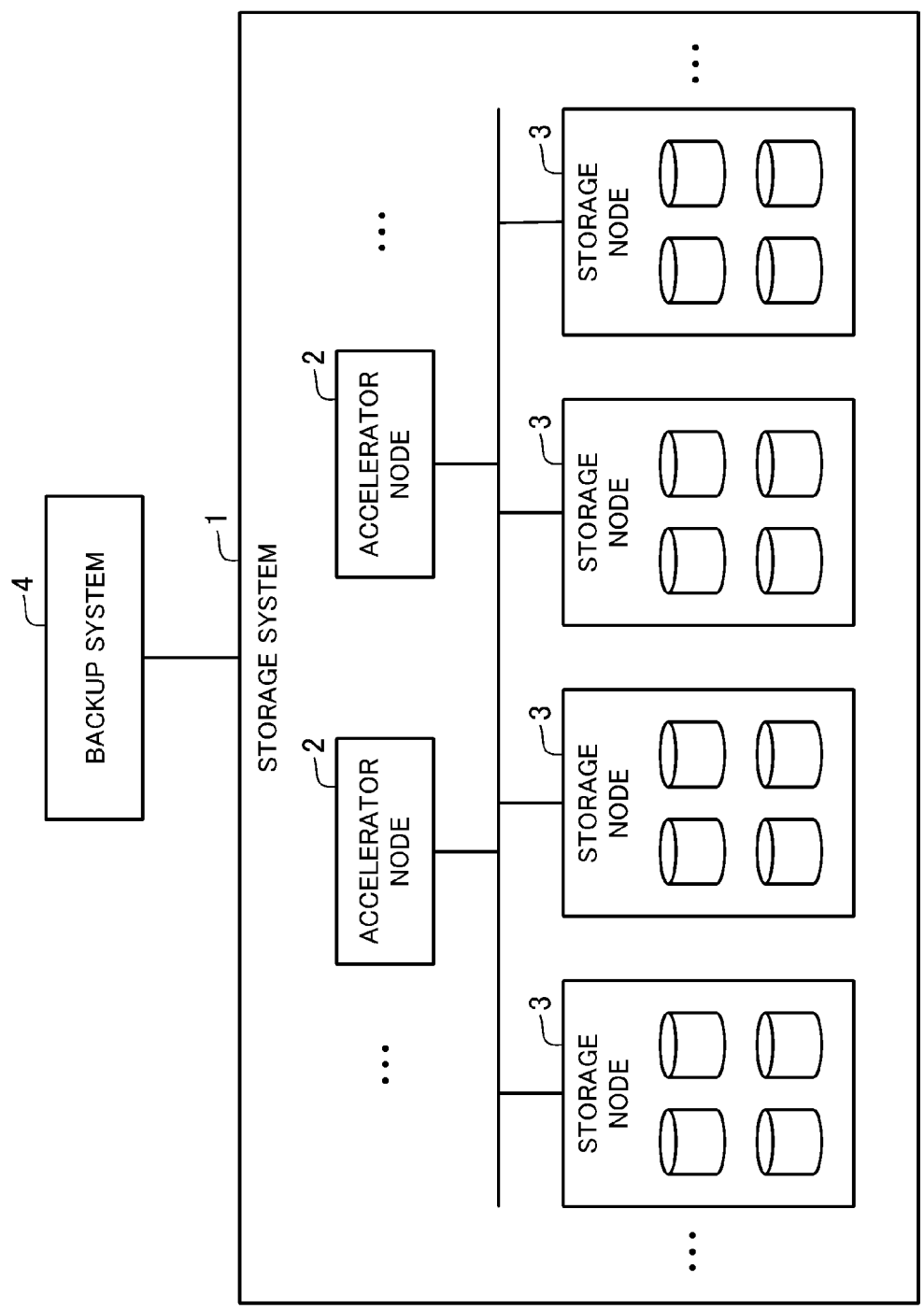
FIG. 2 is a block diagram showing an outline of a configuration of the storage system according to the first exemplary embodiment of the present invention.
Figure 3:
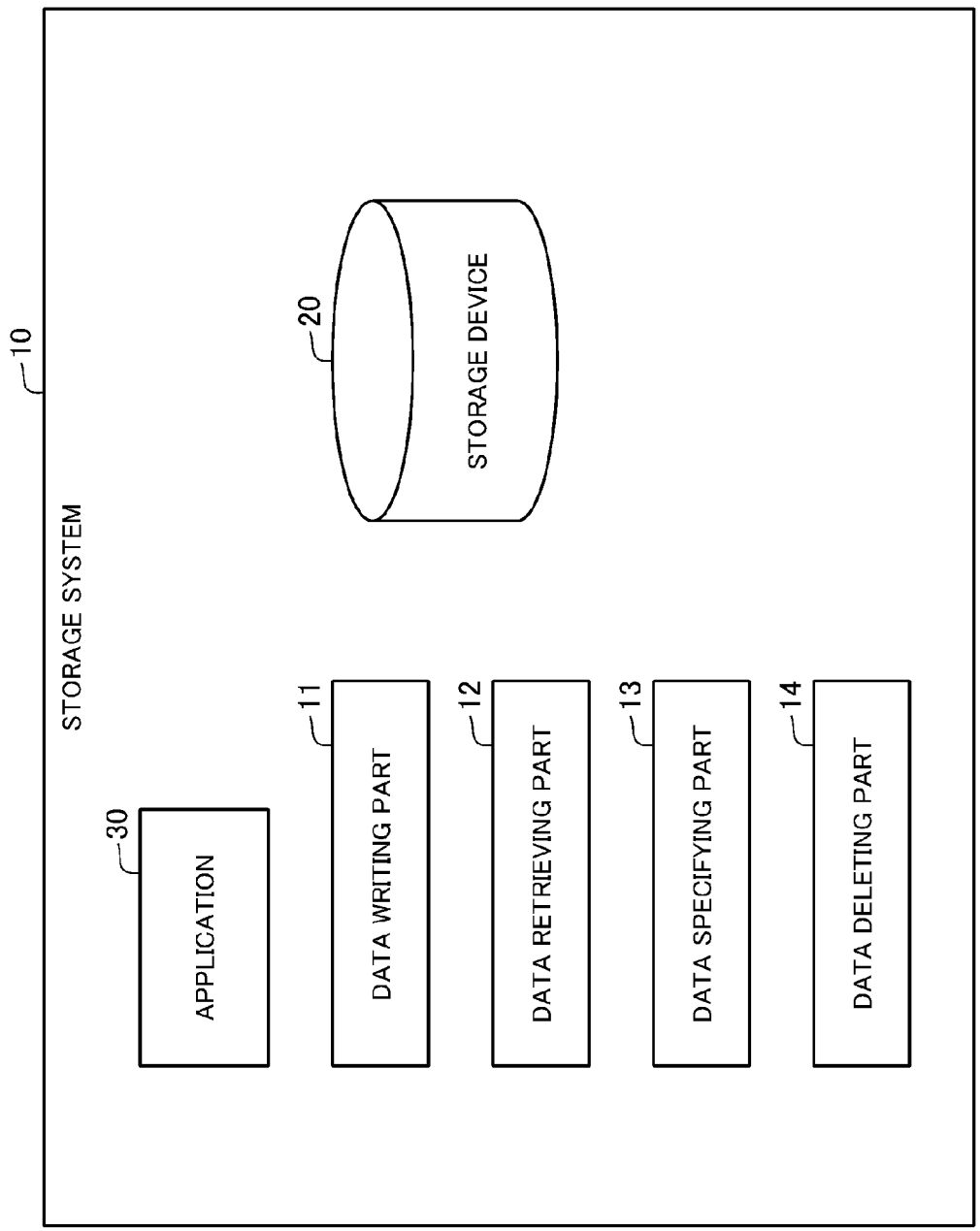
FIG. 3 is a function block diagram showing the configuration of the storage system according to the first exemplary embodiment of the present invention.
Figure 4:
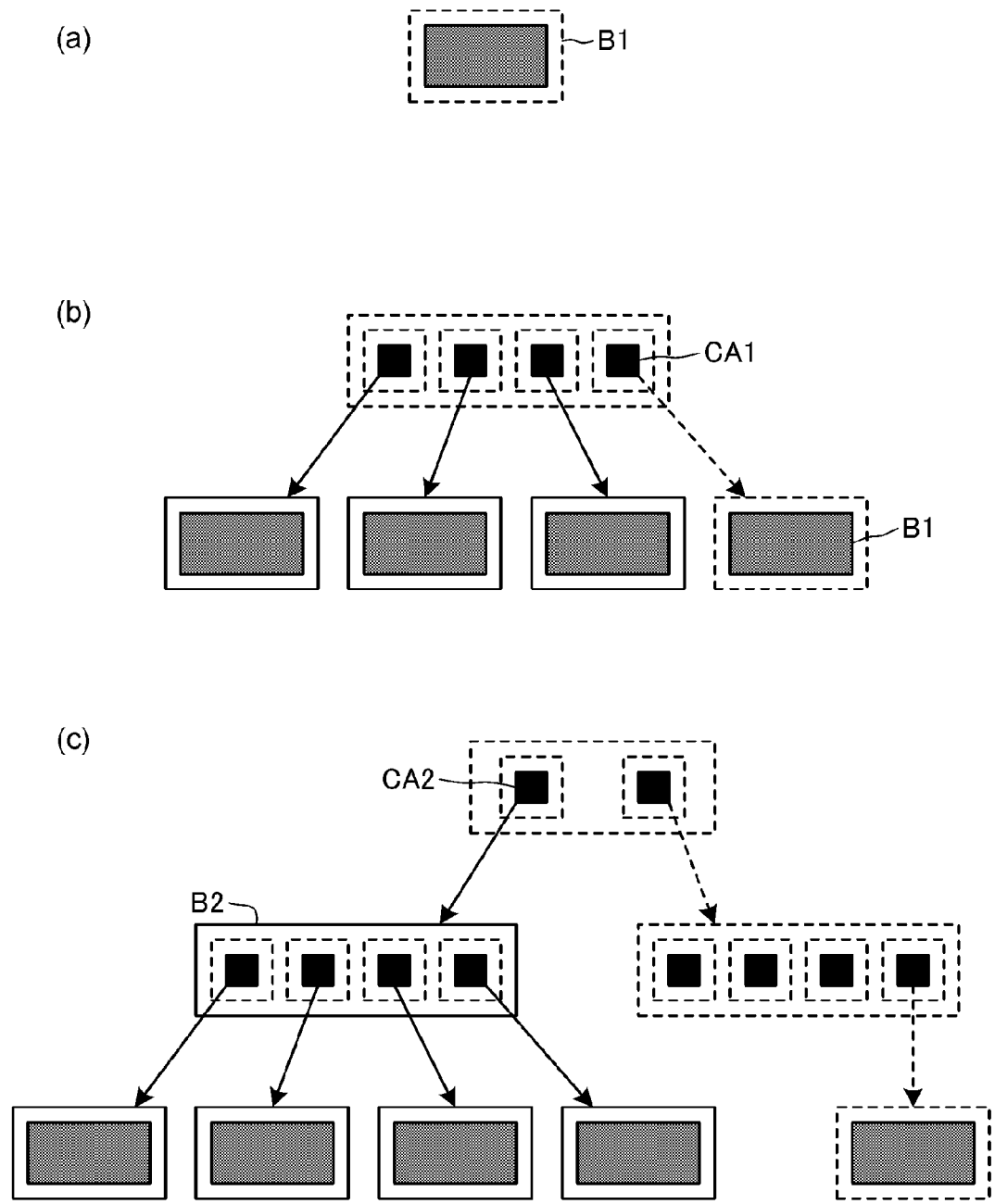
FIGS. 4(a), (b) and (c) are explanation views for explaining an aspect of a data write process in the storage system disclosed in FIG. 3.
Figure 5:
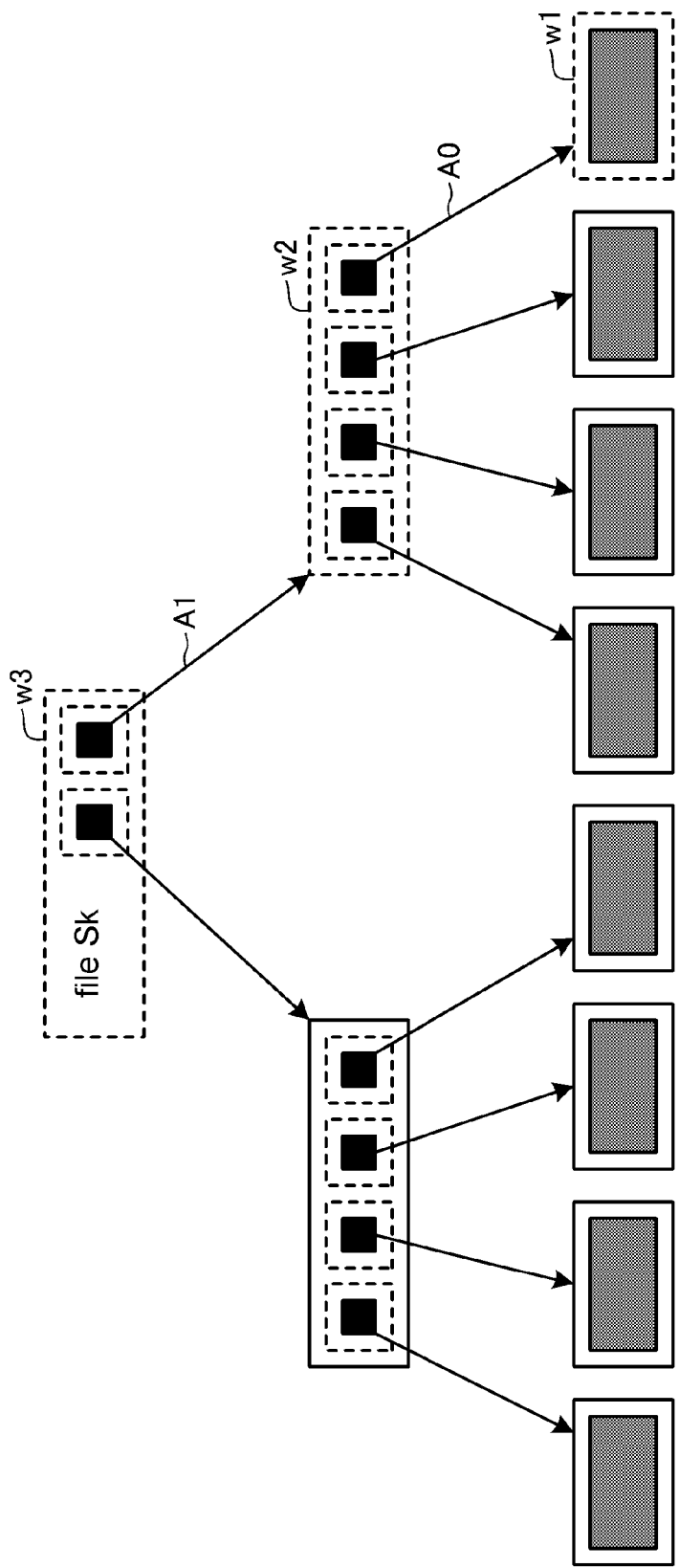
FIG. 5 is an explanation view for explaining an aspect of the data write process in the storage system disclosed in FIG. 3.
Figure 6:
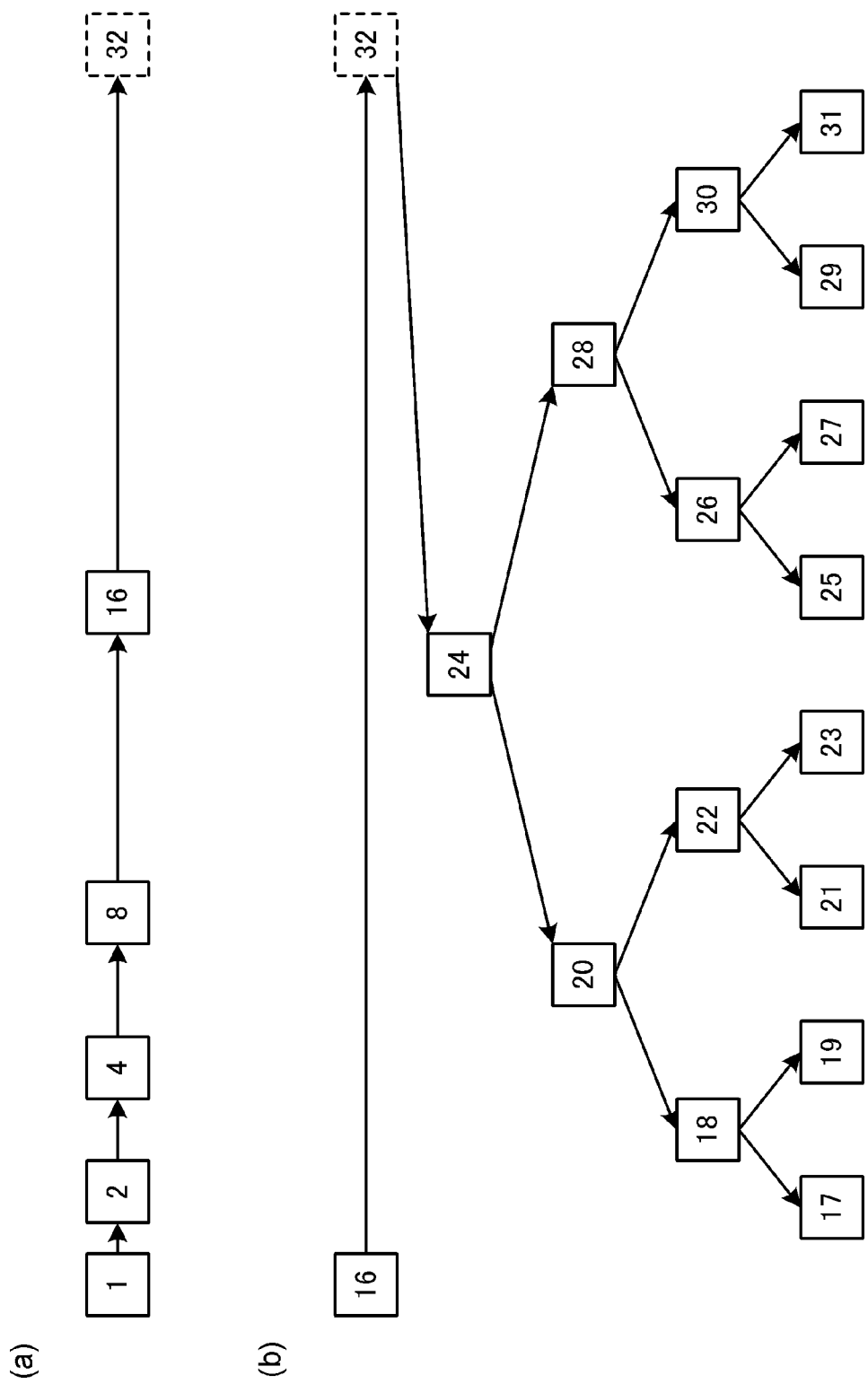
FIGS. 6(a) and (b) are explanation views for explaining an aspect of a data search process in the storage system disclosed in FIG. 3.

A first exemplary embodiment of the present invention will be described with reference to FIGS. 1 to 11. FIG. 1 is a block diagram showing a configuration of a whole system. FIG. 2 is a block diagram showing an outline of the storage system, and FIG. 3 is a function block diagram showing a configuration of the storage system. FIGS. 4 and 5 are explanation views for explaining a data write process in the storage system. FIGS. 6 to 11 are explanation views for explaining an aspect of a data search process in the storage system.

This exemplary embodiment shows a specific example of a storage system and the like disclosed in Supplementary Notes described later. Below, a description will be made assuming the storage system is configured by connecting a plurality of server computers. However, the storage system in the present invention is not limited to be configured by a plurality of computers, and may be configured by one computer.

As shown in FIG. 1, a storage system 1 according to the present invention is connected to a backup system 4 that controls a backup process via a network N. The backup system 4 acquires backup target data (data to be written) stored in a backup target device 5 connected via the network N, and requests the storage system 1 to store the data. Consequently, the storage system 1 stores the backup target data requested to be stored, as a backup.

As shown in FIG. 2, the storage system 1 in this exemplary embodiment employs a configuration in which a plurality of server computers are connected. To be specific, the storage system 1 includes an accelerator node 2 that is a server computer controlling a storage reproduction operation in the storage system 1, and a storage node 3 that is a server computer equipped with a storage device for storing data. The number of the accelerator node 2 and the number of the storage node 3 are not limited to those shown in FIG. 2, and the system may be configured by connecting more nodes 2 and more nodes 3.

The accelerator node 2 in this exemplary embodiment is equipped with a plurality of applications each executing a data recording and reproducing process independently. That is to say, one application operates a process of retrieving data stored in the storage node 3 and an update process of changing and writing the retrieved data, regardless of an operation of another application.

Furthermore, the storage system 1 in this exemplary embodiment is a content-addressable storage system that divides data and makes the data redundant to distribute and store the data into a plurality of storage devices and, by a unique content address set depending on the content of the stored data, specifies a storage location in which the data is stored. This content-addressable storage system will be described in detail later.

Below, assuming the storage system 1 is one system, a configuration and a function of the storage system 1 will be described. That is to say, the configuration and the function of the storage system 1 described below may be included in either the accelerator node 2 or the storage node 3. The storage system 1 is not necessarily limited to being equipped with the accelerator node 2 and the storage node 3 as shown in FIG. 2, and may have any configuration. For example, the storage system 1 may be configured by one computer. Besides, the storage system 1 is not limited to a content-addressable storage system, and may be any storage system as far as it has a deduplication function.

FIG. 3 shows a configuration of the storage system 1 in this exemplary embodiment. As shown in this figure, the storage system 1 is configured by server computers, and includes the abovementioned applications 30 and a storage device 20. Moreover, the storage system 1 includes a data writing part 11, a data retrieving part 12, a data specifying part 13 and a data deleting part 14, which are structured by installation of a program into a computer configuring the storage system 1. Then, the storage system 1, in response to a request from the application 30, executes a writing process including update of data and a retrieving process on the storage device 20

A data writing process by the data writing part 11 will be described in detail. When accepting a request for writing predetermined data, for example, one file having a predetermined capacity from the application 30, the data writing part 11 firstly divides the file into a plurality of blocks B1 that are a plurality of actual data of predetermined capacity based on the characteristic of a content-addressable storage system. Then, the data writing part 11 temporarily stores the block B1 into a memory in the storage system 1 as shown in FIG. 4(a). When the size in the memory exceeds a certain size, the block B1 in the memory is written into a predetermined region in the storage device 20 as shown in FIG. 4(b). Then, because a content address CA1 corresponding to the content of the block B1, which is data (reference data) specifying and referring to a storing location of the block B1, is returned in response to the writing, the data writing part 11 temporarily stores this content address CA1 into the memory. This address will be referred to as "level-0 address" CA1.

After that, writing of the block B1 (actual data) described above is continued and, when some "level-0 addresses" CA1 are gathered, an intermediate block B2 including the content addresses CA1 is written into a predetermined region in the storage device 20 as shown in FIG. 4(c). Then, in accordance with the data content of the intermediate block B2, a content address CA2 specifying and referring to a storing location of the intermediate block B2 is stored as a "level-1 address" CA2 as shown in FIG. 4(c). Finally, the file requested to be written is stored in a three-level tree structure into the storage device 20 as shown in FIG. 5.

When storing a file in a three-level tree structure into the storage device 20 as described above, the data writing part 11 executes a commit so that the application 30 can access the file. By this commit, the application 30 can access the top layer, and a route from the top layer to actual data of the bottom layer is formed, that is, a snapshot tree is configured. For example, at the time of execution of a commit of a snapshot tree as shown in FIG. 5, firstly, a block configuring part of a file is written with reference numeral W1 and, after the writing is finished, a "level-0 address" referring to a storage location of the block is provided (arrow A0). After that, a "level-1 address" referring to a storage location of a plurality of "level-0 addresses" is written with reference numeral W2 (arrow A1). Finally, a retention route as a route to the "level-1 address" is written with reference numeral W3.

At this moment, a search key "file Sk" specifying this snapshot, namely, this file is included in the retention route of the top layer. The search key "file Sk" includes file specification information (data specification information) specifying the same file and version information (update information) representing the version of the file.

Furthermore, when changing, updating and storing the content of a file, the data writing part 11 newly stores a block corresponding to changed actual data into the storage device 20. On the other hand, when storing a block already stored in the storage device 20 as actual data of the file after update, the data writing part 11 does not newly store the actual data, and refers to the content address CA1 of the already stored block and uses the existing block referred to with the content address CA1 as actual data to be newly stored. Consequently, duplicate storage of a block (actual data) of the same content is prevented.

As described above, when a file is updated, a block as changed actual data is newly stored, and a content address CA1 referring to the block is newly stored. Therefore, a "level-0 address" stored in an intermediate block described above is changed, a "level-1 address" including a content address of this intermediate block is also changed, and a snapshot is newly created. That is to say, every time a file is updated, the data writing part 11 creates a snapshot corresponding to each update version of the file.

Therefore, every time creating a snapshot, the data writing part 11 generates a "search key" described above included in a retention route accessing the snapshot. At this moment, file specification information included in the "search key" is the same information when the file is the same, and version information is represented by a numerical value increasing by "1" every time the file is updated. For example, the "search key" is information that "S" as file specification information and a numerical value "1" or the like as version information are combined, and the "search key" is generated so that the version information portion increases by 1 from an initial value "1" in a manner of "$S_1$," "$S_2$," "$S_3$" ... "Sk" every time the file is updated.

Thus, in the storage system 1, when one file is updated plural times, a plurality of snapshots corresponding to old and new versions of the file are stored.

Further, the data retrieving part 12 retrieves the latest version of a file requested to be retrieved by the application 30, from the storage device 20 based on the abovementioned search key. At this moment, the data specifying part 13 refers to a value of version information of the "search key" and searches for the latest version of the file.

To be specific, firstly, for search keys including file specification information specifying the file requested to be retrieved, the data specifying part 13 checks whether a search key including version information of a value of "$2^i$" (i represents an integer equal to or more than 0) exists in the storage device 20, in an increasing order of a value of i. That is to say, by increasing the value of i in an order of "0," "1," "2," "3," "4" ..., the data specifying part 13 checks whether a search key including version information coincident with a value "1" "2," "4," "8," "16" ... that "$2^i$" takes exists.

Herein, for example, assuming version information "16" corresponding to i=4 exists but version information "32" corresponding to i=5 does not exist as shown in FIG. 6(a), the data specifying part 13 subsequently sets the largest value of $2^i$ of the existing version information as first version information (first update information), and sets the value of $2^{i+1}$ as second version information (second update information). In this case, the data specifying part 13 sets "16" as first version information, and sets "32" as second version information. Then, the data specifying part 13 calculates an intermediate value between the first version information "16" and the second version information "32" that have been set, and executes an update information search process of checking whether the intermediate value "24" exists as version information.

In a case that the intermediate value "24" exists, the data specifying part 13 executes an intermediate value replacement process of setting the intermediate value "24" as new first version information. Then, the data specifying part 13 calculates an intermediate value between the new first version information "24" and the second version information "32," and executes the "update information search process" of checking whether the intermediate value "28" exists as version information. On the other hand, in a case that the intermediate value "24" does not exist, the data specifying part 13 executes the "intermediate value replacement process" of setting the intermediate value "24" as new second version information. Then, the data specifying part 13 calculates an intermediate value between the first version information "16" and the new second version information "24," and executes the "update information search process" of checking whether the intermediate value "20" exists as version information.

By repeatedly executing the update information search process and the intermediate value replacement process that have been described above, the data specifying part 13 can specify the largest value of version information existing in the storage device 20 from among values between first version information and second version information having been set at first. For example, by following the values of version information as shown by arrows in FIG. 6(b), the data specifying part 13 can search the values of the respective version information.

Figure 7:
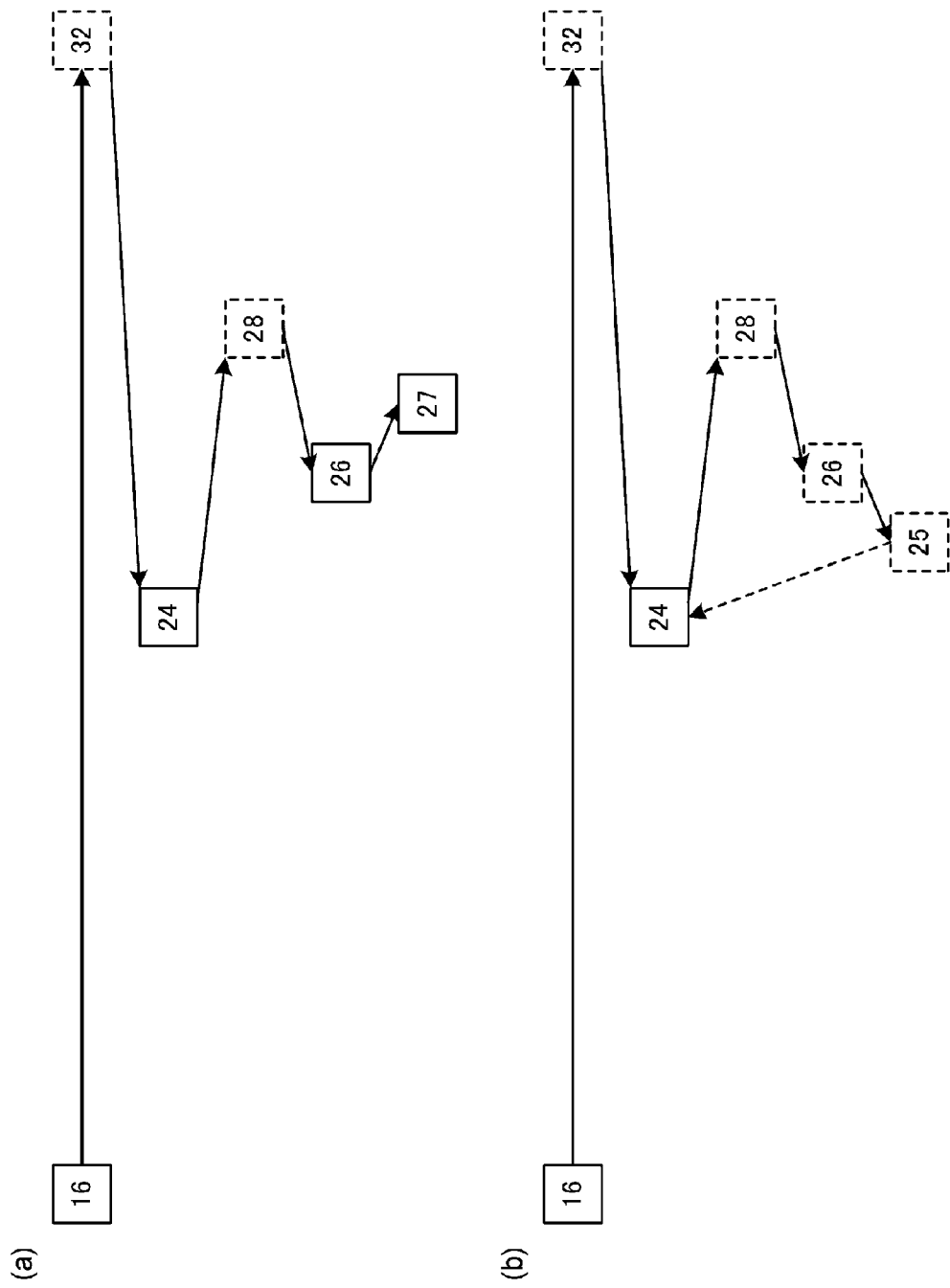
FIGS. 7(a) and (b) are explanation views for explaining an aspect of the data search process in the storage system disclosed in FIG. 3.

Herein, an example of the process of searching out the largest value of version information by the data specifying part 13 will be described with reference to FIG. 7. FIG. 7(a) shows a case that the largest value of version information is "27." In this figure, a value of version information inside a square drawn by a dotted line represents a value that does not exist in the storage device 20. In the example of FIG. 7(a), firstly, when searching values of $2^i$, the data specifying part 13 finds that "16" exists but "32" does not exist. Subsequently, the data specifying part 13 searches out an intermediate value "24" between "16" and "32," and because the intermediate value "24" exists, the data specifying part 13 searches out an intermediate value "28" between "24" and "32." At this moment, because "28" does not exist, the data specifying part 13 searches out an intermediate value "26" between "24" and "28." Because "26" exists, the data specifying part 13 searches out an intermediate value "27" between "26" and "28." Because "27" exists, the data specifying part 13 specifies "27" as the largest value of the version information.

Further, FIG. 7(b) shows a case that the largest value of version information is "24." In this example, firstly, by searching values of $2^i$, the data specifying part 13 finds that "16" exists but "32" does not exist. Subsequently, the data specifying part 13 searches out an intermediate value "24" between "16" and "32" and, because "24" exists, searches out an intermediate value "28" between "24" and "32." Because "28" does not exist, the data specifying part 13 searches out an intermediate value "26" between "24" and "28." Because "26" does not exist, the data specifying part 13 searches out an intermediate value "25" between "24" and "26." Because "25" does not exist, the data specifying part 13 specifies "24" existing in the end among the values having been followed, as the largest value of the version information.

By thus specifying the largest value of version information, it is possible to specify a snapshot corresponding to a search key of the specified value, as a snapshot of the latest version. Then, the data retrieving part 12 can retrieve a file configured by actual data that can be referred to from the specified snapshot of the latest version.

Further, the data deleting part 14 of the storage system 1 operates at any timing, and deletes a snapshot of an old version that is no more used among snapshots stored in the storage device 20. This data deleting part 14 is disposed for saving a storage capacity because data is newly stored one after another when a file is updated in the storage system 1 of content-addressable type according to the present invention.

The data specifying part 13 also executes a process of specifying a file of old version to be deleted by the data deleting part 14, that is, a snapshot of old version to be deleted. To be specific, firstly, the data specifying part 13 checks whether version information of a value of $2^i$ exists when specifying the largest value of version information as described above, and specifies the version information of a value of $2^i$ existing in the storage device as non-deletion target version information (non-deletion target update information).

Figure 8:
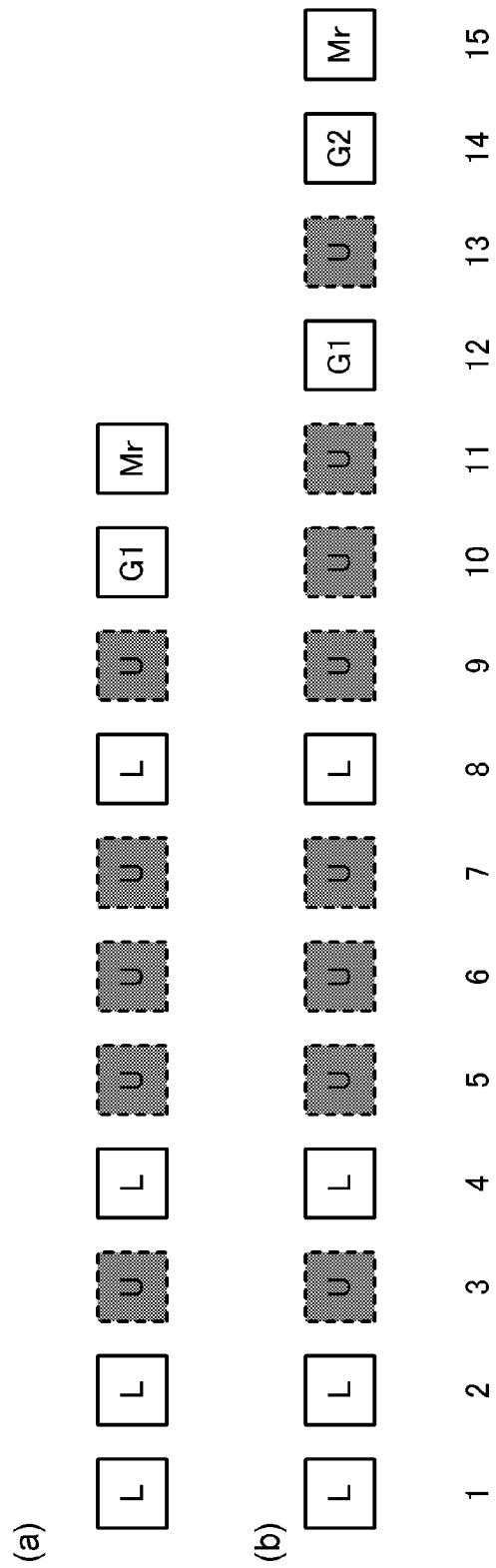
FIGS. 8(a) and (b) is an explanation view for explaining an aspect of the data search process in the storage system disclosed in FIG. 3.

An example of a process of specifying the non-deletion target version information will be described with reference to FIG. 8. FIG. 8(a) shows an example of a case that the largest value of version information is "11." In this case, $2^i$ takes values of "1," "2," "4," "8" in an increasing order, and version information of these values exist. Therefore, snapshots corresponding to the version information "1," "2," "4," "8" of these values are referred to as "Landmark snapshots," and are each provided with reference symbol L in FIG. 8(a). Moreover, in a case that the largest value of version information is searched out as described above, version information "11" is finally searched out as the largest value after following intermediate values "12" and "10." Because "10" among the intermediate values "12" and "10" exists, a snapshot corresponding to the version information "10" is considered as a "Guiding snapshot" and is provided with reference symbol G1 in FIG. 8(a). Moreover, the data specifying part 13 refers to a snapshot of "11" of the largest value of version information as "The most recent snapshot," and provides with reference symbol Mr in FIG. 8(a).

The data specifying part 13 specifies the version information "1," "2," "4," "8" "10," "11" corresponding to "Landmark snapshots," "Guiding snapshot," "The most recent snapshot" specified as described above, as the non-deletion target version information. On the other hand, the data specifying part 13 refers to snapshots corresponding to the other version information "3," "5," "6," "7," "9" as "Uninteresting snapshots," and provides each with reference symbol U in FIG. 8(a).

An example of FIG. 8(b) in which the largest value of version information is "15" will be described as well. In this case, firstly, snapshots corresponding to version information "1," "2," "4," "8" are referred to as "Landmark snapshots," and are each provided with reference symbol L. Moreover, snapshots corresponding to intermediate values "12" and "14" followed when the largest value of the version information is searched out as described above are referred to as "Guiding snapshots," and are provided with reference symbols G1, G2, respectively. Furthermore, a snapshot of "15" that is the largest value of the version information is referred to as "The most recent snapshot," and is provided with reference symbol Mr. Consequently, the version information "1," "2," "4," "8," "12," "14," "15" corresponding to "Landmark snapshots," "Guiding snapshots," "The most recent snapshot" are specified as the non-deletion target version information. On the other hand, snapshots corresponding to the other version information "3," "5," "6," "7,"  "9," "10," "11" are referred to as "Uninteresting snapshots," and are each provided with reference symbol U.

The data specifying part 13 informs the thus specified non-deletion target version information to the data deleting part 14. Then, the data deleting part 14 excludes snapshots corresponding to the version information (e.g., reference symbols L, G1, G2, Mr in FIG. 8) specified as the non-deletion target version information, from deletion targets. That is to say, the data deleting part 14 does not delete the abovementioned snapshots even if they are snapshots of old version, and leaves the snapshots in the storage device 20. This is for leaving version information to be used later when the data specifying part 13 searches out the largest value of version information later, in the storage device 20.

Figure 9:
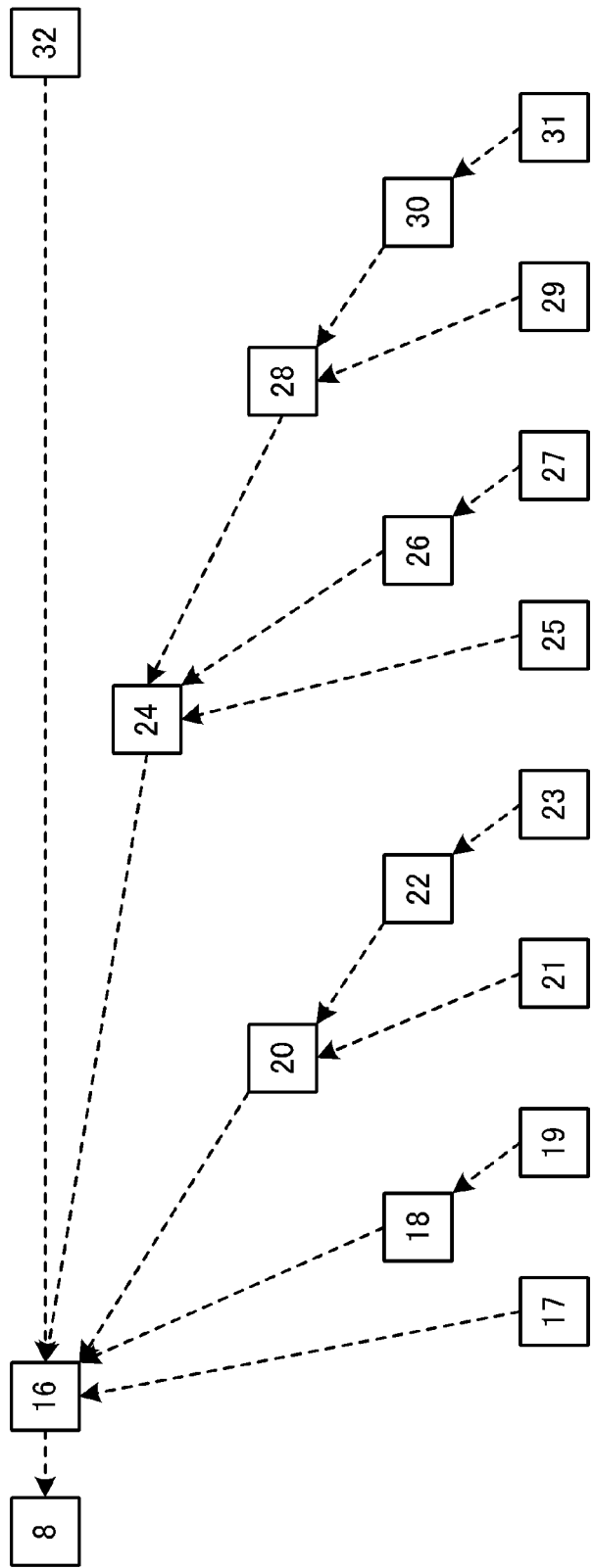
FIG. 9 is an explanation view for explaining an aspect of the data search process in the storage system disclosed in FIG. 3.

Snapshots referred to as "Landmark snapshots" and "Guiding snapshots" when the data specifying part 13 searches out the largest value of version information as described above are "pass snapshots" of the largest value of the version information having been searched out. That is to say, a snapshot of version information traced when the data specifying part 13 searches out version information of the largest value by the abovementioned method will be referred to as a "pass snapshot." FIG. 9 shows an example of version information traced when a value of version information of the largest value, that is, a "pass snapshot" is searched for.

Further, the data specifying part 13 also has a function of specifying, among snapshots older than the latest snapshot, a snapshot accessed by the other application 30 and a snapshot relating thereto as "reclamation tail" to become a non-deletion target of the data deleting part 14. This method utilizes a process executed by the data writing part 11.

Herein, a function that the data writing part 11 further has will be described. When writing the latest snapshot, the data writing part 11 specifies version information of a snapshot being accessed among snapshots of old versions, for example, in cooperation with the data retrieving part 12. Then, the data writing part 11 calculates "reclamation tail length," which is information representing how latest the version of the snapshot being accessed is from the latest snapshot. After that, the data writing part 11 stores "reclamation tail length" into a retention route of the latest snapshot to be newly written.

Then, the data specifying part 13 retrieves the "reclamation tail length" stored in the retention route of the latest snapshot, specifies version information up to a value smaller by a value of "reclamation tail length" from a value of version information of the latest snapshot, as access target version information (access target update information), and refers to a snapshot corresponding to the access target version information as "reclamation tail." Then, the data specifying part 13 includes the version information corresponding to "reclamation tail" into the non-deletion target version information. Furthermore, the data specifying part 13 also includes a pass snapshot of the "reclamation tail" into the "reclamation tail" and includes version information thereof into the non-deletion target version information.

Figure 10:
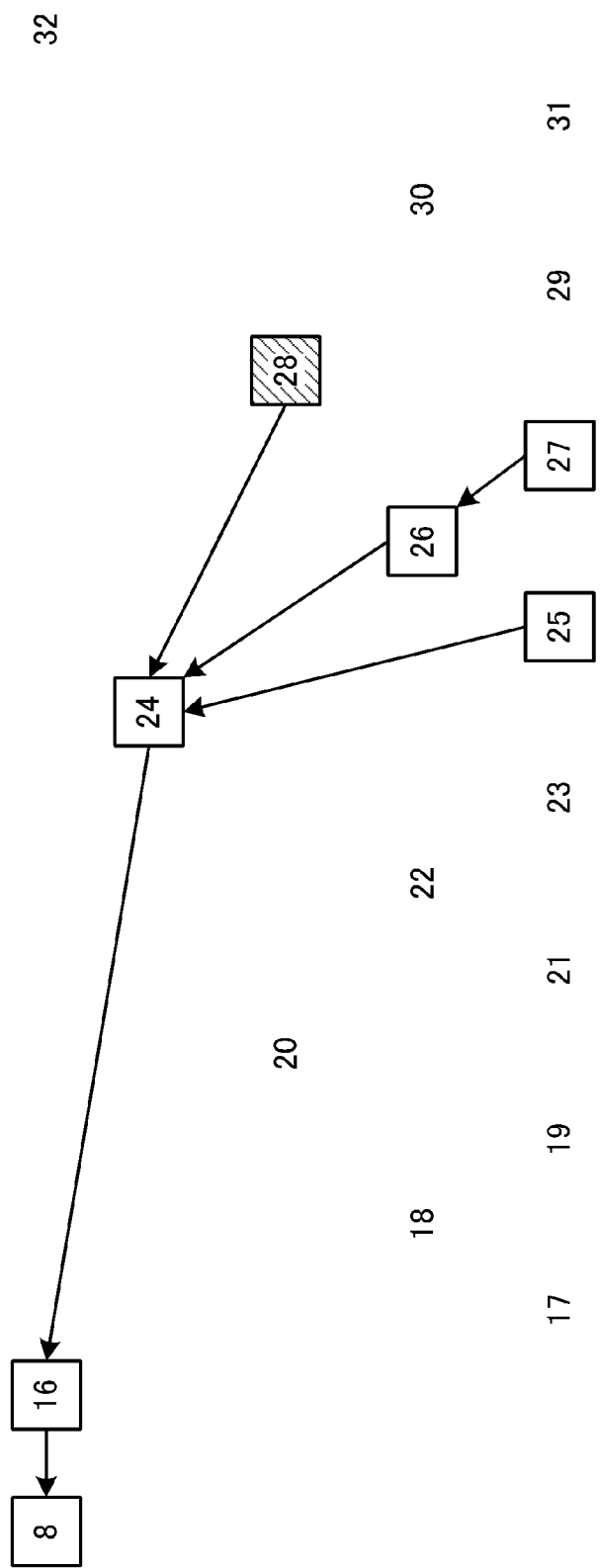
FIG. 10 is an explanation view for explaining an aspect of the data search process in the storage system disclosed in FIG. 3.

Herein, an example of the abovementioned process by the data specifying part 13 will be described with reference to FIGS. 10 and 11. An example of FIG. 10 shows a case that version information of the latest snapshot is "28" and "reclamation tail length" stored in a retention route of the snapshot is "3." In this case, the data specifying part 13 specifies snapshots "25," "26," "27" up to the third from the snapshot "28" as "reclamation tail." Furthermore, the data specifying part 13 selects snapshots "1," "2," "4," "8," "16," "24," "26" that are pass snapshots of the snapshots "25," "26," "27." However, because the snapshots "1," "2," "4,"

"8," "16," "24" among the selected snapshots are pass snapshots of the latest snapshot "28," only the snapshots "25," "26," "27" are specified as "reclamation tail."

In other words, the "reclamation tail" is computed as follows:
- firstly, select the snapshots "25," "26," "27" specified by the "reclamation tail length" equal to 3 for the snapshot "28";
- plus the path snapshots "1," "2," "4," "8," "16," "24," "26" of the snapshots "25," "26," "27"; and
- minus the path snapshots "1," "2," "4," "8," "16," "24" of the latest snapshot"28."

Consequently, the "reclamation tail" in the abovementioned situation is "25," "26," "27."

Then, the data specifying part 13 includes version information of the snapshots "25," "26" and "27" specified as "reclamation tail" into the non-deletion target version information. Consequently, the snapshots of "reclamation tail" are also excluded from deletion targets of the data deleting part 14.

Figure 11:
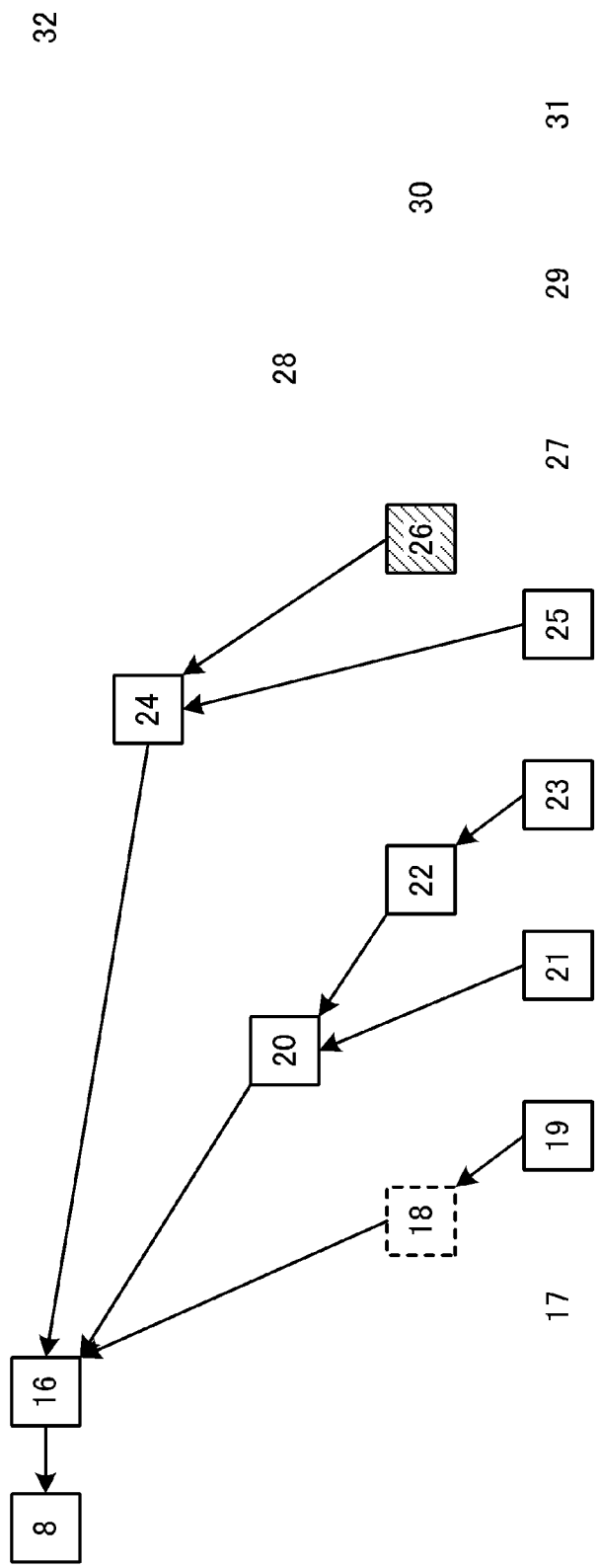
FIG. 11 is an explanation view for explaining an aspect of the data search process in the storage system disclosed in FIG. 3.

Further, an example of FIG. 11 shows a case that version information of the latest snapshot is "26" and "reclamation tail length" stored in a retention route of the snapshot is "7." In this case, the data specifying part 13 specifies snapshots "19" to "25" up to the seventh from the snapshot "26," as "reclamation tails." Furthermore, the data specifying part 13 selects snapshots "1," "2," "4," "8," "16," "18," "20," "22," "24" that are pass snapshots of the snapshots "19" to "25." However, because the snapshots "1," "2," "4," "8," "16," "24" among the selected snapshots are pass snapshots of the latest snapshot "26," only the snapshots "18" to "23" and "25" are specified as "reclamation tails."

In other words, the "reclamation tail" is computed as follows:
- firstly, select the snapshots "19" to "25" specified by the "reclamation tail length" equal to 6 for the snapshot "26";
- plus the path snapshots "1," "2," "4," "8," "16," "18," "20," "22," "24" of the snapshots "19" to "25"; and
- minus the path snapshots "1," "2," "4," "8," "16," "24" of the latest snapshot"26."

Consequently, the "reclamation tail" in the abovementioned situation is "18" to "23" and "25."

Then, the data specifying part 13 includes version information of the snapshots "18" to "23" and "25" thus specified as "reclamation tails" into the non-deletion target version information. Consequently, the snapshots of "reclamation tails" are also excluded from the deletion targets of the data deleting part 14.

The data deleting part 14 may delete a block of the bottom layer equivalent to actual data among snapshots corresponding to version information specified as non-deletion target version information. That is to say, the data deleting part 14 can leave, without deleting, only information from which version information of snapshots specified as non-deletion target version information can be known, For example, the data deleting part 14 may leave only information of a retention route of the top layer of a snapshot and delete the other information.

This exemplary embodiment exemplifies a case that one file is configured by one snapshot, but one snapshot may configure data (storage data) of part of one file. Moreover, one snapshot is not limited to being formed in a three-level tree structure, and may have any data structure.

Second Exemplary Embodiment

A second exemplary embodiment of the present invention will be described in the form of a report below.

<Chapter 1>
(Introduction)

Content-addressable storage (CAS) is a storage model in which persistently saved, immutable data blocks are retrievable by addresses derived from their content. This is in contrast to traditional block stores, such as hard disk drives (HDDs), in which blocks are addressed with their locations. The content-based block addresses in a CAS system are typically generated with cryptographic hash functions, like MD5 or SHA-1. Those functions efficiently summarize a block's content into a few bytes, such that, with a high probability, two different blocks have different summaries. As a result, content-based addresses allow for uniquely identifying a block with a large confidence.

One of the main advantages of such an approach is data deduplication: when a block is requested to be written, its content address allows the system to check whether an identical block is already stored. If an identical block already exists in the system, no data has to be written. In effect, a considerable amount of disk space can be saved. This feature makes CAS attractive for a particular class of applications: backup and archiving.

Employing CAS in backup and archiving applications is further motivated by the fact that a CAS system can be effectively built in a scalable, distributed fashion "HYDRA09", "Venti", "Centera", "DeepStore". Since many machines can be employed, a system having a considerable amount of disk space can be created in such a way. Moreover, the performance, measured primarily by write throughput, should increase with addition of new nodes. Finally, distributed systems, compared to centralized ones, are more robust to failures.

Although a few CAS systems have been developed, there exists no standardized API for them. Moreover, they typically provide only low-level block interfaces which require a considerable amount of effort in order to program methods for storing and managing user data in an effective way. Therefore, an abstraction layer is typically introduced to provide a convenient interface. An intuitive abstraction is file system, which is both well-understood by programmers and commonly used in existing applications. An example of such a file system is HydraFS "HFS", which works on top of the NEC HYDRAstor system "HYDRA09".

Since the typical target application of existing CAS-based file systems is data backup and archiving, and since the underlying block stores of those file systems offer vast data space, high performance and reliability, the file systems have to focus mainly on fully utilizing the performance of their underlying block stores. In other words, the objective of those systems is to maximize the read-write throughput, so as to minimize the duration of backups and data retrieval.

There is, however, also a need for another type of file systems: transactional ones that offer high availability. Such file systems are required by various, possibly decoupled, distributed applications that need to store some persistent data in a reliable way. For instance, an application performing some operations on the data stored in a CAS system may need to store its metadata persistently and may rely on this metadata being constantly available.

Such a transactional file system may also be used as a persistent communication medium between different applications that are unaware of each other. For example, it may be used to determine and transfer the ownership of distributed resources.

(1.1. Contribution)

This thesis presents "Hydra Transactional File System" (abbreviated "HydraTFS")—a highly available transactional file system on top of a distributed CAS system, HYDRAstor "HYDRA09". The transactional fashion of file system operations covers a wide area, from modifications of file content to actions changing the structure of metadata (for instance, creating or removing files and directories). Whenever a transaction is interrupted, the results are automatically rolled back, transparently to other users. Moreover, the application that performed the broken transaction may never restart again—and even in such a situation the rollback is performed. This feature is achieved with the help of the features of the underlying CAS system: robustness to failures, atomicity, and garbage collection.

The underlying assumption that allows HydraTFS to focus on availability and atomicity is that HydraTFS is used relatively rarely and its usage is not situated on the critical path of applications. Therefore, there is no particular requirement concerning the latency of HydraTFS' operations. However, the files in HydraTFS may consist of significant amounts of data (i.e. up to hundreds of gigabytes), and thus, the bandwidth of file operations is a matter of importance.

(1.2. Thesis Overview)

The organisation of the remaining chapters is as follows:

Chapter 2, presents a general overview of the HYDRAstor block storage system, and its aspects which are essential for HydraTFS. Chapter 3, provides an overview of the requirements of HydraTFS. In Chapter 4 the overview of HydraTFS is presented. Three subsequent chapters provide a detailed description of how HydraTFS work. Chapter 5, describes the structure of client data in a snapshot, which is a single version of a file, prepared in an isolated way by a client. Chapter 6 presents a file as a collection of snapshots. The chapter contains the description of how a snapshot may be atomically promoted to the dominant version of the file and how the dominant file version is retrieved.

Finally, Chapter 7 shows how the files are organized into a hierarchical structure of a file system. Chapter 8 presents the evaluation of a HydraTFS prototype which has been implemented. Chapter 9 discusses related work. Finally, Chapter 10 concludes the thesis.

<Chapter 2>

(The HYDRAstor System)

This chapter provides a general overview of HYDRAstor, which is used as a block store for HydraTFS.

(2.1. System Model)

Figure 12:
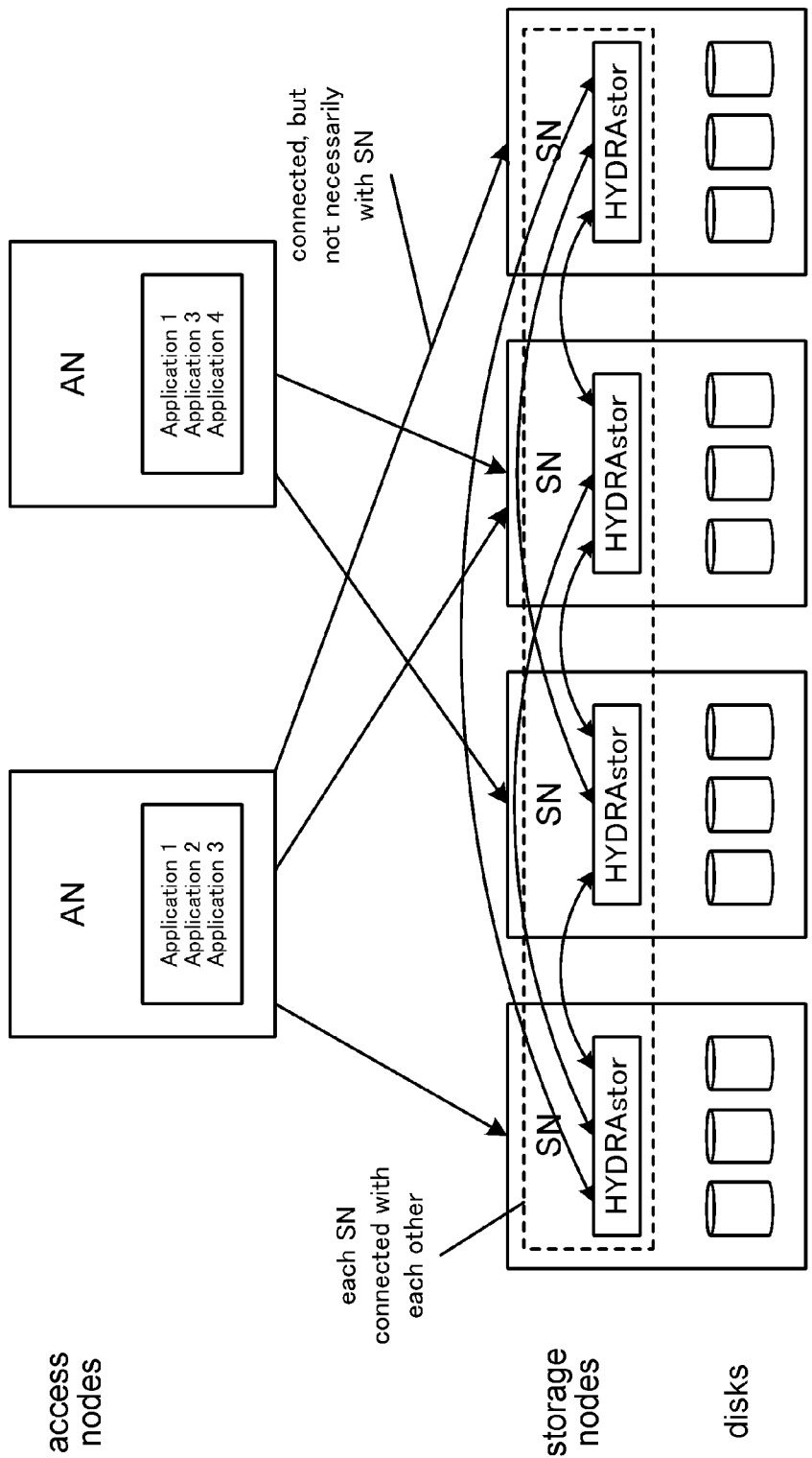
FIG. 12 is a view referred to in a report explained in a second exemplary embodiment of the present invention.

The system consists of two layers (see FIG. 12). (FIG. 12: Layout of HYDRAstor. Two layers—access nodes and storage nodes are presented. Data is stored on disks located on storage nodes.)

Client data is stored in a grid of storage nodes (SN), which are not accessible directly for users. The upper layer is formed by one or more access nodes (AN), that provide the data access API. Apart from being access points for HYDRAstor for users, the access nodes host drivers and applications that run on top of HYDRAstor, in particular, HydraTFS works on one or more such machines.

(2.2. Data Organization)

The data in HYDRAstor is stored in blocks which are immutable, variable-sized and contentaddressed.

There exist three types of blocks (see FIG. 13):
regular blocks,
retention roots,
deletion roots.

Figure 13:
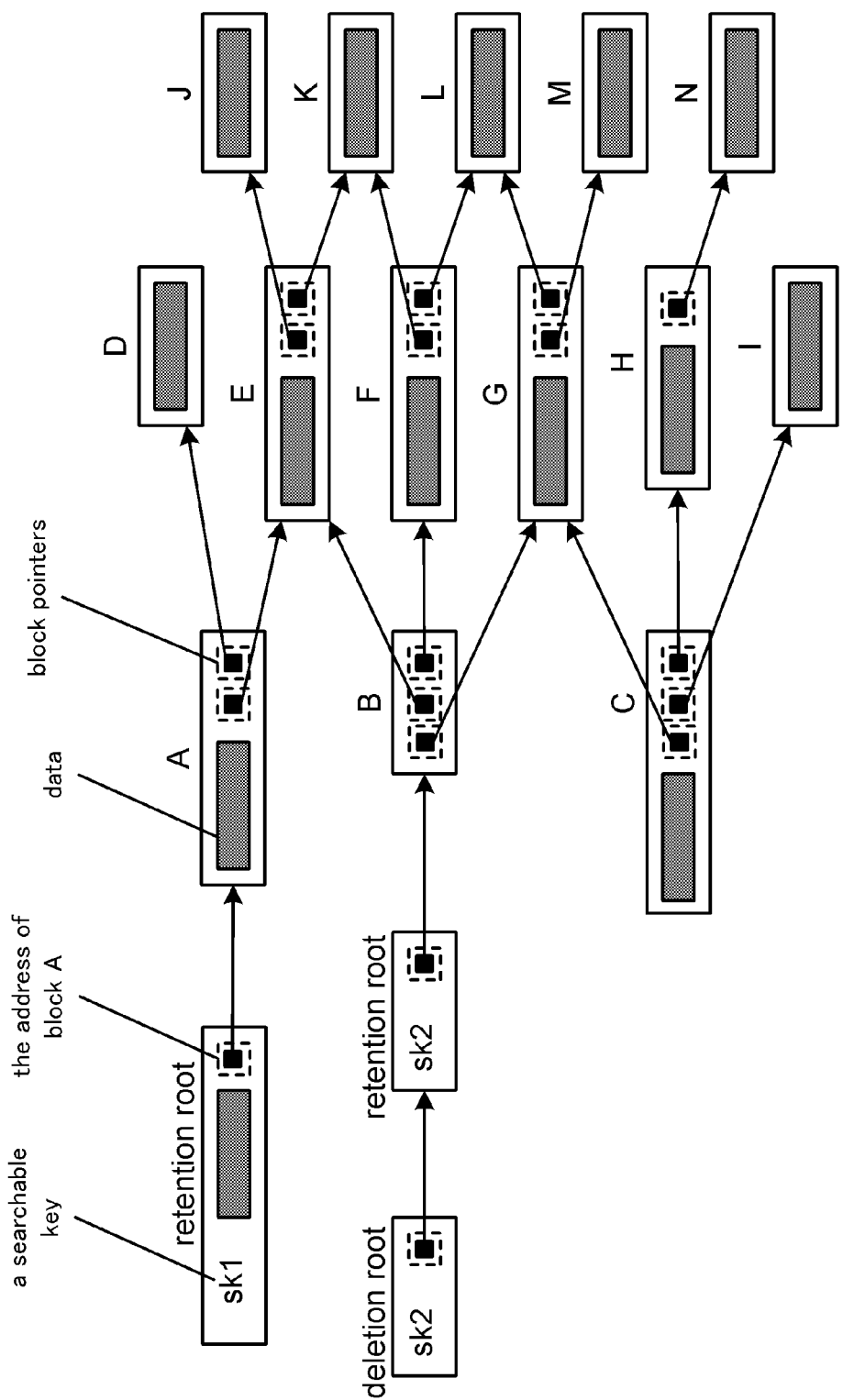
FIG. 13 is a view referred to in the report explained in the second exemplary embodiment of the present invention.

(FIG. 13: Data organization in HYDRAstor. Shaded rectangles are data blocks. Dashed squares are block pointers (content addresses of the blocks they point at).)

Regular blocks are elementary blocks, which store raw data provided by a user (e.g. blocks D, J, I in FIG. 13). The regular blocks may also contain an array of pointers to previously written regular blocks (that is, the content addresses of these blocks), together with (or instead of) data (e.g. blocks A, B, F in FIG. 13). This allows for organizing blocks in simple directed acyclic graphs (DAGs). Similarly to data, the addresses stored are included in the process of block address computation. In other words, the address of a block depends on both the data in the block and pointers to other blocks stored in the block.

A retention root contains, in addition to data and content addresses, a unique, user-specified search key. The search key is used to retrieve the block. Accordingly, retention roots are often called searchable blocks. Unlike the address of a regular block, the content address of each retention root is not exposed to user. In other words, a retention root cannot be pointed to by any other block. The purpose of a retention root is to be an access point of a DAG of regular blocks and to be a mean for looking up the DAG in a user-friendly manner.

(2.3. Deletion of Blocks)

An important issue in HYDRAstor is that no single block is deleted immediately. Instead, a so-called space reclamation process—a garbage collector is executed periodically. Its task is to delete the following blocks:
retention roots marked for deletion by writing special blocks, called deletion roots, having the same search key,
regular blocks not reachable from live (not marked for deletion) retention roots.

Deletion roots are thus markers for blocks to be deleted. In the example shown in FIG. 13 blocks A, D, E, J, K will remain alive after deletion, because they are reachable from a live retention root, sk1. sk1 will also survive itself, because it has no corresponding deletion root. The remaining blocks, in turn, will be deleted. Blocks C, I, H, N have to be deleted, because they are not reachable from any retention root at all. Retention root sk2, is deleted, because there exists a corresponding deletion root.

Accordingly, block B is to be deleted, because it becomes unreachable from a live retention root. Consequently, along with blocks B and C, also blocks F and G are deleted, because they become not pointed by any block, thus also not pointed by any retention root. For a similar reason also blocks L and M are deleted. The details of deletion and the related issues are beyond the scope of this thesis.

(2.4. Interface)

HYDRAstor is accessed from an access node, using a dedicated library. Although HYDRAstor is distributed, this fact is transparent to a client. The interface is as follows:

(2.4.1. Write a Regular Block)

HYDRAstor writes raw data or a vector of pointers (possibly, both data and pointers) supplied by a user. In return, it provides the content address of the written block, which can be then used as a pointer stored in another regular block or a retention root. The block does not have to be actually written. In the case an identical block was already present in HYDRAstor it will most likely be deduplicated. That is, the block will not be saved at all, and as a substitute, the content address of the already written identical block will be returned to the user. This behaviour is not guaranteed, though, and it may happen that in a system there exist two identical blocks. However, this fact is transparent to the client and does not involve any correctness problems.

(2.4.2. Read a Regular Block)

A user provides a content address of a block to be read. In reply, HYDRAstor returns the block contents—data and pointers.

(2.4.3. Write a Retention Root)

A user provides, apart from raw data and content addresses, a search key for the block to be written. If a retention root with such a key already exists in HYDRAstor, an error is returned, regardless if the remaining content is the same or not. In contrast to regular block, writing a retention root is atomic, that is, if two or more writes of a block with the same search key but with different content happen concurrently, at most one writer gets a success and the others get information that the block already exists.

(2.4.4. Read a Retention Root)

A user provides a search key and receives block content in reply. When the requested block does not exist or is marked for deletion (that is, it is pointed to by a deletion root), an error is returned ("not exists" and "marked for deletion", respectively).

(2.4.5. Mark a Retention Root for Deletion)

A deletion root pointing to a retention root is written. A user may write more than one deletion root pointing to a single retention root. In such a situation the deletion root will be deduplicated. Reading or writing a retention root marked for deletion returns information that the block is marked for deletion.

(2.5. Characteristics and Limitations)

As HYDRAstor is designed for backups and data archiving, its main feature is high write throughput. The write throughput of uncompressed data for a 4-SN and 4-AN HYDRAstor reaches 450 MB/s "HYDRA09". This value refers to non-duplicated data and writes performed from all of the access nodes. When the percent of duplicated blocks in the written stream increases, the throughput increases gradually, reaching 900 MB/s at 100 percent of duplicated blocks.

Writing data which is compressed gives even better results. With 33% compression ratio, the bandwidth for 0% and 100% duplicated streams reaches 610 MB/s and 1150 MB/s respectively.

The read bandwidth is slightly lower. It is not so important for HYDRAstor to provide very fast reads, and thus, it has not been so intensively optimized.

The read latency is approximately 150 ms. The latency of write operations, in turn, reaches about 1500 ms. The write latency does not depend on the percentage of duplicated blocks. Such a behaviour is caused by the HYDRAstor's flow control that strives to keep latency on a constant level, possibly increasing or decreasing the utilized bandwidth.

The block size can vary from 1 byte and 0 content addresses to 65536 bytes and 5120 content addresses.

The total capacity of HYDRAstor depends on the number of installed storage nodes and disks. A medium-sized system available to customers, consisting of 2 access nodes and 4 storage nodes, can store between 24 and 48 terabytes of non-duplicated data "HydraModels".

The largest available system (55 access nodes and 110 storage nodes) has the capacity of 1.3 PB.

<Chapter 3>

(HydraTFS Requirements)

HydraTFS has been designed to address specific goals of applications built for HYDRAstor, which are not addressed by existing file systems for HYDRAstor. Accordingly, the design has been tailored to suit primarily the needs of these applications. To explain the requirements of HydraTFS, we discuss these applications.

(3.1. Overview)

An application may work on multiple access nodes. The application's instances running on different machines can be isolated, that is they do not have to coordinate. Moreover, the application should work even if no physical connection between the access nodes is available.

(3.2. Use Cases)

Existing applications will use HydraTFS in two ways: as a database for metadata and as a method for storing partial results to enable checkpointing and recovery.

(3.2.1. DB for Metadata)

In the first use case, HydraTFS is used to store data records of several kilobytes. Each record corresponds to an independent task of an application, and thus, the records are independent themselves. Some records are held in memory and, when modified, have to be saved to HYDRAstor in order to become persistent.

(3.2.2. Storage for Partial Work Results)

In the second use case, a batch process, which may work for long periods time, needs to checkpoint its results periodically in a persistent way in order to be able to retrieve them after being suspended or after a crash. The stored partial results are a stream of data, which may be of any size. The data is appended at the end of the stream as the task proceeds. When the task is resumed, the whole stream is read from the beginning and afterwards further checkpoint appends occur.

The portions of data appended to the stream have to be stored persistently in HYDRAstor.

(3.2.3. Listing and Deleting Stored Data Items)

The above applications have to be able to list all of the data items (both DB records and partial work streams) they have stored. For instance, this is required during the startup of the applications. Moreover, a need may arise to list the data items which have been saved by application instance from another access node. It may be required in the case the responsibilities of a crashed access node are taken over by another access node. It is also allowed for an application instance to crash and never arrive again on a particular access node. In such a situation, the data items stored by the application, even if not taken over, have to be deleted. Consequently, in order to be deleted, they have to be listed first.

(3.3. Requirements)

(3.3.1. Latency and Throughput)

The operations on HydraTFS are performed relatively rarely and are not on the critical path of an application. Therefore, a low latency is not a major requirement. High throughput, however, may be required, because an application may write significant amount of data, that is, up to several hundreds of gigabytes.

(3.3.2. Concurrency)

In the use cases described in Section 3.2.1 and Section 3.2.2, each DB record or data stream is used by a single process most of the time. However, when a process is considered crashed, concurrent accesses may appear. The occurrence of concurrent accesses may have two origins.

Firstly, the crashed process may leave some requests in HYDRAstor, which still are continued to be normally processed. They may interfere with requests of another process, which has taken over the responsibilities of the crashed one.

Secondly, the process running on an access node may be considered crashed incorrectly—for instance, due to a network failure. However, it may still be connected with storage nodes and successfully co-operate with HYDRAstor.

Concurrent accesses, if not handled appropriately, may introduce data inconsistencies, which could make the system unreliable. This is unacceptable in a commercial product like HYDRAstor, and therefore, the concurrency issues have to be addressed in the design of HydraTFS.

<Chapter 4>

(HydraTFS Overview)

(4.1. Placement in the HYDRAstor System)

In a HYDRAstor system, HydraTFS processes are executed on access nodes, along with the processes of applications it has been designed for. It may be executed on any number of ANs concurrently.

All HydraTFS processes in the HYDRAstor system operate on a single file system. The whole file system is stored persistently in HYDRAstor and is accessible on equal rights from all access nodes. Moreover, the architecture of HydraTFS does not require connectivity between access nodes to handle concurrency. In other words, the whole inter-process communication is performed via the persistent block store. Therefore, the only connectivity required is this between each access node and the network of storage nodes.

(4.2. File System Structure)

This section provides a bottom-up description of the structure of HydraTFS.

(4.2.1. A Record)

Let us start with the definition of a single atomic structure for user-supplied data. In contrast to classical file system interfaces, which operate on byte streams, HydraTFS is designed operate on indivisible data chunks. That is, a fragment of data, once written, may be read only as a whole. We will call such a fragment a record. This is simply a structure containing objects (represented by a sequence of bytes) and content addresses (block pointers).

A record is similar to a regular block in HYDRAstor. However, a single record is not equivalent to a single block. On the contrary, it is allowed for both keeping multiple records in a single HYDRAstor block, and spreading one large record across many HYDRAstor blocks. Thus, there is no lower limit on the size of a single record and theoretically a single record may cover a whole file. For instance, in the use case described in Section 3.2.1, the whole database record may be put into single record and then also retrieved as a whole.

(4.2.2. A File Snapshot)

A file snapshot (or snapshot for short) is a consistent sequence of records, created by a single client process. In fact, in HYDRAstor it is represented by a retention root, pointing at a DAG of regular blocks. In case the file is small, the representation is the retention root only.

The organization of records in a single snapshot is presented in detail in Chapter 5. The I/O operations allowed on a snapshot are reading records sequentially and appending new records at the end, thereby forming a new snapshot.

Such a new snapshot can be committed in order to become persistent. This operation will be mentioned again in the next Section, 4.2.3. Before, however, a commit succeeds, the I/O operations on a snapshot are performed by a user in an isolated manner. A snapshot under construction does not collide in any way with other snapshots or any other HYDRAstor blocks written. In fact, it is not even noticeable by other processes until it is committed. A snapshot, once committed, cannot be modified, as blocks in the HYDRAstor system are immutable. The same argument applies to all blocks belonging to a snapshot under construction. When a writer of a snapshot crashes before committing the snapshot, the regular blocks which have been written during the construction of the snapshot, will remain in HYDRAstor.

However, they will be deleted during HYDRAstor's garbage collection process, as long as they are not referenced from elsewhere due to deduplication. The amount of data per single snapshot may be significant—up to hundreds of gigabytes. Therefore, both reads and appends are required to allow for high throughput.

(4.2.3. A File)

A file in HydraTFS is a collection of snapshots. One of them, the most recent snapshot is the predominant version of the file—it is the last successfully committed snapshot. That is, when a file is accessed, the most recent snapshot is made available for reading by the user. The other snapshots are named outdated snapshots. However, some of them may still be accessed by users who started reading them before another snapshot became the most recent. On the other hand, whenever a user starts accessing the file, the only snapshot available for him is the most recent snapshot.

Committing a new snapshot is an atomic replacement of the most recent snapshot with the new one. It is a transactional operation, that is, when many users read the most recent snapshot and then all of them attempt to commit a new one, only one will succeed. The remaining ones will have to retrieve the already new most recent snapshot and try again. It is up to the application to resolve data conflicts.

The atomicity of commit comes from the fact, that it is essentially a retention root write in HYDRAstor. Therefore, no inconsistent state is possible—either a block is written successfully, constituting the new most recent snapshot, or nothing is written in the case of a failure.

(4.2.4. A File System)

HydraTFS organized into a structure made of files and directories. This file system layout makes usage of HydraTFS more convenient to the users. Each directory can store an unlimited amount of other directories. The depth of the file system tree is also not limited. In other words, the file system structure may expand freely.

Directory is internally similar to a regular file, but has special contents. Similarly to a regular file, modifications of its content are transactional. Therefore, the directory structure (and thus the whole file system tree), is always in a consistent state.

The content of each directory is hidden from the user. Instead, typical file system operations are exposed, such as create a new file, remove a file or list a directory.

The file system structure enables organizing files efficiently and in a scalable way. For instance, a directory which is often accessed can be replaced with several smaller ones. As a result, the concurrency issues present during file system operations, which involve committing a new version of directory contents, are reduced. Different regular files or directories are separate from the concurrency point of view.

(4.3. Summary)

To sum up, let us focus on how the design corresponds to the two major requirements: global namespace and transactional operations.

(4.3.1. Global Namespace)

The term "global namespace" means that all access nodes operate on the file system on equal rights and access the same "version" of the file system. The effects of operations on the file system made from one of access nodes, are visible from all other machines after committing. The operations are not, however, coordinated by any global leader. Each access node operates independently and does not require network connectivity with other access nodes.

Such a feature of global namespace is not currently provided by another file system working on HYDRAstor—HydraFS. The file system is accessible from a single access node at a time only.

(4.3.2. Transactional Operations)

In HydraTFS the operations of modifying the contents of a regular file or directory are transactional. Like in databases, a transaction to be reliable has to guarantee four properties: atomicity, consistency, isolation and durability "Ullmann" Let us focus on how these properties are achieved in HydraTFS.

"Isolation" When a new snapshot is created, before a commit, it is represented in HYDRAstor essentially as a structure of regular blocks. These blocks are not reachable by any other process. The only way to refer to them is to provide a proper content addresses—but those are held in the memory of the writing process. Another process could get the content address, though. But this could be achieved only by writing an identical structure of blocks, only in a situation in which all of them will be deduplicated. This is not a problem, because the blocks are immutable and the process writing duplicates has no way to influence the other process preparing the transaction. More precisely, the process writing the duplicate blocks cannot even notice that another process is also preparing a snapshot and the same blocks are already present in the system. Therefore, this situation does not lead to any problems.

"Atomicity and durability" The commit operation, as it has already been said, is essentially a write of a retention root, being the last block in the structure of blocks constituting a snapshot. The atomicity and durability are directly guaranteed by HYDRAstor. The retention root is either saved successfully, making the commit succeed or it fails leaving the regular blocks not referred to by retention root. After a failure the regular blocks will be deleted from HYDRAstor during the garbage collection process. In other words, in the case a commit fails, the data is rolled back automatically—it does not require any attendance from HydraTFS.

"Consistency" According to what has been stated in Section 4.2.3, when many users read the most recent snapshot, prepare a new version of a file and try to commit it, the implementation guarantees that at most one will succeed. This guarantees consistency of data, because in order to commit a snapshot, the newest one has to be retrieved first. In other words, the process modifying the file cannot commit a new version which is the result of transformations of an outdated version without reading the modifications in the newest version. The data conflicts, however, have to be resolved by the applications.

<Chapter 5>

(A Snapshot)

A snapshot of a file—already introduced in Section 4.2.2—is a collection of records, independently created by a client. When committed, this collection becomes the predominant version of the file. The commit operation is discussed in detail in the next chapter. In this chapter, in turn, we focus on reading records from and writing them to a snapshot.

Our target is to provide a method that enables appending records at the end of a snapshot and reading these records sequentially. It should be possible to append records to a new, empty snapshot and to a snapshot which already contains some records. The amount of data per single snapshot may be significant—up to hundreds of gigabytes. Therefore, both reads and appends are required to enable high throughput.

Since before a commit operation, a snapshot is visible only to the client operating on it, append operations do not introduce any concurrency issues.

(5.1. Writing to a Snapshot)

First, let us assume that the snapshot being discussed is empty and a client is attempting to perform some initial writes. The client requests HydraTFS to write some records. These are buffered in memory (FIG. 14($a$)). When the size of the memory buffer exceeds a certain limit, a new regular block, containing the buffered contents, is written to HYDRAstor. The content address returned by such a write is memorized. We will call such an address a level-0 address.

Afterwards, the client writes may be continued. As a consequence, more level-0 addresses are collected (FIG. 14($b$)).

When the number of memorized level-0 addresses equals to or exceeds the maximum number of content addresses that fit in a single block, an intermediate block containing these content addresses is written to HYDRAstor. Again, the content address of this block is memorized. This time, however, as a level-1 address (FIG. 14($c$)). As a consequence, the level-0 addresses, that have just been saved to HYDRAstor, can be purged from memory. In this way we obtain a three-level tree with leaf nodes containing the client's records and intermediate nodes containing pointers to lower level nodes.

Higher-level trees are not supported for simplicity.

FIG. 14: Building the tree structure of a snapshot. The dashed blocks are blocks not yet saved to HYDRAstor—their content is still only in memory. The shaded blocks are blocks with client's records, each of which consists of data and/or pointers.)

(5.2. Committing Contents of a Snapshot)

Please note, that the algorithm described in the previous section does not guarantee that the records appended by the user are stored physically in HYDRAstor. On the contrary, some of the user's records may still be buffered, and some content addresses (level-0 or 1) may still be held in memory. Moreover, the structure is not pointed to by any retention root. This situation would result in deletion of the whole snapshot's contents during the nearest garbage collection.

In order to ensure that the data stored in HYDRAstor is persistent, the snapshot has to be committed. This means that as a result, the buffers have to be flushed to HYDRAstor and the whole snapshot structure has to be pointed to by a retention root. In detail, the commit works as follows:

If the current height of the tree is 0 (that is, no block has been saved yet), the contents of the memory buffer are saved to HYDRAstor as a new retention root.
  If the current height of the tree is 1 (at least one level-0 address has been memorized), and some user data exists in the memory buffer, a block containing the buffer is written to HYDRAstor and its content address is memorized as a subsequent level-0 address. Afterwards, all memorized level-0 addresses are written to HYDRAstor as a part of retention root.
  If the current height of the tree is 2 (at least one level-1 address has been memorized), the operation works recursively. First, the buffer is written in level-0 block, then, intermediate level-1 blocks are written, finally, the memorized level-1 addresses and metadata are saved as a retention root. Please note that on each level there can be at most one nonpersistent block.

Figure 15:
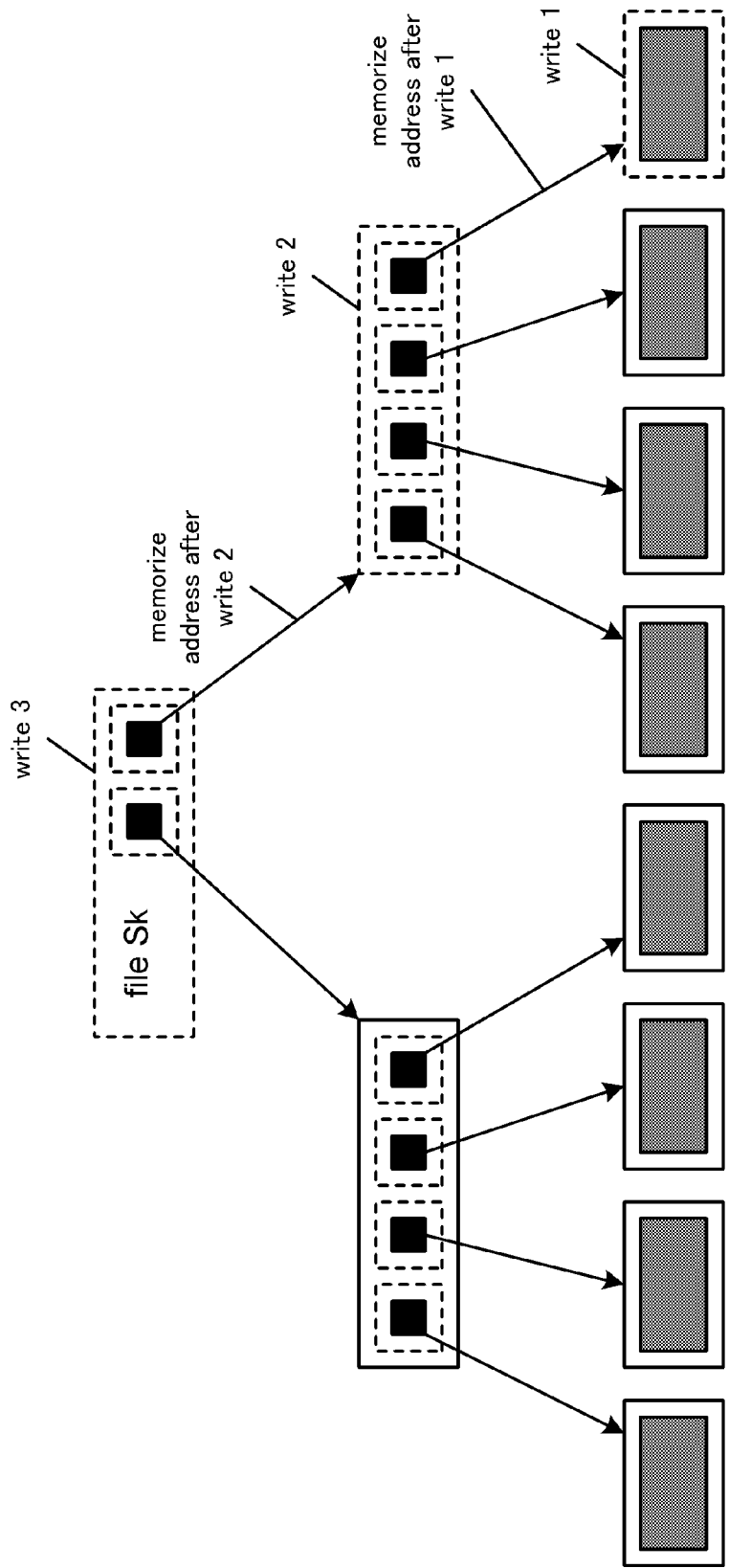
FIG. 15 is a view referred to in the report explained in the second exemplary embodiment of the present invention.

FIG. 15 illustrates the process of committing the snapshot's tree of height 2. write 1 is for the contents of the buffer with client's records. After the aforementioned write finishes, supplying a level-0 address, a level-1 block of level-0 addresses is written during write 2.

Finally, when a level-1 address to the block arrives from HYDRAstor, the retention root with the snapshot's search key is written during write 3.

FIG. 15: Committing the snapshot's tree of height 2. The dashed blocks are in the memory and have to be written. The remaining ones are already in HYDRAstor.

After committing the buffers of a snapshot, the client can continue appending records. Logically, those new data items together with the ones just committed will comprise the next snapshot. To make the next snapshot persistent, the next commit (with a new retention root's search key) would have to be done. Accordingly, the client may think of a commit as of a flush operation, similar to fflush( ).

In the case the process building the snapshot crashes before a successful commit, or the commit fails and the client does not attempt to try again, the unfinished snapshot will be rolled back, that is, the records already stored in HYDRAstor will be reclaimed automatically during the nearest garbage collection. This is because the regular blocks containing these records are not pointed by any retention root.

(5.3. Structure of a Snapshot's Leaf Block)

As explained earlier, a record can consist of both raw data (bytes) and content addresses (pointers). During every append to a snapshot, any amount of data/addresses can be saved, starting with one byte or one content address. After an append a client is also allowed to commit. If the next append after such a commit added its record to a new, subsequent HYDRAstor block, the client would end up with a snapshot made of an excessive number of blocks containing small amounts of records: even one record per block. Such a snapshot, apart from occupying far more space than necessary, would lead to time- and resource-consuming reads.

Accordingly, a method has been introduced for organizing the records across blocks. While its details are beyond the scope of this thesis, its objective is to pack records in consecutive blocks in such a way that all blocks but the last are filled to their capacities (64 kB of data or 5120 addresses).

(5.4. Reading a Snapshot)

The reading process starts with reading a proper retention root, that is, the root of the snapshot's tree structure. Then the first leaf block in order is found and the reading of records begins. The snapshot read operation is no more than simply reading the tree leaves sequentially.

While reading, the last processed leaf block and all its parents in the snapshot's tree up to the root should be cached in memory. This would not require a major amount of memory (up to three blocks). Otherwise, if we kept only the location in the tree, each subsequent read would last a significant amount of time, because it would consist of up to three sequential reads from HYDRAstor.

(5.5. Summary)

The presented design allows for creating large snapshots without significant data overhead and for reading and writing snapshots sequentially in an efficient way.

(5.5.1. Write Performance)

Append operations are performed in such a way that can lead to a high HYDRAstor utilization. Even if a client keeps on issuing appends of very small records, the candidates for subsequent blocks are buffered and written to HYDRAstor when ready. Thus the writes to HYDRAstor are performed in chunks of a considerable size. Apart from that, a write to HYDRAstor does not interrupt in any way the process of further appends and possible further writes of subsequent ready blocks. The above applies also to writing intermediate level-1 blocks. Provided that the memory buffer is large enough, the appending process can fully utilize the bandwidth offered by HYDRAstor.

(5.5.2. Read Performance)

The performance of record reads may be significantly lower than that of writes. The main reason is that checking if a record occupies a leaf block in a tree requires the previous leaf block to be read. Thus the design assumes that blocks are read one-by-one, which decreases the throughput, due to the high latency of block reads in HYDRAstor. The read throughput can be improved with prefetching or by storing additional metadata in intermediate tree nodes.

<Chapter 6>

(A File as a Sequence of Snapshots)

Building a snapshot, as described in Chapter 5, is performed in an isolated manner by each client process. Only the writing of the topmost block—the retention root—finally touches the global namespace and may collide with other clients. Therefore, we introduce a boundary line between preparing the content of the retention root—still performed using the methods defined in previous chapter—and the actual write to HYDRAstor, which will be discussed here. As the retention root write makes a new snapshot visible to other clients, we will call the operation WriteSnapshot. When a file is committed multiple times (either by one or many client processes), multiple snapshots are created in HYDRAstor.

Since for each file multiple snapshots can exist in HYDRAstor, one of the problems is selecting the most recent one in the case a client wishes to read the file. We will call this operation GetMostRecentSnapshot. Analogically to WriteSnapshot, GetMostRecentSnapshot selects and reads the proper retention root and then its contents are passed to procedures responsible for reading the single snapshot, which have been described in the previous chapter. At the moment we will not consider the removal of a file; this will be discussed in the next chapter.

The major requirement for the WriteSnapshot/GetMostRecentSnapshot operations is the transactional way of modifying the files. That is, if many clients read the same snapshot using GetMostRecentSnapshot, and each one creates a new snapshot, and then all perform WriteSnapshot, at most one such operation succeeds. The remaining clients in order for their commit to succeed, have to repeat their operations on the file—that is, do Get—MostRecentSnapshot to refresh their data, resolve potential conflicts, and try once more. This feature guarantees data consistency. Any regular blocks in snapshots that failed to be committed will be deleted automatically during the nearest HYDRAstor garbage collection as the written blocks constituting them are not pointed to by any live retention root.

In Section 6.1 the basic approach to the problem is presented. Then, in the following sections this solution is gradually improved.

(6.1. Basic Approach: a Linear Sequence of Snapshots)

In the basic approach, we represent the file as a sequence of snapshots. Initially the file has 0 snapshots. After the first commit snapshot 1 is created. The following commits create snapshots 2, 3, etc. Simply, the most recent snapshot is the one with the highest number. From now on we will call the i-th snapshot $S_i$.

GetMostRecentSnapshot simply iterates over the snapshots (performing retention root read in HYDRAstor) and returns contents of the last one which exists. To check a snapshot for existence it is enough to read its retention root.

After reading snapshot $S_i$, a possible following WriteSnapshot attempts to write $S_{i+1}$. WriteSnapshot operation from only one client succeeds (Section 2.4.3). For other clients writing $S_{i+1}$, the retention root write will not succeed. An error status will be returned by HYDRAstor, denoting that the retention root with the requested search key already exists. In such a situation, an error status is returned to the client, denoting that the snapshot that has been read (in this case—$S_i$) is already outdated. The client would probably repeat the sequence of operations to resolve concurrency conflicts. The next GetMostRecentSnapshot would return the newly saved snapshot root, $S_{i+1}$ (provided that noone else committed anything in the meantime). Then, after introducing modifications of the read snapshot, the client would successfully commit a new snapshot, $S_{i+2}$.

After a successful commit a client is not obliged to do GetMostRecentSnapshot again. On the contrary, if snapshot $S_{i+1}$ has been committed, the client can perform further commits and they will be written as snapshots $S_{i+2}$, $S_{i+3}$, etc.

In the presence of concurrent writes, the returned most recent snapshot may actually be older than the real most recent snapshot. This is not a problem, though, because if the client tries to commit (do WriteSnapshot) based on an outdated snapshot, the operation will fail, as it has already been stated. In this way, the client will have a chance to resolve any conflicts and reattempt the operation.

(6.2. Improvement: a Dual Binary Search Algorithm)

Let us now focus on the task of the GetMostRecentSnapshot operation and try to improve it. We are given a sequence of snapshots, $S_1, S_2, \ldots S_n$, which are saved in HYDRAstor. Our task is to find the end of such a sequence efficiently.

Figure 16A:
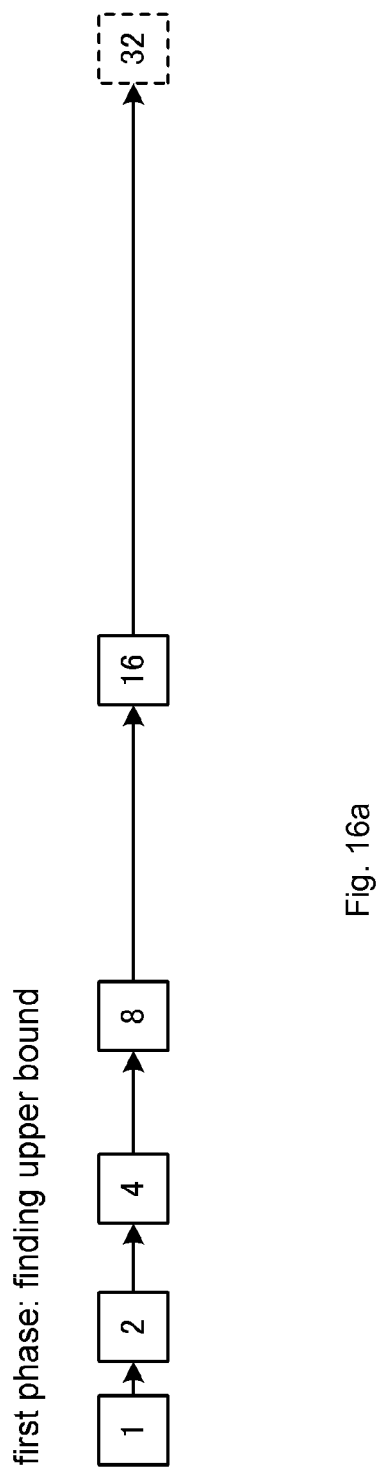
FIG. 16a is a view referred to in the report explained in the second exemplary embodiment of the present invention.

As the reader may have noticed, the iteration presented in the basic approach described in the previous section is not the most optimal solution. It requires O(n) reads. As the first step on our way to improve the number of reads, let us efficiently find the upper bound on the sequence number of the most recent snapshot. Instead of iterating over the snapshot roots one by one, we could check for the existence of snapshot roots $S_{2^0}, S_{2^1}, \ldots S_{2^k}$. Thus, the number 2k, such that $S_{2^{k-1}}$ exists and $S_{2^k}$ not, is our upper bound. For instance, in FIG. 16a the iteration finishes at snapshot 32, as it is the first snapshot in sequence 1, 2, 4, . . . that does not exist. Therefore 32 is the found upper bound. (FIG. 16: The dual binary search algorithm.)

Figure 16B:
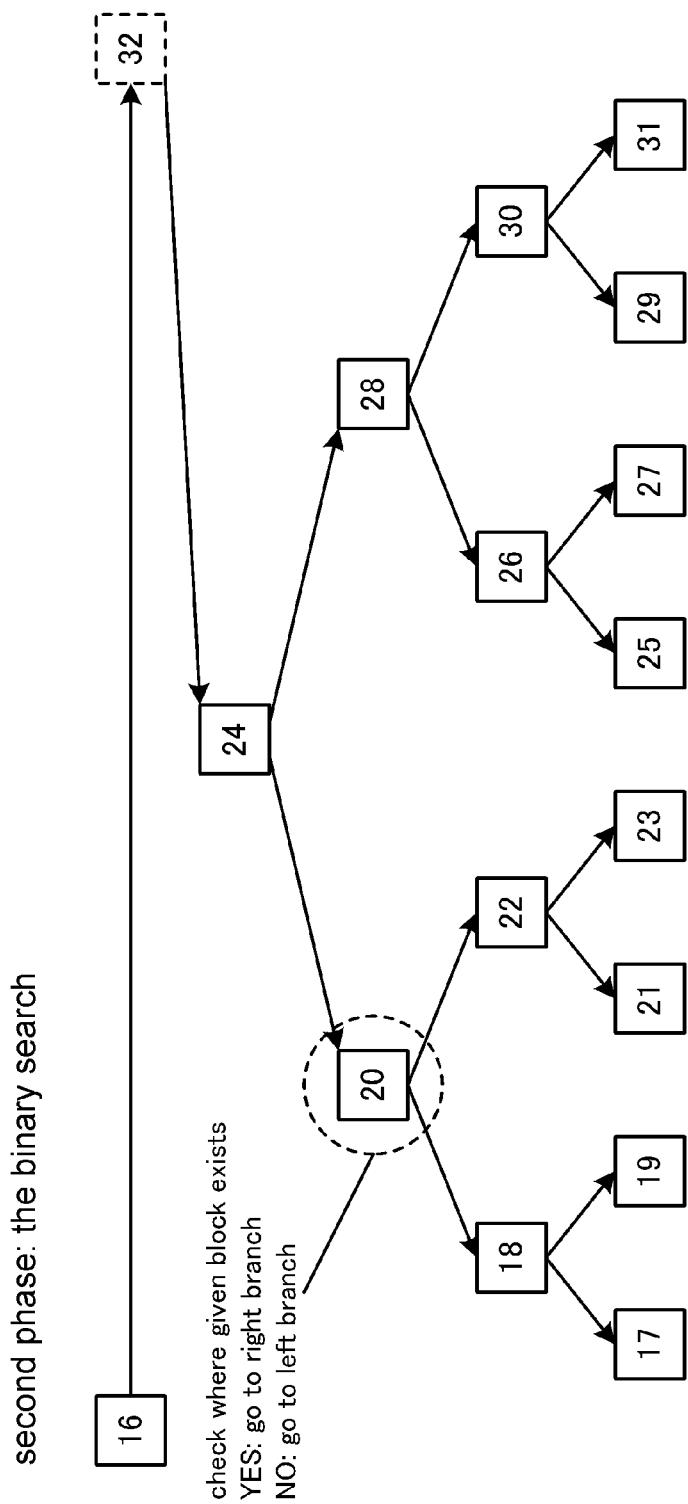
FIG. 16b is a view referred to in the report explained in the second exemplary embodiment of the present invention.

After we have identified the bounds, we can binary-search for the end of the sequence in range $(2_{k-1}, 2_k)$ (FIG. 16b).

Figure 16C:
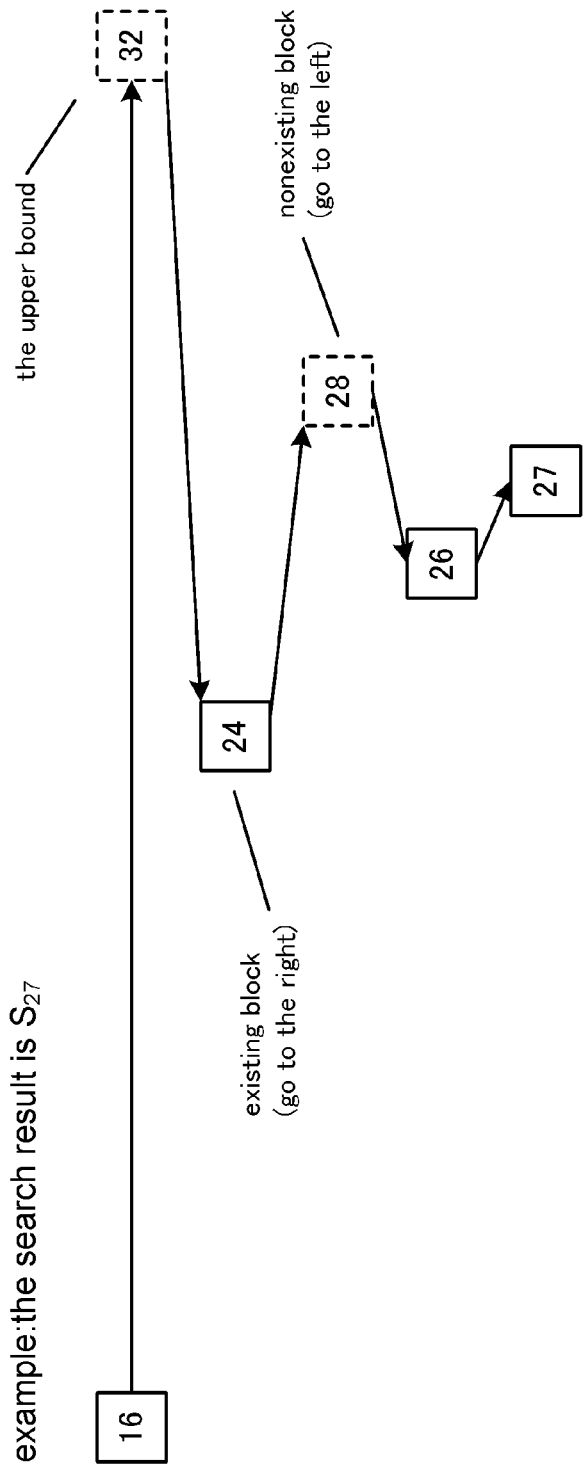
FIG. 16c is a view referred to in the report explained in the second exemplary embodiment of the present invention.
Figure 16D:
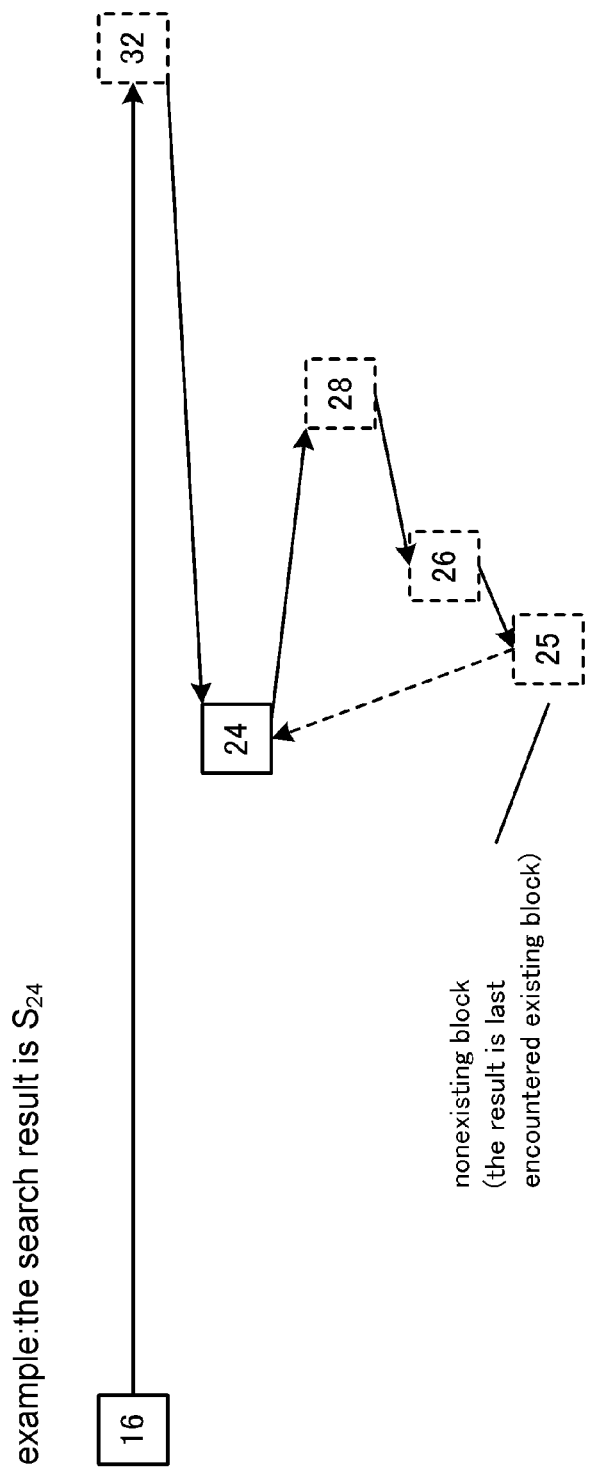
FIG. 16d is a view referred to in the report explained in the second exemplary embodiment of the present invention.

In FIG. 16c a sample algorithm execution is presented. The result is 27. In the case we reach a leaf snapshot and it does not exist (FIG. 16d), our result is the most recently encountered snapshot. In other words, the successive ranges in which the resulting snapshot may exist are as follows:

(16, 32)—after the upper bound is found,
(24, 32)—snapshot 24 exists,
(24, 28)—snapshot 28 does not exist,
(24, 26)—snapshot 26 does not exist,
(24, 25)—snapshot 25 does not exist, therefore the result is 24.

With the above binary search we reduce the number of operations necessary to find the end of the sequence, $S_n$, from O(n) to O(log(n)).

The above dual binary search algorithm can be improved by searching with a larger base. For example, with a base of 64, we issue 64 retention root reads in parallel. Assuming that the most recent snapshot number is less than 264, we can find the upper bound for the number of the last snapshot in one parallel fetch. The second step of the algorithm can be done six times faster than the original binary search, as we proceed 6 levels of the search tree at a time (64=26). This simple optimization reduces the latency of GetMostRecentSnapshot considerably.

(6.3. Deletion of Unnecessary Snapshots)

Storing the full sequence, that is, all snapshots created during the lifetime of a file, wastes storage, especially since the file size (and, consequently, the size of a snapshot) may reach up to hundreds of gigabytes. Moreover, client records in each snapshot can contain pointers to blocks that are no longer needed by the client and can be reclaimed by HYDRAstor. In effect, the real amount of space occupied by a snapshot may be even larger. Therefore a method is required to reduce the amount of data stored for a single file.

(6.3.1. Selection of Snapshots to Delete)

Let us, for the time of the introductory considerations, assume that the file does not change—that is, no new snapshots are written.

During the GetMostRecentSnapshot operation, the dual binary search algorithm visits (here—checks for existence) only a small subset of snapshots. The remaining ones can as well be deleted. Their presence or absence makes no difference from the point of view of GetMostRecentSnapshot.

In order to define in a more formal way the method for deleting unneeded snapshots, let us now group the snapshots making up the snapshot sequence. At first, let us introduce the following notation:

M—the sequence number of the most recent snapshot,
N—a constant such that $2^N \leq M < 2^{N+1}$, We classify the snapshots into the following categories:
"the most recent snapshot" This is snapshot $S_M$.
"nonexisting snapshots" These are all snapshots $S_i$, such that i>M.
"landmark snapshots" These are all snapshots $S_{2^i}$ such that $0 \leq i \leq N$.
"guiding snapshots" This group is best defined recursively:

[Math. 1]

$S_{g_1} = S_{2^N + s^i}$, such that $2^i \leq M - 2^N \leq 2^{i+1}$, or null if such i does not exist;

$S_{g_{k-1}} = S_{g_k + 2^i}$, such that $2^i \leq M - g_k \leq 2^{i+1}$ or null if such i does not exist.

"uninteresting snapshots" These are all other snapshots.

Figure 17:
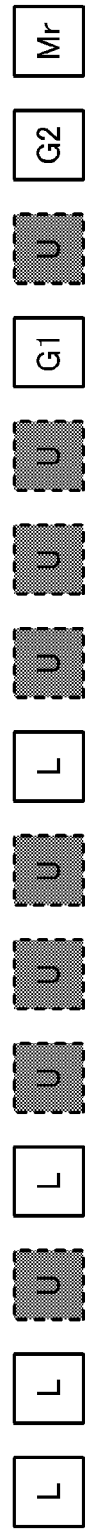
FIG. 17 is a view referred to in the report explained in the second exemplary embodiment of the present invention.

The snapshot classification may be viewed in FIG. 17. (FIG. 17: Snapshots classification: L—landmark snapshots, Gk—guiding snapshots, Mr—the most recent snapshot, U—uninteresting snapshots.)

Intuitively, according to the terminology presented above, the idea of dual binary search algorithm is to first identify N by iterating over the landmark snapshots, and then to find M by iterating over the guiding snapshots.

As it can be seen, the uninteresting snapshots may be safely deleted, as they are not used in the search algorithm. Moreover, it can be seen, that when a snapshot becomes uninteresting, it remains uninteresting regardless of the sequence growth. Since there are only O(log(n)) interesting snapshots, removing uninteresting ones saves a lot of space.

"Path Snapshots"

Figure 18:
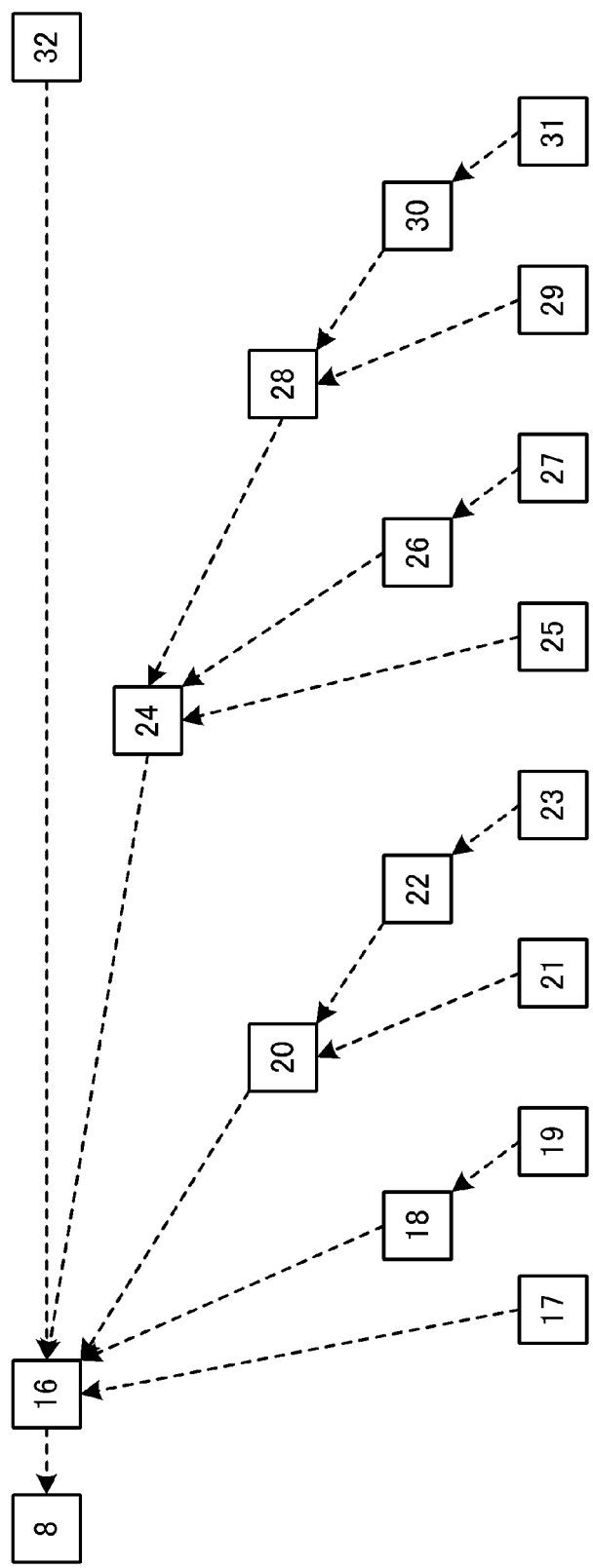
FIG. 18 is a view referred to in the report explained in the second exemplary embodiment of the present invention.

We will call the snapshots iterated over and present in the system while searching for $S_M$ (that is, the guiding snapshots and landmark snapshots), the path snapshots for $S_M$. The "A is a path snapshot for B" relation is illustrated in FIG. 18. The relation is transitive, thus, for readability, only the highest path snapshot for each snapshot is marked. (FIG. 18: Path snapshots. The dashed arrow points from a snapshot to its path snapshot with the highest number.)

(6.3.2. The Reclamation Tail)

Let us now drop the assumption that a file does not change and analyze what happens when new snapshots are written.

Suppose that we have a sequence of snapshots ending at $S_k$. After writing the new one, $S_{k+1}$, we cannot simply mark $S_k$ immediately for deletion, even if it becomes an uninteresting snapshot. Despite writing the new snapshot, one or many old ones may still be read by someone who has started the reading in the past when they have been the most recent snapshots. If we marked them for deletion and garbage collection proceeded in HYDRAstor, we would end up with a read error: reading nonexisting snapshots. Thus we want all users to finish the reading with no consequences.

The same applies to searching for the most recent snapshot. We do not want to realize, being in the middle of the binary search, that some snapshot roots on our path have been marked for deletion. In such a situation, the search result could be severely abnormal.

Aggressive deletion of snapshots may also cause a false-positive commit. Let us imagine that both a snapshot read by a client and the next one become uninteresting (as a result of another client's operations) and are marked for deletion. Then, garbage collection in HYDRAstor is run, and afterwards, the client commits. The commit would succeed, as there is no snapshot anymore in the place of the newly committed one.

To conclude, it has to be established, which snapshots may be anywise used by clients, and which may not. Being the most pessimistic, we could suppose that all the snapshots may still be needed by someone—in fact, in accordance to the current rules, a client may start reading a certain snapshot and never stop, even if it is not the most recent snapshot for a long time.

Obviously, this is unacceptable. We have to provide a method for determining the snapshots that will not be accessed by anyone. To this end, a time limit, Tr, is introduced, within which a client has to manage to search the snapshot with GetMostRecentSnapshot, read it and (if he wishes to) commit a new one. The time limit starts to count when GetMostRecentSnapshot begins. Accordingly, the snapshots that can be deleted are all the snapshots that became uninteresting more than Tr ago.

Reading and running GetMostRecentSnapshot works then fine, provided that the implementations of these methods control if the time limit has not been exceeded when the operations are lasting. The correctness of the commit operation depends, in turn, on the presence of the next snapshot, following after the one that is still considered by a client the most recent one. It can be seen that, if $S_i$ stopped being the most recent snapshot no more than Tr time ago, then $S_{i+1}$ stopped being the most recent snapshot later than $S_i$, thus also no more than Tr time ago.

Each client performing operations on a certain file stores in-memory information about a so-called reclamation tail of uninteresting snapshots; that is, snapshots that should be marked for deletion, but are yet preserved to give enough time to other potential clients to finish their operations.

More specifically, we assume that if snapshot $S_i$ becomes uninteresting when snapshot $S_M$ is written, $S_i$ is not immediately marked for deletion. It will be marked for deletion only after 2Tr from the moment its commit finishes. In other words, the snapshot will remain in the reclamation tail long enough to allow all pending client operations to complete. Although, theoretically, waiting for Tr is enough, waiting for twice as long is performed. This is because the access node's clocks frequencies can be skewed. By the prolongment of waiting, we are able to tolerate even severe time measurement inaccuracies.

"Reclamation Tail Length"

Let us now focus on a situation in which a client using a file, and thus also keeping track of its reclamation tail, crashes. The snapshots in the reclamation tail must not be forgotten, as this would cause severe leaks of storage in HYDRAstor. On the other hand, we also cannot check for existence of all snapshots, starting from snapshot 1 and ending at the most recent snapshot, because of the potentially huge number of snapshots to check. Therefore, a solution is presented that rebuilds the knowledge about the reclamation tail after a crash.

The information required to retrieve the reclamation tail, the reclamation tail length, is always written with a snapshot—in the data part of the retention root. In this way, after a crash, the snapshots in the tail can still be reclaimed. Assuming that the most recent snapshot is $S_M$, the reclamation tail length is defined as the lowest number, k, such that snapshots $S_{M-1}, S_{M-2}, \ldots, S_{M-k}$ together with their path snapshots form the superset of the current reclamation tail.

Thus by keeping the reclamation tail length persistently, the reclamation tail may easily be retrieved by taking k predecessor snapshots of the most recent snapshot, generating their path snapshots and subtracting the path snapshots of the most recent snapshot. The resulting set may, in fact, contain snapshots that have already been reclaimed. However this is a normal issue at the garbage collection stage and has to be considered anyway.

Figure 19A:
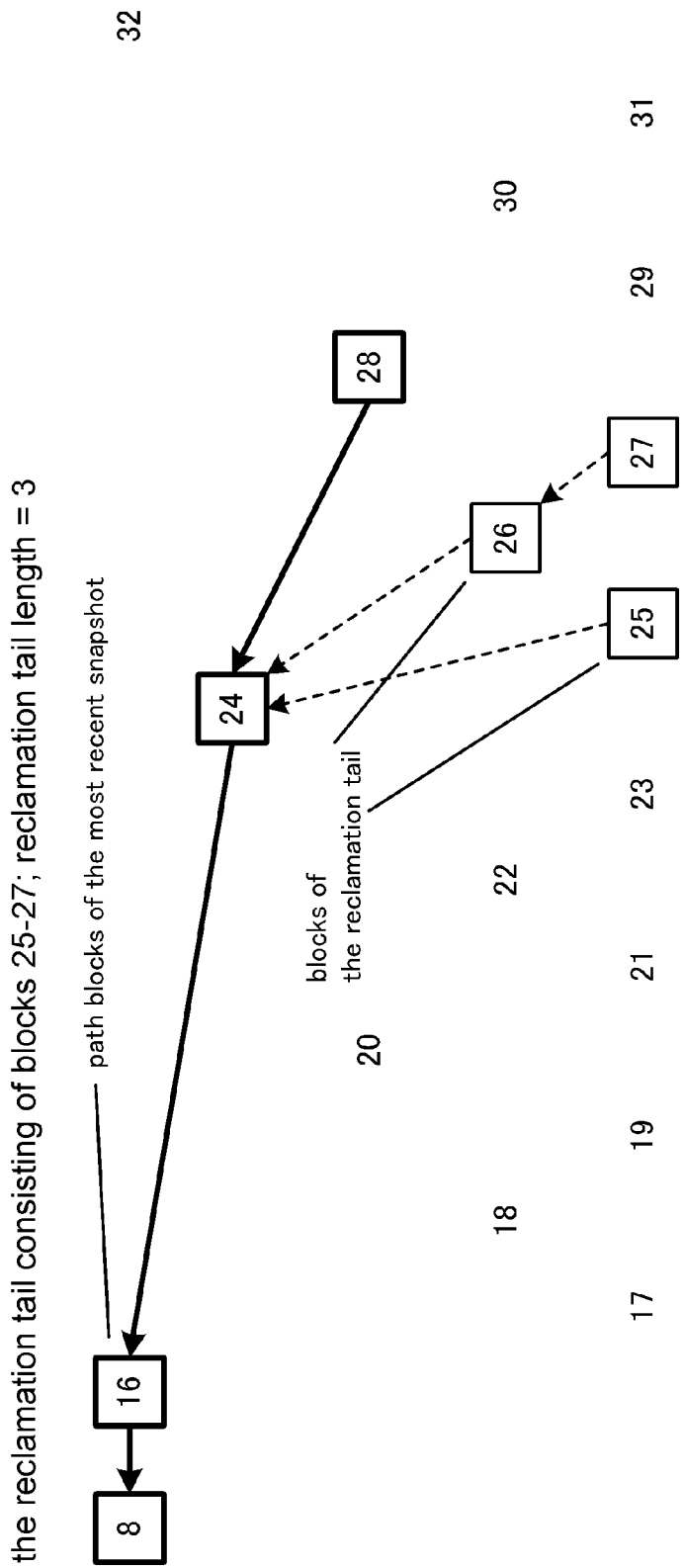
FIG. 19a is a view referred to in the report explained in the second exemplary embodiment of the present invention.

In FIG. 19a the reclamation tail consists of snapshots: 25, 26, 27. The reclamation tail length is 3. In the case of rebuilding the reclamation tail, the path snapshots for snapshots 25-27 will be computed. The path snapshots of snapshots 25, 26, 27 are 26, 24, 16, 8, and snapshots not shown in the Figure—4, 2, 1. Snapshots 1, 2, 4, 8, 16, 24 are also path snapshots of the most recent snapshot. Therefore, they are not added to the reclamation tail. As a result, the reclamation tail consists only of snapshots 25-27.

Figure 19B:
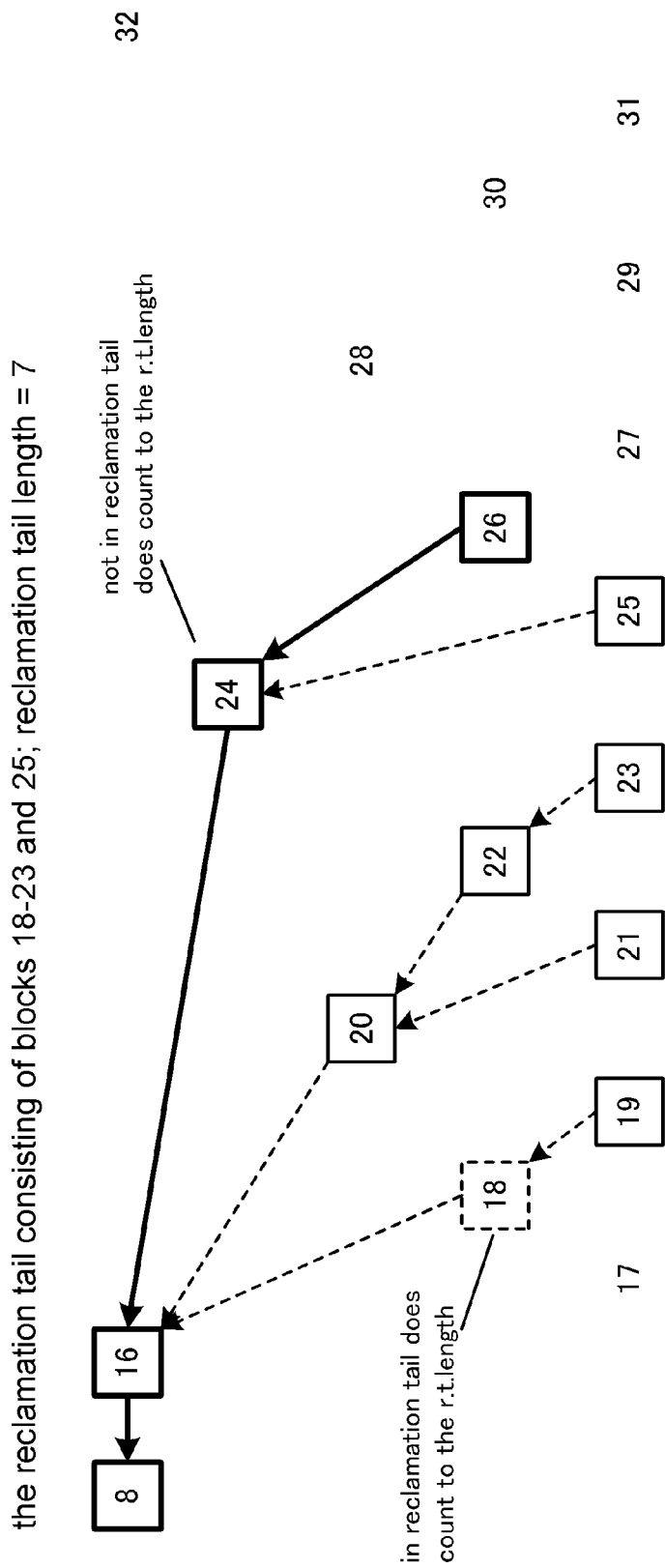
FIG. 19b is a view referred to in the report explained in the second exemplary embodiment of the present invention.

In FIG. 19b, in turn, the reclamation tail length is 7 (the reclamation tail is generated by snapshots 19-25). Snapshot 24 is counted into the reclamation tail length, but it is excluded from the reclamation tail as a path snapshot of the most recent snapshot. Snapshot 18 is not counted into the length, but it is included into the reclamation tail as a path snapshot of snapshot 19, which is counted. Snapshots 16, 8, 4, 2, 1, like in the previous example, are not a part of the reclamation tail, because they are path snapshots of the most recent snapshot. In general, the landmark snapshots are never a part of the reclamation tail—they never become uninteresting snapshots. (FIG. 19: The reclamation tail. Numbers in squares denote existing snapshots. Bold squares and arrows denote most recent snapshot and its path snapshots. Dashed square is not counted into the reclamation tail length, but is a part of a reclamation tail.)

"Keeping Track of the Uninteresting Snapshots"

As it has been stated above, each client that uses a given file keeps the information on its unreclaimed uninteresting snapshots and marks them for deletion whenever possible. Whenever a snapshot is recognized as uninteresting, it is added to a collection with expiration time equal to current time plus 2Tr. An expired snapshot is first marked for deletion (that is, a deletion root corresponding to its snapshot root is written in HYDRAstor), and after it succeeds, it is removed from the collection.

"Working in Context of the Snapshot Operations"

During the WriteSnapshot operation the reclamation tail length is computed. The computations are based on the snapshots held in the collection and an additional most recent snapshot—as it also becomes an uninteresting snapshot when WriteSnapshot succeeds. Then the reclamation tail length is written in the retention root being the snapshot root of the new snapshot. When the commit succeeds, the already former most recent snapshot is added to the collection. Along with the snapshot, most likely the part of its path snapshots—these, which are not the path snapshots for the committed snapshot—is also added to the collection of uninteresting snapshots.

During GetMostRecentSnapshot, the uninteresting snapshots collection is updated based on the reclamation tail length retrieved from the read most recent snapshot. In the case it is the first operation performed on the file by this client, the collection is initialized. When, in turn, the information about the file is already stored, it may be updated when one or more commits have been performed by other clients since the last update. In such a case, some new snapshots arrive in the reclamation tail, as the commits have made some snapshots uninteresting. On the other hand, the reclamation tail may shrink, because the concurrently running clients could have marked some snapshots for deletion earlier and thus they may be removed from the collection. The example of such a reclamation tail update is shown in FIG. 20 (20a, 20b, 20c).

Figure 20A:
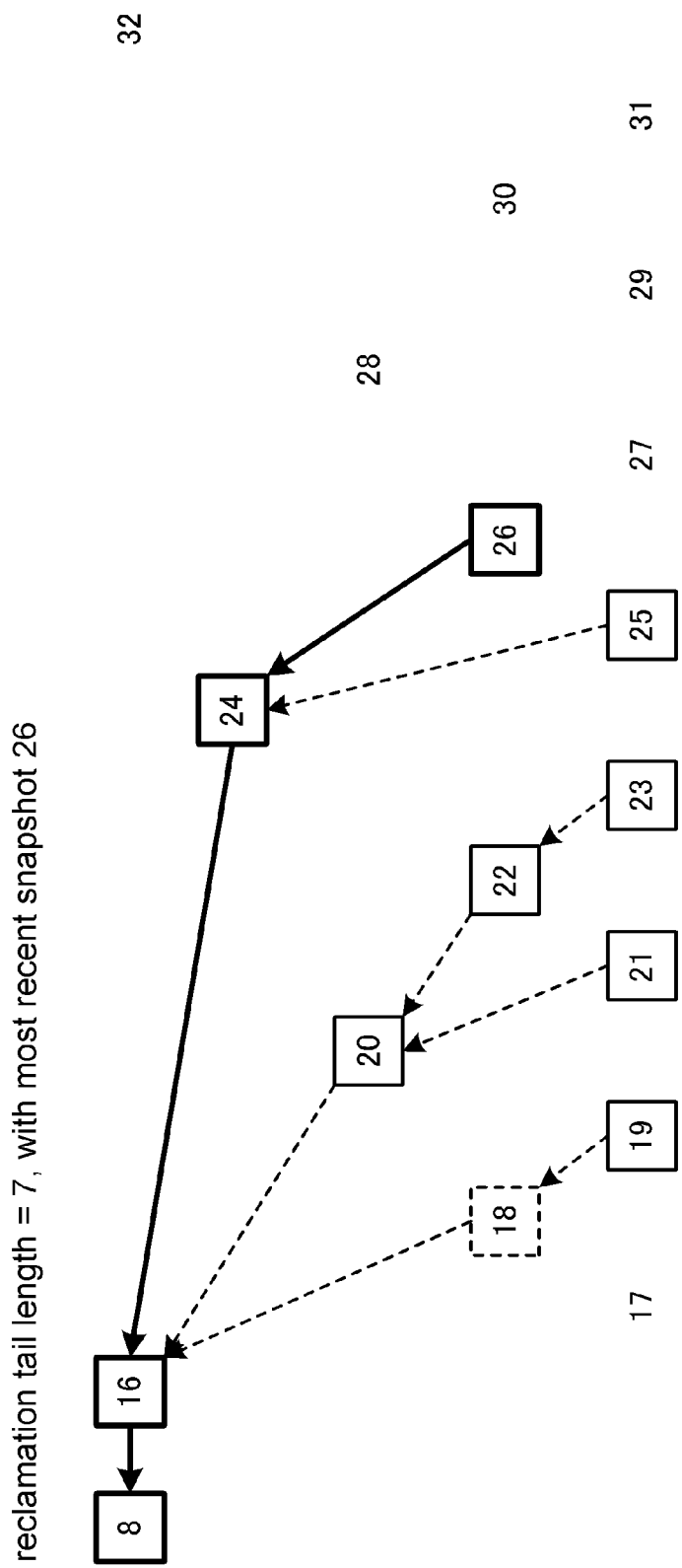
FIG. 20a is a view referred to in the report explained in the second exemplary embodiment of the present invention.
Figure 20B:
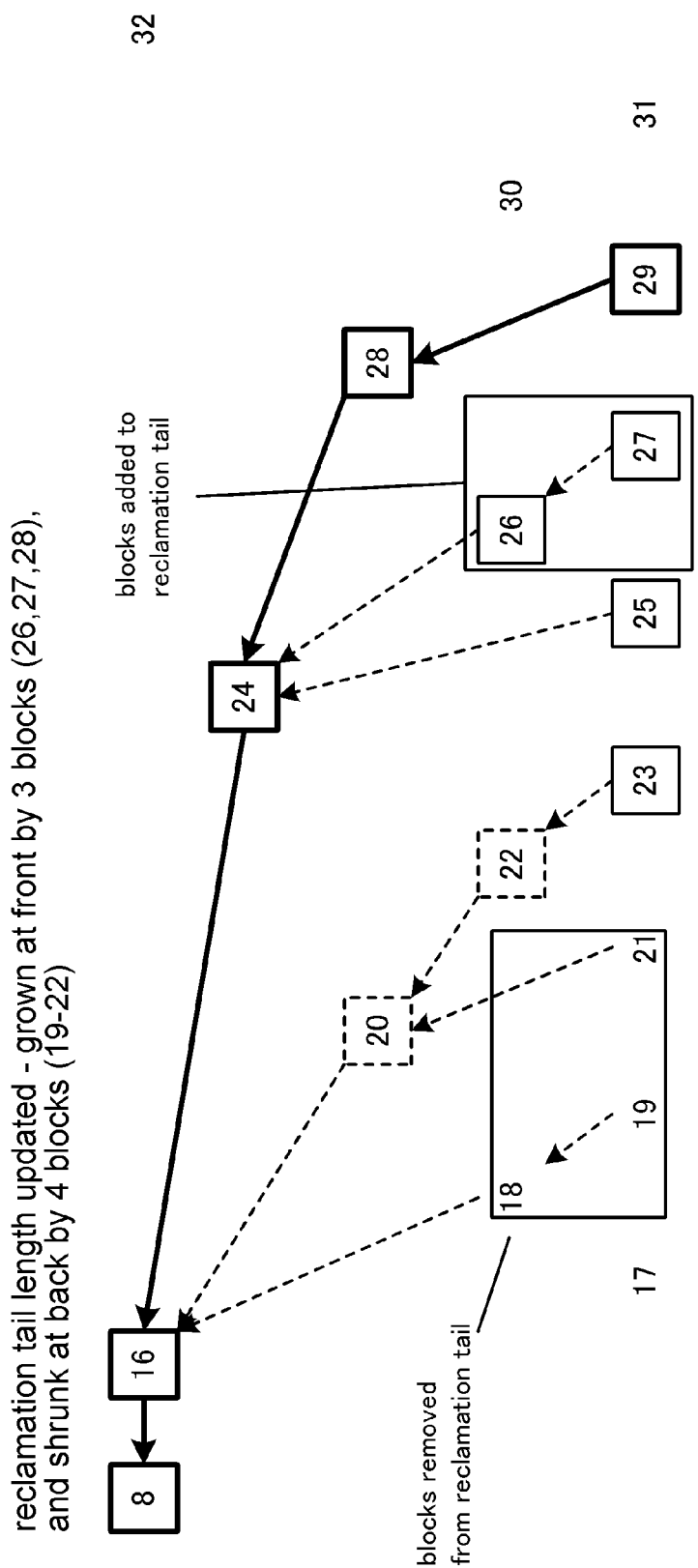
FIG. 20b is a view referred to in the report explained in the second exemplary embodiment of the present invention.
Figure 20C:
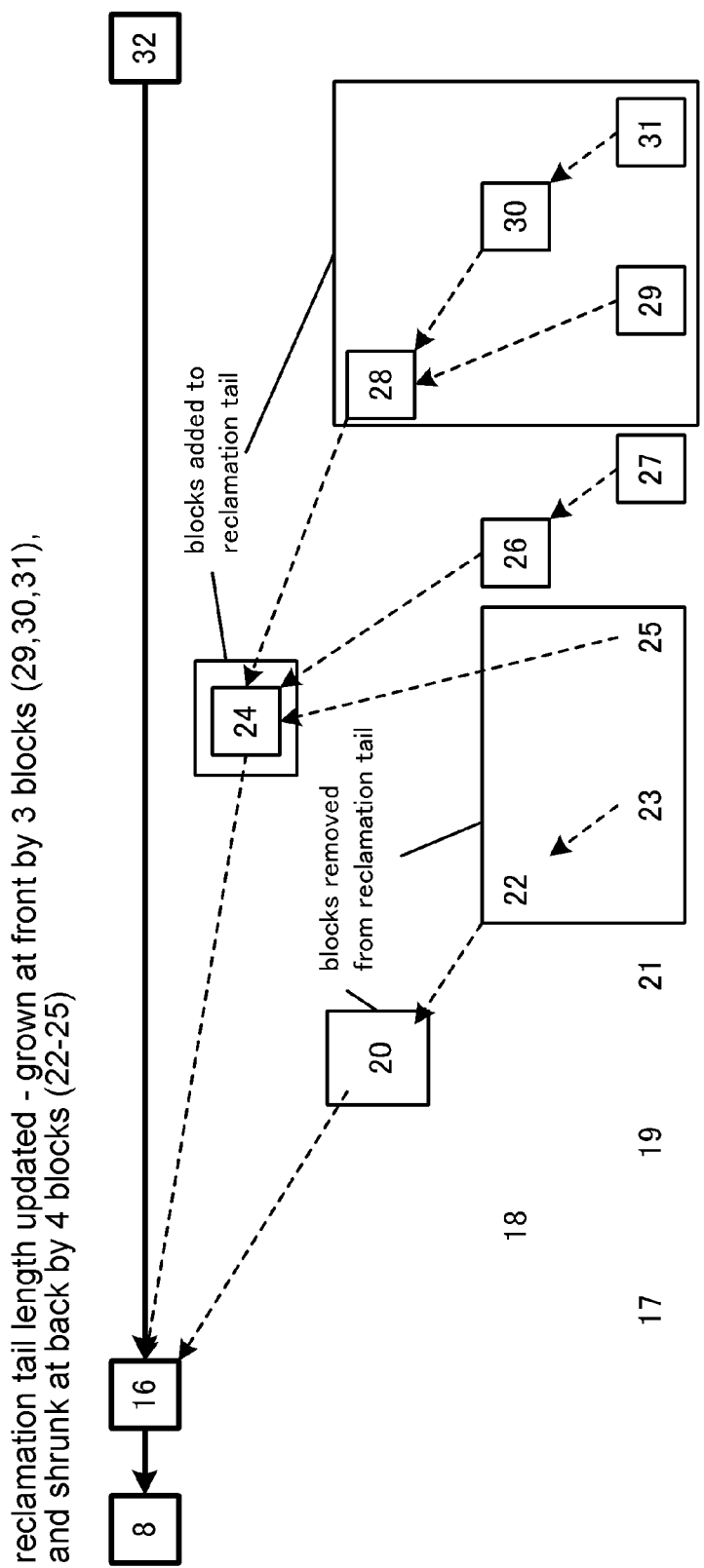
FIG. 20c is a view referred to in the report explained in the second exemplary embodiment of the present invention.

FIG. 20: Update after GetMostRecentSnapshot. Updated items are reclamation tail length and the reclamation tail itself—based on the length. Snapshots in bold are the most recent snapshot and its path snapshots—snapshots that certainly exist. Snapshots in frames are snapshots which possibly exist. Snapshots in dashed frames are snapshots which possibly exist, but are not counted to the reclamation tail length.

(6.3.3. The Marker Blocks)

The landmark and guiding snapshots—the path snapshots of the most recent snapshot—may persist in the system for a significant amount of time (even for the lifetime of the whole file in the case of the landmark snapshots). During their existence they still contain some older versions of the file, which can be of considerable size. However, for each discussed snapshot, after Tr from the moment when it stopped being the most recent snapshot, its role is reduced to determine the path to the most recent snapshot. This was the motivation to introduce the marker blocks.

The marker blocks are retention roots having no content. The basic idea of the optimization is that they are saved along with the standard snapshots making a mirror sequence of retention roots. This sequence may used in GetMostRecentSnapshot operation instead of the standard snapshot roots. Now all the landmark and guiding snapshots can be reclaimed as long as they are not a part of the reclamation tail, after Tr time, as if they were uninteresting snapshots. The details of the marker blocks optimization are out of the scope of this thesis.

<Chapter 7>

(The Arrangement of Files into a File System)

Files in HydraTFS are organized into a file system-like directory structure. This makes their usage more convenient for the clients. Moreover, such a solution enables organizing the files efficiently and in a scalable way. For example, whenever a client wishes to have his private files stored in a system, he may create a separate directory for them (not accessed by any other client) and, as a result, minimize the concurrency issues during adding or removing a file. None else (except, maybe, the garbage collector—described in Section 7.3.2) would touch the directory and made any conflicting changes.

(7.1. Files and Directories)

The directories are implemented as files, but with a special content, hidden from the user. Therefore, whenever we say about a "file" in this chapter—we may refer to either a regular file or directory. Each directory contains a list of entries corresponding to files and subdirectories—its children in file system tree. Each entry corresponds to a record and contains:
- the client-defined name of the file,
- the file type, denoting if entry corresponds to a regular file or a directory,
- a File ID.

A File ID is an identifier, that may be thought of as Mode number in a traditional file system. It is generated in such a way that it is always unique, irrespective of the place or time it is created. This identifier (suffixed with a snapshot's sequence number) is then used as a search key for each retention root staying for root of the snapshot's tree structure.

(7.1.1. File Operations)

The following operations are possible on a file system.

"Open an existing file" The OpenFile operation, given a file path, returns a FileHandle, a handle for an existing file. Such a handle is required to perform all further operations. The file path is a string similar to paths in traditional file systems (e.g. "/aDirectory/aSubdirectory/aFile").

During the Open operation, the file path has to be resolved. That is, all parent directories, starting from root directory have to be opened and their entries have to be read. For instance, having a path "/a/b/c/file" to get a File ID of file, it is required to read entries of directory c. But to read directory c it is required to have its File ID. It is hence required to read entries of directory b, and so on, up to the file system root. The file system's root File ID, is constant, thus it does not need to be retrieved from anywhere.

"Create a file" The CreateFile operation, given a FileHandle of a parent directory in file system structure, creates a regular file or directory having the requested name in the parent directory.

"Access contents of a regular file" The ReadFile operation given a FileHandle of a regular file, runs the GetMostRecentSnapshot to search for the most recent snapshot of the file and provides an interface enabling Read and Append operations on file contents. These are the same operations as described in Chapter 5. The mentioned interface provides also CommitFile operation, that runs a Commit operation for file content and then doesWriteSnapshot in order to create a new regular file's snapshot.

"List a directory" The ListDirectory operation returns a list of regular files and directories present in a directory specified by FileHandle.

"Remove a file" The RemoveFile operation persistently marks a file or directory for removal. The method for file removal is omitted for now. As it is slightly more complex, it will be described later, separately.

(7.1.2. Atomicity of File System Operations)

The file system, and thus every file, is accessed in parallel from different access nodes. In particular, the operations modifying the directory contents (CreateFile and RemoveFile) may be performed concurrently.

As we want the directory entries to be consistent all the time, while performing modifications on them we use the transactional mechanisms described in the previous chapter. In case a transaction fails, we simply repeat the operation—that is, read the directory contents, perform the necessary modifications, and write a new snapshot with directory entries. The repeats are performed internally, thus are invisible to a client.

Such restarting of directory operations may cause the operation latencies to be relatively large for directories that are often modified by many different clients. Therefore it is recommended for the clients to avoid keeping such directories that are often modified concurrently. The file system structure allows for creation of many directories and therefore it is better to spread the concurrently accessed structure as much as possible, at best having a directory modified only by a single client.

(7.2. Removal of File)

The removal of a file in HydraTFS may be split into two separate stages. The first one is marking the file for removal. After this operation, the file is no longer visible and accessible—it is not visible to clients as a directory entry and cannot be opened. Internally, the file marked for removal still exists as a directory entry, but it is placed on a list of children marked for removal, instead of a list of existing files.

The second stage, described in detail in the next section, is removing the file physically, that is, marking all the snapshots and marker blocks constituting the file for deletion in HYDRAstor. In the case of a directory, all children are removed as well, that is, directory removal is recursive. After that the entry can be wiped from the list of children marked for removal.

Before the algorithm can proceed into the second stage, that is, marking snapshots for deletion, it must be ensured that none uses the file to be removed. We will discuss the relevant mechanisms shortly.

The first stage is in practice the RemoveFile operation executed by the user. The second one, in turn, may be performed later, in a garbage collection routine.

(7.3. Removing the Marked Files)

When a file is marked for removal, it is required to ensure that it is no longer read or written. In a nutshell, the mechanism is that the FileHandles held by clients have to be refreshed periodically (let us define the period as Th) to ensure that the file to which the handle still exists (that is, has not been marked for removal). If the file is marked for removal, a client can no longer operate on it. To ensure that the file is not operated on, a wait is performed for a period longer than the FileHandle refresh period. The wait duration is established as 2Th.

After ensuring that the file is no longer operated on (i.e. read or written), an attempt may be performed to remove it, that is, write deletion roots to all of snapshot roots of its existing snapshots and all marker blocks. In the case the file is a directory, also all child regular files and directories have to be removed recursively, before the entries will be removed. Note that even though the file is no longer read or written, it may be being removed concurrently by many processes.

At the beginning we focus on the algorithm that marks for deletion all snapshots and marker blocks of a given file. Then we will proceed to describe of the removal process in the scope of a file system.

(7.3.1. Removal of a Single File)

Removal of a single file, like removal routines in general, may be performed by many processes concurrently. Moreover, similarly to every operation of HydraTFS, it may be interrupted at any time. In such a situation, no HYDRAstor block leaks are tolerated. On the other hand, writing deletion roots to nonexisting retention roots and writing multiple deletion roots to retention roots is allowable.

The method for removal of a file works in three steps. At first, the whole reclamation tail is marked for deletion. The length of the reclamation tail can be retrieved, as normally, from the reclamation tail length value stored in the snapshot root of the most recent snapshot.

When the whole reclamation tail is marked for deletion in HYDRAstor, the blocks left are marker blocks on the path to the most recent snapshot, and the most recent snapshot itself with its marker block as well. The second step is marking for deletion of the most recent snapshot.

In the last—third—step, in contrast to marking for deletion of reclamation tail snapshots and marker blocks in the first step, where all deletion root write requests could be issued in parallel, now a specific order of marking blocks for deletion is required. One by one, all the most recent snapshot's path snapshots can be marked, starting from the ones written most recently (with highest numbers) and ending at the snapshot number 1.

Figure 21B:
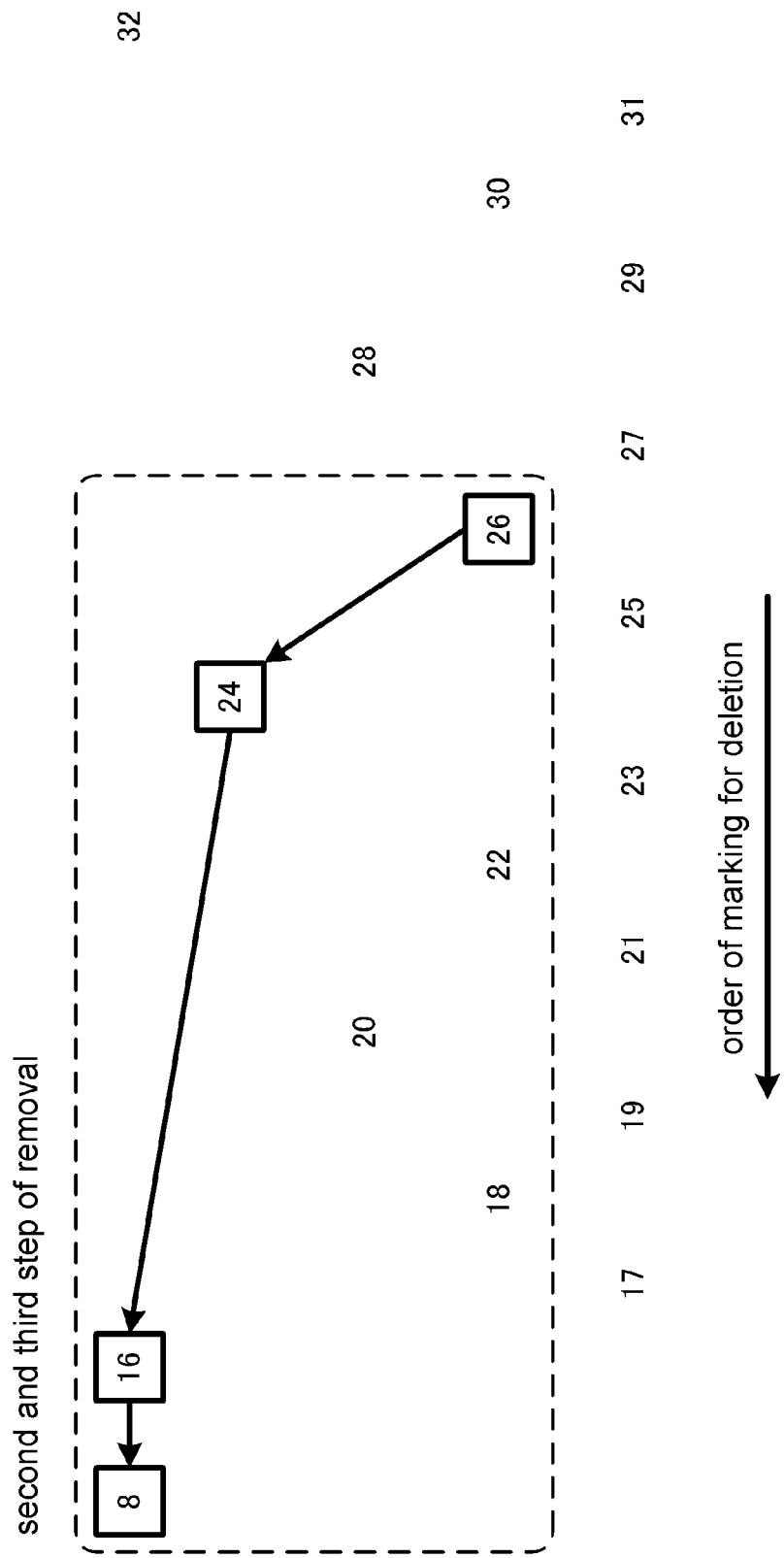
FIG. 21b is a view referred to in the report explained in the second exemplary embodiment of the present invention.

In FIG. 21, the three steps are illustrated. The most recent snapshot of the presented file has number 26, and reclamation tail consists of snapshots 19-23 and 25. In the first step, shown in FIG. 21a, the reclamation tail is marked for deletion: 19, 20, 21, 22, 23, 25. Then, in the second and third step (FIG. 21b), the most recent snapshot (26) and then its path snapshots (24, 16, 8, 4, 2, 1) are marked for deletion. (FIG. 22: Order of marking for deletion the snapshots during file removal.)

"Crash During Removal"

A process removing a file may crash during one of the following steps of execution:

while marking for deletion the reclamation tail,
while marking for deletion the most recent snapshot,
while marking for deletion the marker blocks.

If a crash occurs during the first step, after a restart the identical reclamation tail is computed—based on reclamation tail length stored in the most recent snapshot. Accordingly, the step 1 is repeated from the beginning with no harm.

When a crash occurs before successful writing the deletion root pointing to the most recent snapshot, the same principle as to the step 1 applies. Therefore, unfortunately, after a restart the whole step 1 has to be needlessly repeated. When, in turn, a crash occurs after writing the deletion root, the process after a restart immediately proceeds to step 3.

In step 3, the only blocks left are marker blocks. As the blocks are marked for deletion in order from the last visited to the first visited during dual binary search, when marking them for deletion is interrupted in the middle, the dual binary search will return the block, before which the deletion has stopped. Accordingly, the deletion restarts safely.

Please note, that the GetMostRecentSnapshot procedure has to take into consideration the existence of retention roots that have been marked for deletion (as it has been described in Section 2.4.4). When an error status denoting that a retention root has been marked for deletion is returned by HYDRAstor while reading, the algorithm should treat it in the same way as a block which does not exist.

"Concurrency"

Marking snapshots and marker blocks of a single file for deletion may be performed in parallel by multiple processes. In such a situation, it works similarly as after a crash. After determining a set of blocks to mark for deletion by performing GetMostRecentSnapshot and reading the reclamation tail length from most recent snapshot if it still exists, the process simply writes the deletion roots in a specified order. The only drawback is that deletion roots can both be written to nonexisting retention roots or to retention roots that already have corresponding deletion roots—written by concurrent processes. However, in HYDRAstor it is a tolerable behaviour.

(7.3.2. Removal of Files on File System Level)

Removing files in the scope of the file system is essentially an operation which, for a given directory, removes all children marked for removal. Afterwards, the removed files are wiped from the directory entry list. This operation may be either triggered when RemoveFile operation succeeds or performed in a periodic file system scan. However, a combination of both methods is preferred. With triggering, the files marked for removal will be removed quickly. Periodic scans of the whole file system, in turn, ensure that no removed files last forever. This is possible in the case a process marked files for removal, but crashed before actually removing them.

Let us now dig into the details of this operation. The removal of files marked for removal in a directory works as follows:

1. The directory entries are read.
2. A set of children to remove, C, is initialized to be the list of directory's children marked for removal.
3. The removing process waits for 2Th to ensure that no file in C is accessed by users.
4. For each file in C, the removal of snapshots, described in Section 7.3.1 is done (possibly, in parallel).
5. It is ensured that the directory has not been marked for removal or removed in the meantime (if it has, the procedure terminates); this is performed by reopening the directory.
6. The directory is read once more—the entries in the list of children marked for removal, contained in C are removed and a new snapshot of directory entries is transactionally committed; the step is repeated until the commit succeeds.

The reopen performed in step 5 is necessary, because the directory could have been removed by another process in the meantime. In such a situation, committing a new snapshot of directory's entries would cause a leak of the committed snapshot.

In the case the child removed in step 4 is a directory, not a regular file, before its snapshots are marked for deletion, also the contained files have to be removed. Therefore the following steps are performed before the snapshots of a directory can be marked for deletion:

1. the directory entries are read (another instance might have already marked the snapshots of the directory for deletion—in such a case this read will not succeed, but this is not a problem, though—we may simply proceed to marking directory's snapshots for deletion),
2. for each child c, regardless if existing or marked for removal, a removal of c is performed; (moreover, in case c is a directory, this operation is executed recursively).

<Chapter 8>
(Preliminary Evaluation)

This chapter presents the results of experiments performed with HydraTFS. The implementation was not completely finished during the experiments. The important fact is that it lacked some optimizations which have a major impact on the performance of the whole file system. Nevertheless, the experiments reflect well the behaviour of HydraTFS in various settings.

(8.1. Implementation)
(8.1.1. Present Features)

At the time when the experiments were performed, most of the core functionality has been implemented. The only exception is marking snapshots for deletion which still was under development. Therefore, neither the reclamation tail deletion nor the file remove operation could be evaluated. Despite the deletion was not functional, the marker blocks, described in Section 6.3.3 were already present.

The evaluated implementation missed some major optimizations, though. The HYDRAstor requests were not sent in aggregated bundles. Instead they were processed one after another, which significantly reduced the performance, especially the data transmission bandwidth. For the GetMostRecentSnapshot operation only the basic, linear algorithm described in Section 6.1 was implemented.

(8.1.2. Technology)

The implementation was developed in C++. The binary used in the tests was compiled with GCC compiler, version 4.1.2 with the highest optimization level (—O3). The implementation made use of the Boost library, version 1.33.1.

HydraTFS has been implemented as a single-threaded module in a multithreaded application which uses a message passing interface as a communication medium. The communication with HYDRAstor is performed by a proxy, implemented in another module of the same application. Both modules, that is, the proxy module and HydraTFS, module may run in parallel and communicate via message passing. The communication between the proxy and HYDRAstor is via a network socket, hosted by another, dedicated thread.

(8.2. Test Environment)

The experimental setup consisted of a single HYDRAstor appliance consisting of one access node and two storage nodes. Each node had two quad-core, 64-bit, 3.0 GHz Intel Xeon processors. The access node had 8 GB of memory and storage nodes 24 GB each. The access node was equipped with two 15K RPM SAS hard disks using hardware RAID. These disks were used for logging during the tests. All computers were running a 2.6.18-128 Linux.

(8.3. Experiments)

The experiments were performed on a clean HYDRAstor system, with no user data loaded. No other processes have been using HYDRAstor during testing. Each record saved to HYDRAstor was filled with random data. This helped to minimize the number of situations in which a regular block with identical data already resided in HYDRAstor. In such a case the write operation may possibly finish significantly faster due to deduplication, which can distort the results.

(8.3.1. Bandwidth of Record Appends to a File)

In this experiment the bandwidth of record appends was measured. A single regular file containing 128 MB of data was created in each of the test cases. A series of writes was followed by a single commit at the end.

Figure 22:
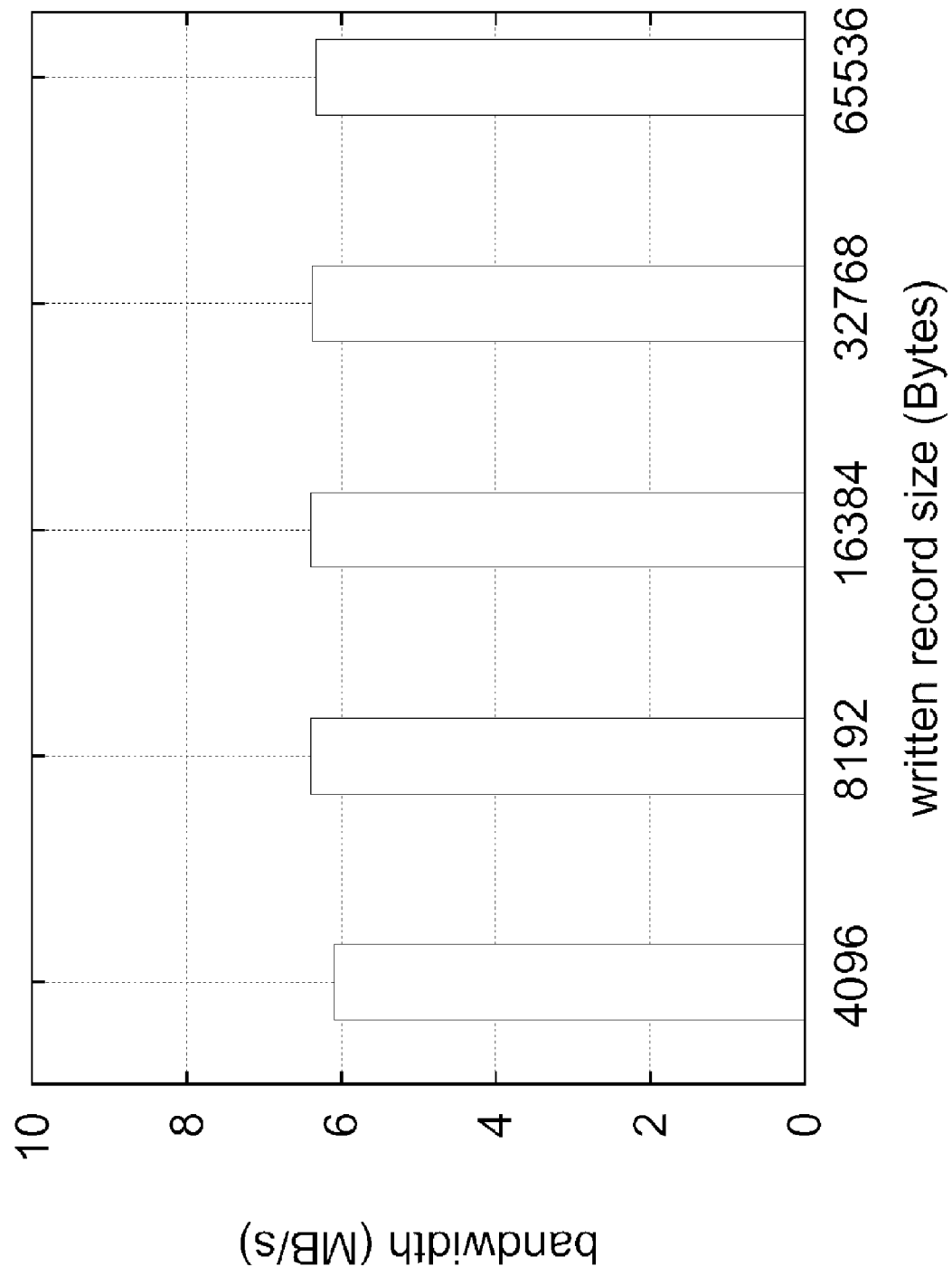
FIG. 22 is a view referred to in the report explained in the second exemplary embodiment of the present invention.

The cases presented in FIG. 22 differ in the size of records written to the file system. The differences of bandwidth are not, however, significant, because no request is sent to HYDRAstor until an entire regular block can be filled. In other words, the amount and sizes of HYDRAstor requests, which are the main factor influencing the bandwidth, are the same in all the cases. (FIG. 22: Bandwidth of record appends to a file.)

It is worth noting that the resulting bandwidth—about 6 MB/s—is very low in comparison with the bandwidth of a single access node in the HYDRAstor system which is over 100 MB/s. This should improve after the introduction of the missing request aggregation (see Section 8.1.1).

(8.3.2. Bandwidth of Record Appends and Commits)

This experiment is similar to the previous one, but after each append the changes were committed (CommitFile was performed). A single regular file containing 8 MB of data was created in each of the test cases.

Figure 23:
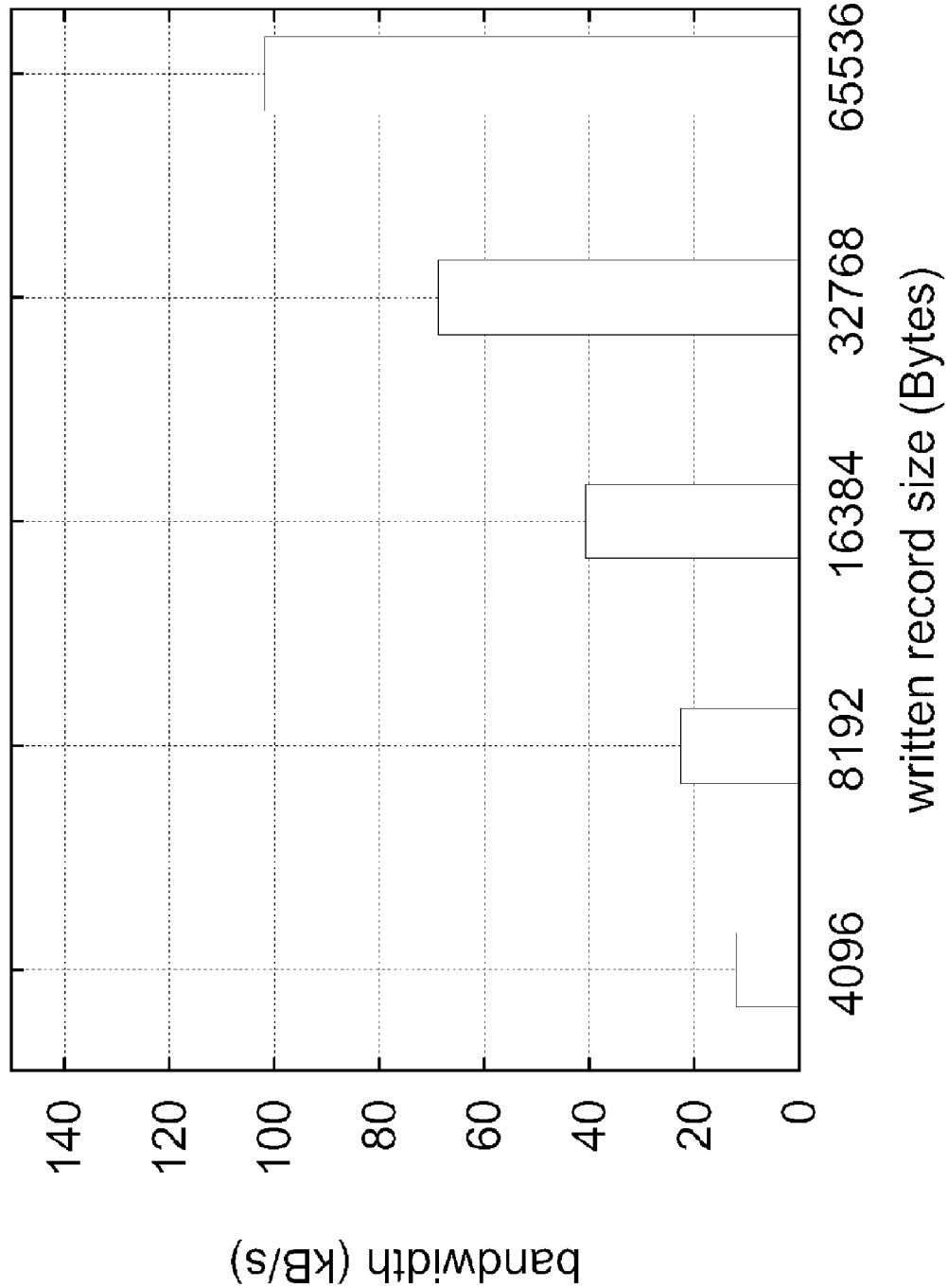
FIG. 23 is a view referred to in the report explained in the second exemplary embodiment of the present invention.

As it can be seen in FIG. 23, the bandwidth is related to the size of the appended record, and, consequently, the number of commit operations. The larger the record, the less commits are made. The commit is a costly operation, because it implies waiting for all pending HYDRAstor's write regular block requests related to a modified file. (FIG. 23: Bandwidth of record appends with commits.)

Apart from that, some data may be written multiple times to HYDRAstor. Let us consider a record which is smaller than the maximum regular block size (64 kB). When a commit has to be performed, it has to be saved to HYDRAstor. However, when further appends are issued, some data (one or many records or a part of a record) may be put to the block together with this record. Then, when another commit is issued, the same record is written to HYDRAstor again in a new regular block. Such a situation can be repeated for multiple times until the block is filled completely with records.

(8.3.3. Bandwidth of Reads)

In HydraTFS, after opening a regular file, a read can be performed on the file. A user specifies the number of records to be read at once and receives their contents in a single reply when all of them are read. The following requests return consecutive records. That is, the file is read sequentially. The snapshot's structure is iterated over one regular block at a time—no read-ahead or any other optimization is employed. In this experiment the read bandwidth was measured for various numbers of records requested to be read in a single request. A 128 MB file consisting of 4096 records, 32 kB each and a single snapshot was being read.

Figure 24:
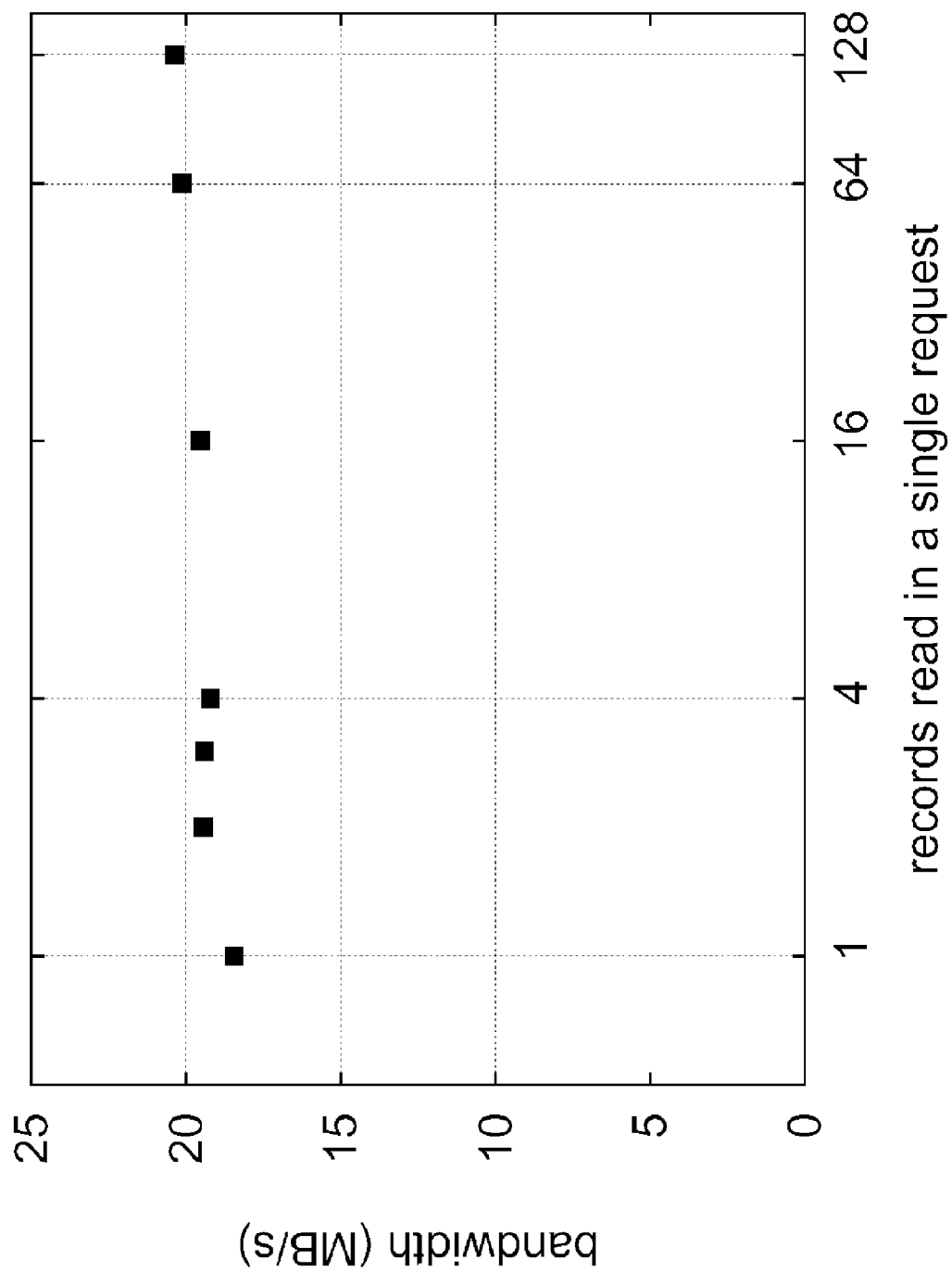
FIG. 24 is a view referred to in the report explained in the second exemplary embodiment of the present invention.

The results show that the bandwidth does not change significantly with the increase of the request size. It increases slightly when larger requests are sent and this is related to a decrease in the processor usage related to a lower number of HydraTFS requests. However, the number of HYDRAstor regular block read requests remains the same. Like in the case of appends, the read bandwidth should improve after the introduction of the missing request aggregation. (FIG. 24: Bandwidth of reads.)

(8.3.4. Duration of GetMostRecentSnapshot)

Figure 25:
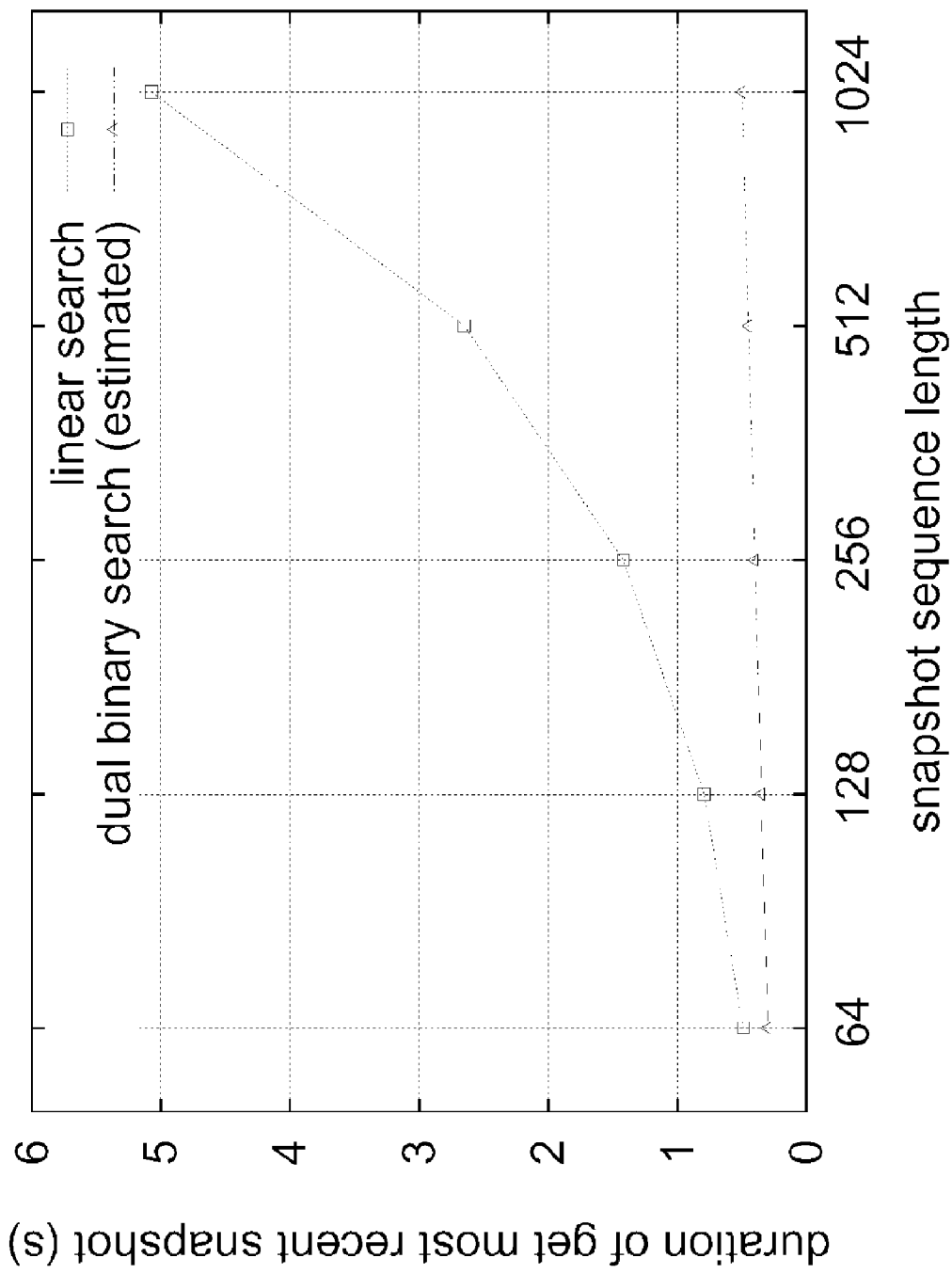
FIG. 25 is a view referred to in the report explained in the second exemplary embodiment of the present invention.

In this experiment, the time of GetMostRecentSnapshot was measured. In the test cases a file with a varying length of the snapshot sequence was created. Then an algorithm searching for the most recent snapshot in such a file was executed, and its duration has been measured. For the dual binary search algorithm, described in Section 6.2 an analytical estimate has been made. The results are shown in FIG. 25. (FIG. 25: Time to retrieve the most recent snapshot.)

The differences between the algorithms are not large when read as absolute values. They may, however, become much more significant. The experiments were performed on a system which is not loaded and the latency of HYDRAstor's retention root read requests—the predominant operations—was in the order of tens of milliseconds. It can, however, grow significantly when the system is loaded. In such a situation it may exceed one second.

(8.3.5. Duration of Operations on a Directory)

Figure 26:
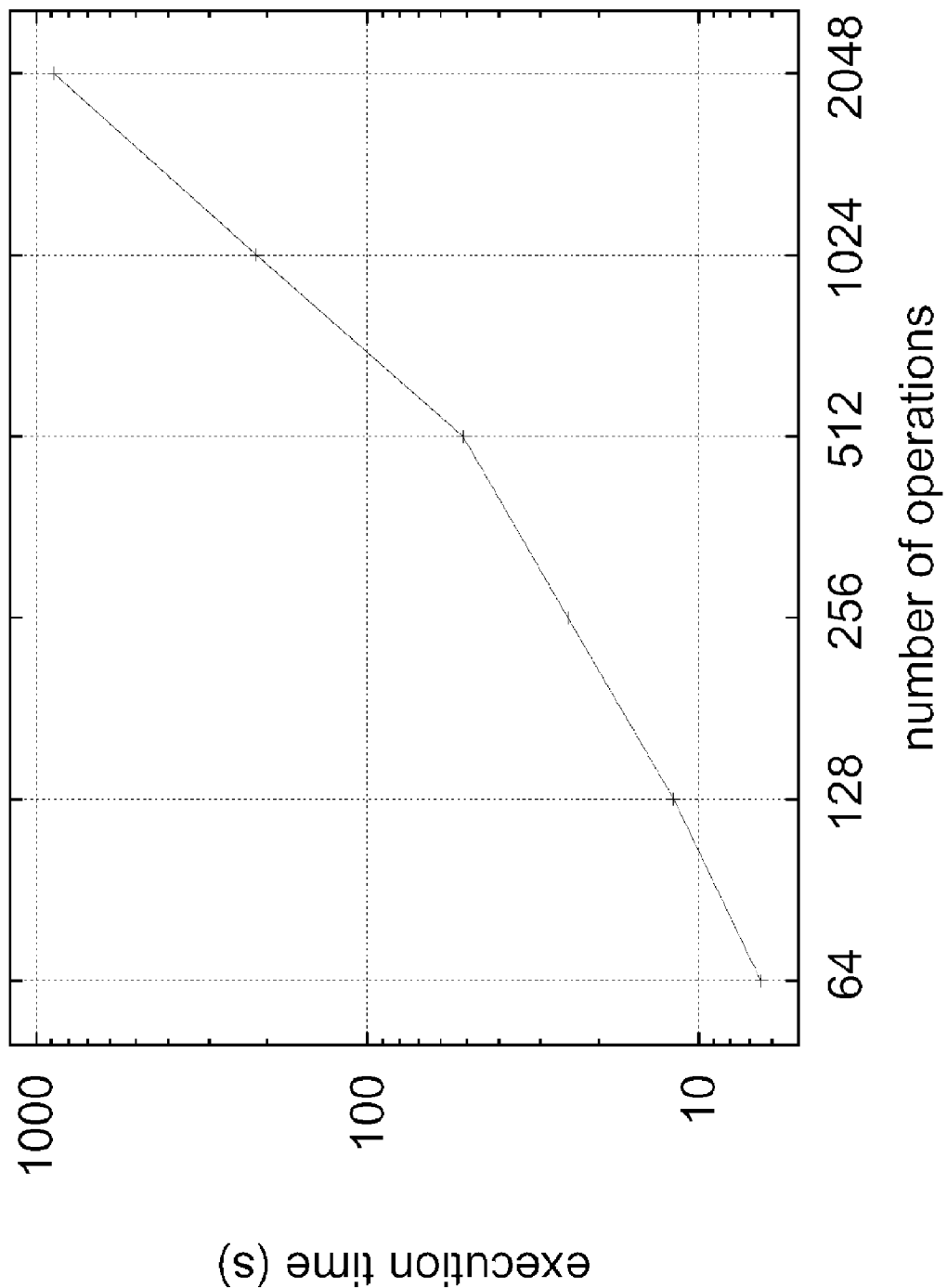
FIG. 26 is a view referred to in the report explained in the second exemplary embodiment of the present invention.

In this experiment a number of subdirectories have been created in a single directory. The subdirectory creation requests were issued one after another. The test cases differ in the number of subdirectories created (FIG. 26). (FIG. 26: Time of "create directory" operations performed by a single thread.)

Figure 27:
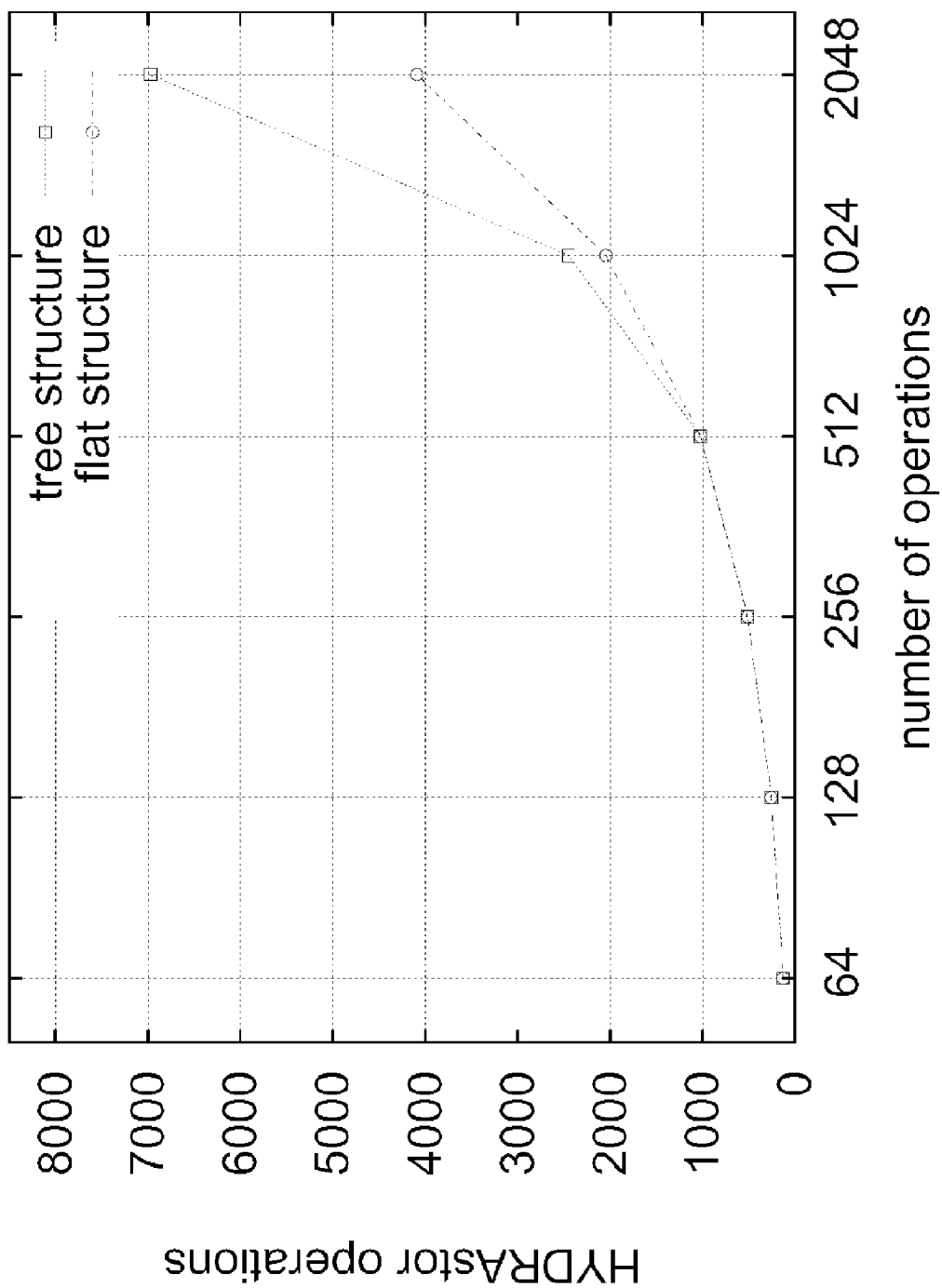
FIG. 27 is a view referred to in the report explained in the second exemplary embodiment of the present invention.

It can be observed that, for a large number of subdirectories, the average time of a single operation is relatively higher. For a small number of subdirectories, the speed is about 10 operations per second, but when 2048 subdirectories are created, it drops to between 2 and 3. It may be explained by the fact that when the size of directory entries stops to fit in a single retention root, creating a subdirectory involves reading and writing more blocks, because the parent directory's entries are stored in regular blocks pointed to by a retention root. In such a situation the number of HYDRAstor operations increases (FIG. 27). (FIG. 27: Increase in the number of operations when the tree grows—in comparison with the flat structure.)

(8.3.6. Duration of Parallel Operations on Directories)

Figure 28:
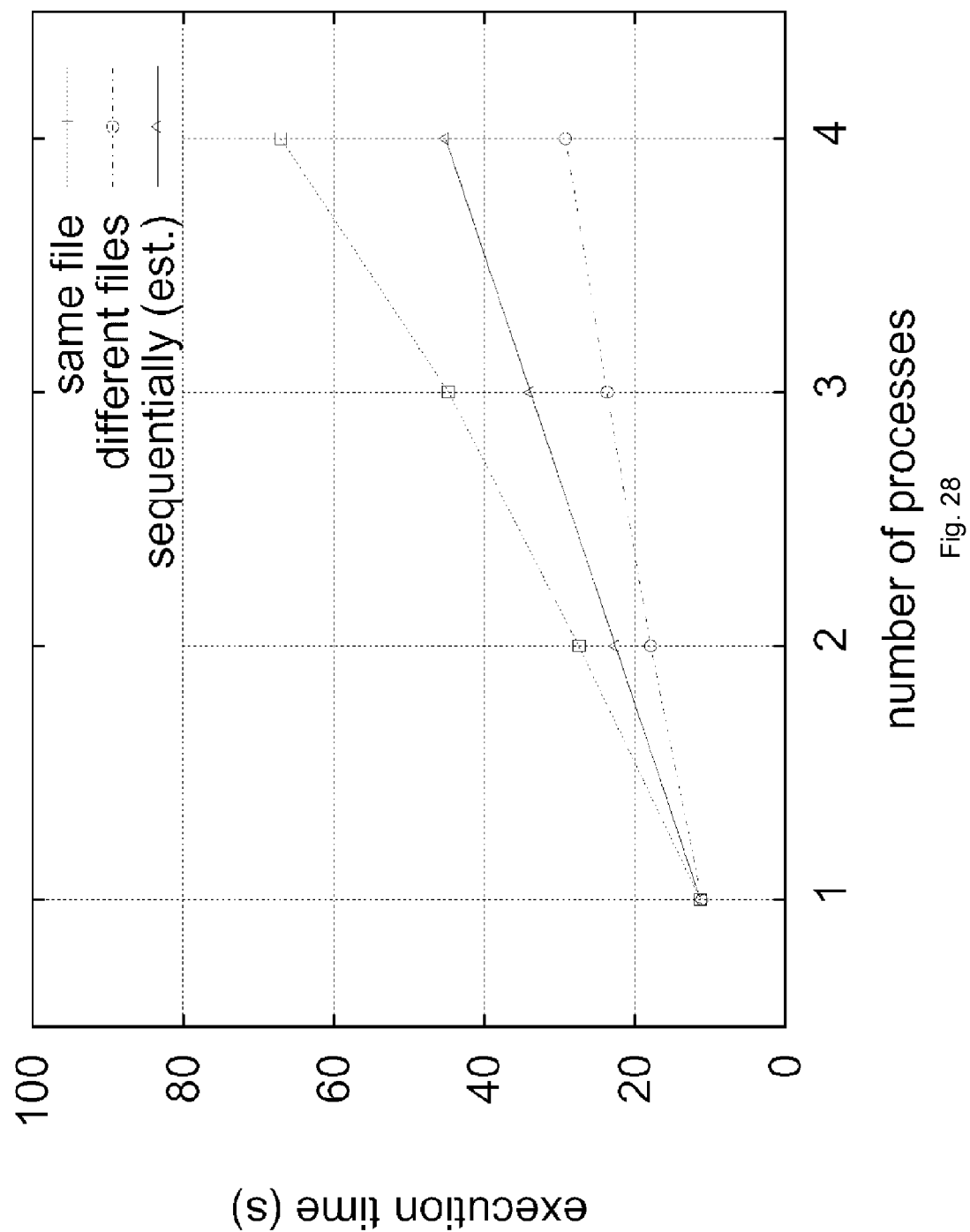
FIG. 28 is a view referred to in the report explained in the second exemplary embodiment of the present invention.

In this experiment multiple processes were involved. Each process created 128 subdirectories of one directory, common for all processes. The number of writing processes varied among the test cases (FIG. 28, "same file"). (FIG. 28: Comparison of time of "create directory" operations.)

This experiment shows the cost of parallel write accesses to the same directory. Increasing the number of accessing processes implies a significant decrease in the performance. This is caused by the fact that some operations have to be restarted due to the concurrent access. Therefore the number of block operations in HYDRAstor increases (FIG. 29b).

In another experiment a variable number of directories was operated on—each one by one process (see FIG. 28, "different files"). Despite a slowdown related to the increase in the number of threads, the performance of operations on multiple directories is significantly higher than in the case of a single directory.

For comparison an estimation, which presents the time of operating on the same number of directories by a single process sequentially is shown in FIG. 28. As it can be expected, a number of operations performed on a single directory by a single thread lasts shorter than the same number of operations performed in parallel by multiple threads, because no conflicts are present, and therefore, no operation has to be restarted.

(8.3.7. Opening a Directory Situated Deep in the Tree)

In this experiment a directory structure of a varying depth was being created. Each directory consisted of one snapshot and its entry list consisted of either zero entries (the leaf directory) or one entry (the remaining directories).

Figure 30:
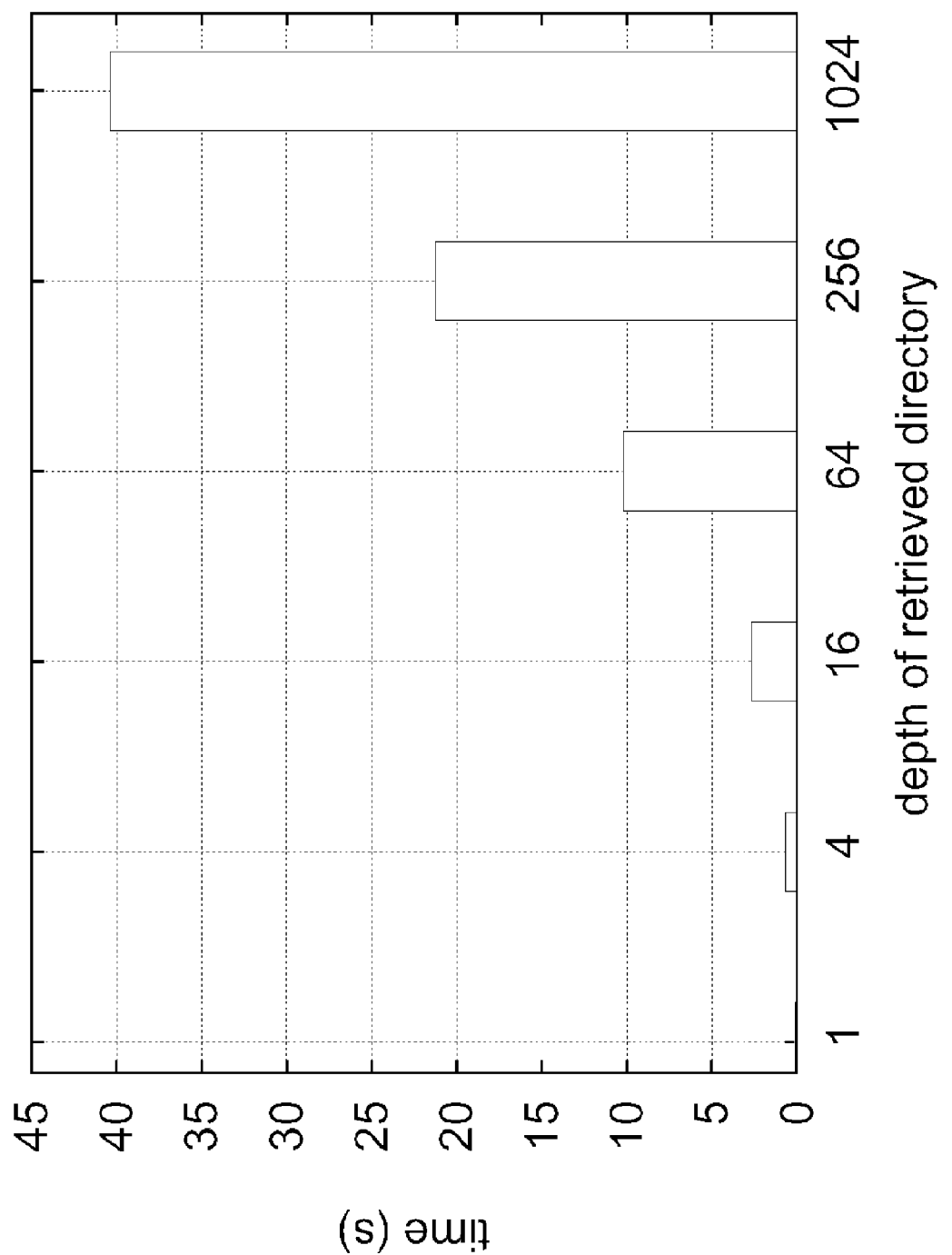
FIG. 30 is a view referred to in the report explained in the second exemplary embodiment of the present invention.

The time of retrieval of the leaf directory given its path (that is, OpenFile operation on "/level1Dir/level2Dir/ . . . /levelNDir") is shown in FIG. 30. It can be seen that the opening time grows when files are situated deeper in the structure. This is because in such a structure all directories on the path to the target directory have to be opened sequentially, that is, at first "/", then "level1Dir", "level2Dir" and so on.

Although Open may be time-consuming, the performance of other operations on a directory or a regular file in such a deep location does not differ from the directory located anywhere else. This is because, after opening, each file is referred to by its File ID and there is no need to read any of its parent directories to retrieve or update its contents.

<Chapter 9>

(Related Work)

(9.1. HydraFS)

The Hydra File System "HFS" similarly to HydraTFS, runs on top of HYDRAstor. The major differences between these file systems are design goals. HydraFS is a filesystem that aims at high read/write streaming performance, as its major application is being a part of a backup appliance. Moreover, it provides a typical Unix file system interface and therefore may be freely used as a standard, general-purpose file system. In contrast, HydraTFS works as a module of an application.

The other fundamental difference is that HydraFS is accessed only from one access node at a time. In contrast, HydraTFS can be accessed from all access nodes at a time. The persistent layout of HydraFS is structured as a single tree with a root, the superblock, represented by a retention root. The superblock points to the root of the Mode map structure, which contains all files and directories, sorted by Mode number.

Each Mode map entry, in turn, points to a tree constituting a single file. This tree is similar to that of a single snapshot in HydraTFS. This architecture eases preparing easily the snapshot of the whole file system—it is enough to preserve the retention root of the file system tree instead of deleting it when it becomes outdated. As the blocks of the tree have to be aggressively cached in order to achieve a satisfactory performance, and as the write to a file involves modifying all blocks in the tree on the path up to root, HydraFS may perform poorly at operating on multiple files simultaneously. In the case of HydraTFS, in turn, the files are independent and operations on different ones do not interfere at any level.

An important reason excluding HydraFS from being an alternative for HydraTFS is the fact that HydraFS cannot store HYDRAstor content addresses—only raw data bytes are allowed. Apart from that, it is not transactional, therefore the usage of HydraFS would require introduction of an additional layer, for example, a database. Finally, as HydraFS is accessible from a single AN at a time, connections between this access node and the others would be required. There is no such a requirement in HydraTFS.

(9.2. Other Solutions)

Several existing file systems have been created in order to achieve high availability. Ivy "Ivy" is a decentralized peer-to-peer file system. Each user (placed around a distributed hash table) writing data to file system keeps a log of his modifications. All participants scan the logs of others and apply changes to their private snapshots. In the case of a network partition, multiple versions of a file system may appear. In such a situation, an external conflict resolver may be employed.

The Ceph "Ceph" file system is fully decentralized and without a single point of failure. The data is seamlessly replicated, which makes it fault-tolerant. In case of a disk failure the replicas are used to distribute the data to other disks until the target redundancy is regained. Google Chubby "Chubby" is a distributed lock service, which provides an interface similar to that of a file system. The files, which are small, are always read and written as a whole. It is used at Google mainly to deal with the problem of electing a leader from a set of equivalent machines and as a highly available location for small meta data. Google File System and Bigtable are notable examples of systems which make use of Chubby. In its implementation Chubby uses a solution similar to a replicated version of Berkeley DB "BerkDB". The database log is distributed among machines with the help of a distributed consensus protocol.

The data and metadata consistency in file systems is achieved in various ways and external tools are a common solution. For instance, Lustre "Lustre", a massively parallel file system aimed at large clusters, uses a distributed lock manager to protect the integrity of file data and metadata.

Transactional NTFS (abbreviated TxF) "TxF" is a component in Windows systems which introduces transactional operations on an NTFS file system. It uses a component named Kernel Transaction Manager "KTM"—a general-purpose transaction engine operating in the Windows kernel mode.

An example of a file system implementing an idea similar to HydraTFS' snapshots is Elephant "Elephant". Elephant automatically retains and maintains old versions of selected, valuable files. On each open operation in a write mode, a new version of the opened file is created. A corresponding close operation, in turn, finalizes the version. Unlike HydraTFS, Elephant provides access to old file versions; in fact this is one of its core functionalities. The old file versions may be deleted in accordance with various policies, either immediately, or in the future, when they become outdated. In particular, all file versions may be stored, providing a full modification history of the file.

The file system background cleanup is common in file systems dedicated for flash drives. For instance, in JFFS2 "JFFS2" it occurs on a block level. A garbage collector is introduced in order to aggregate I/O operations on particular blocks and thus reduce number of such operations. This is essential to wear leveling of flash memory.

Apart from HFS, there exist other file systems designed for CAS block stores. Centera "Centera", a CAS aimed at enterprise market provides a file system interface. However, the file system's metadata is stored locally and its periodic backups are made to the CAS. In Venti "Venti" blocks are never deleted. Therefore, snapshots of a file system are made at a low frequency so as not to exhaust the storage.

(9.3. Conclusion)

None of the enumerated file systems could be used instead of HydraTFS. This is because the requested file system had to run on top of HYDRAstor, as storing of content addresses was required. It is questionable if any of existing file systems could have been successfully ported to HYDRAstor. However, even if it was possible, such a process would probably require far more work than designing and implementing a new file system, fulfilling the requirements.

<Chapter 10>

(Conclusions)

HydraTFS, presented in this thesis, has been designed as a decentralized, transactional and scalable file system working on a CAS system which does not require any additional network communication between the client nodes. The experimental results show that HydraTFS meets the design goals and works with a reasonable performance. Nevertheless, it can be significantly optimized in many aspects.

The considerations and ideas included in the thesis can be used as a starting point for further optimizations of HydraTFS. Moreover, they can be helpful during development of a file system having similar features working on top of a content-addressable storage other than HYDRAstor. HydraTFS is currently being integrated in the commercial HYDRAstor product.

<Supplementary Notes>

The whole or part of the exemplary embodiments disclosed above can be described as the following supplementary notes. Below, the outline of configurations of a storage system (refer to FIG. 31), a program and an information processing method according to the present invention will be described. However, the present invention is not limited to the following configurations.

(Supplementary Note 1)

A storage system 100, comprising:

a data writing means 111 for storing actual data configuring storage data to be written into a storage device 120 and, every time a content of the storage data is updated, newly storing actual data configuring the updated storage data into the storage device 120; and a data specifying means 112 for specifying latest storage data among same storage data stored in the storage device 120, wherein:

the data writing means 111 is configured to store actual data configuring the storage data into the storage device 120 in association with update information whose value increases by 1 every time the storage data is updated; and the data specifying means 112 is configured to check whether the update information whose value is $2^i$ (i represents an integer equal to or more than 0) exists in the storage device 120 in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data.

(Supplementary Note 2)

The storage system according to Supplementary Note 1, wherein the data specifying means is configured to:

set the largest value of $2^i$ that the corresponding update information exists in the storage device as first update information, and also set the value of $2^{i+1}$ as second update information;

execute an update information search process of checking whether the update information corresponding to an intermediate value between the first update information and the second update information exists in the storage device;

execute an intermediate value replacement process of setting the intermediate value as the first update information when the update information corresponding to the intermediate value exists in the storage device, whereas setting the intermediate value as the second update information when the update information corresponding to the intermediate value does not exist in the storage device; and specify the largest value of the update information existing in the storage device by repeatedly executing the update information search process and the intermediate replacement process.

(Supplementary Note 3)

The storage system according to Supplementary Note 2, comprising a data deleting means for deleting the actual data configuring the storage data that is not the latest and the update information associated with the actual data from the storage device, wherein:

the data specifying means is configured to specify the update information that has been searched at the time of specification of the largest value of the update information and that is corresponding to the value of $2^i$ existing in the storage device, as non-deletion target update information; and the data deleting means is configured to exclude the update information specified as the non-deletion target update information from information to be deleted from the storage device.

(Supplementary Note 4)

The storage system according to Supplementary Note 3, wherein the data specifying means is configured to specify the update information that has been searched at the time of specification of the largest value of the update information and that is corresponding to the value of $2^i$ existing in the storage device, the update information corresponding to the intermediate value, and the update information of the specified largest value, as the non-deletion target update information.

(Supplementary Note 5)

The storage system according to Supplementary Note 3 or 4, wherein the data specifying means is configured to, when storage data configured by the actual data associated with the update information of a smaller value than the largest value of the update information existing in the storage device is being accessed, include access target update information that is the update information associated with the actual data configuring the storage data being accessed, and the update information that is searched when the data specifying means specifies the access target update information as the largest value of the update information and that is specified as the non-deletion target information, in the non-deletion target update information.

(Supplementary Note 6)

The storage system according to Supplementary Note 5, wherein the data specifying means is configured to include the update information whose value is smaller than the largest value of the update information existing in the storage device and larger than a value of the access target update information, in the non-deletion target information.

(Supplementary Note 7)

The storage system according to any of Supplementary Notes 3 to 6, wherein the data deleting means is configured to delete the actual data associated with the update information specified as the non-deletion target update information from the storage device.

(Supplementary Note 8)

The storage system according to any of Supplementary Notes 1 to 7, wherein the data writing means is configured to store the update information in association with data specification information specifying the same storage data.

(Supplementary Note 9)

The storage system according to Supplementary Note 8, wherein the data writing means is configured to:

divide the storage data into a plurality of actual data and store into the storage device, and also store respective reference data referring to the actual data and the data specification information accessible to the plurality of reference data referring to the plurality of actual data configuring the storage data;

at the time of update of the storage data, when storing other actual data having a same content as actual data already stored in the storage device, store the other actual data so as to refer to the actual data already stored in the storage device as the other actual data by using the reference data referring to the actual data already stored in the storage device, whereas when storing actual data that is not stored in the storage device, newly store the actual data into the storage device; and every time the storage data is updated, newly generate the data specification information accessible to the plurality of reference data referring to the plurality of actual data configuring the updated storage data.

(Supplementary Note 10)

A program comprising instructions for causing an information processing device to realize:

a data writing means for storing actual data configuring storage data to be written into a storage device and, every time a content of the storage data is updated, newly storing actual data configuring the updated storage data into the storage device; and a data specifying means for specifying latest storage data among same storage data stored in the storage device, wherein:

the data writing means is configured to store actual data configuring the storage data into the storage device in association with update information whose value increases by 1 every time the storage data is updated; and the data specifying means is configured to check whether the update information whose value is $2^i$ (i represents an integer equal to or more than 0) exists in the storage device in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data.

(Supplementary Note 11)

The program according to Supplementary Note 10, wherein the data specifying means is configured to:

set the largest value of $2^i$ that the corresponding update information exists in the storage device as first update information, and also set the value of $2^{i+1}$ as second update information;

execute an update information search process of checking whether the update information corresponding to an intermediate value between the first update information and the second update information exists in the storage device;

execute an intermediate value replacement process of setting the intermediate value as the first update information when the update information corresponding to the intermediate value exists in the storage device, whereas setting the intermediate value as the second update information when the update information corresponding to the intermediate value does not exist in the storage device; and specify the largest value of the update information existing in the storage device by repeatedly executing the update information search process and the intermediate replacement process.

(Supplementary Note 12)

The program according to Supplementary Note 11, further comprising instructions for causing the information processing device to realize a data deleting means for deleting the actual data configuring the storage data that is not the latest and the update information associated with the actual data from the storage device, wherein:

the data specifying means is configured to specify the update information that has been searched at the time of specification of the largest value of the update information and that is corresponding to the value of $2^i$ existing in the storage device, as non-deletion target update information; and the data deleting means is configured to exclude the update information specified as the non-deletion target update information from information to be deleted from the storage device.

(Supplementary Note 13)

The program according to Supplementary Note 12, wherein the data specifying means is configured to specify the update information that has been searched at the time of specification of the largest value of the update information and that is corresponding to the value of $2^i$ existing in the storage device, the update information corresponding to the intermediate value, and the update information of the specified largest value, as the non-deletion target update information.

(Supplementary Note 14)

An information processing method, comprising:

storing actual data configuring storage data to be written into a storage device and, every time a content of the storage data is updated, newly storing actual data configuring the updated storage data and writing the data into the storage device, and at this moment, storing actual data configuring the storage data into the storage device in association with update information whose value increases by 1 every time the storage data is updated; and when specifying latest storage data among same storage data stored in the storage device, checking whether the update information whose value is $2^i$ (i represents an integer equal to or more than 0) exists in the storage device in an increasing order of a value of i, specifying a largest value of the existing update information from among values between a largest value of $2^i$ that the corresponding update information exists and a value of $2^{i+1}$, and specifying storage data configured by actual data associated with the largest value of the update information, as the latest storage data.

(Supplementary Note 15)

The information processing method according to Supplementary Note 14, comprising, at the time of specification of the latest data:

setting the largest value of $2^i$ that the corresponding update information exists in the storage device as first update information, and also setting the value of $2^{i+1}$ as second update information;

executing an update information search process of checking whether the update information corresponding to an intermediate value between the first update information and the second update information exists in the storage device;

executing an intermediate value replacement process of setting the intermediate value as the first update information when the update information corresponding to the intermediate value exists in the storage device, whereas setting the intermediate value as the second update information when the update information corresponding to the intermediate value does not exist in the storage device; and specifying the largest value of the update information existing in the storage device by repeatedly executing the update information search process and the intermediate replacement process.

(Supplementary Note 16)

The information processing method according to Supplementary Note 15, comprising:

when specifying the latest data, specifying the update information that has been searched at the time of specification of the largest value of the update information and that is corresponding to the value of $2^i$ existing in the storage device, as non-deletion target update information; and when deleting the actual data configuring the storage data that is not the latest and the update information associated with the actual data from the storage device, excluding the update information specified as the non-deletion target update information from information to be deleted from the storage device.

(Supplementary Note 17)

The information processing method according to Supplementary Note 16, comprising, when specifying the latest data, specifying the update information that has been searched at the time of specification of the largest value of the update information and that is corresponding to the value of $2^i$ existing in the storage device, the update information corresponding to the intermediate value, and the update information of the specified largest value, as the non-deletion target update information.

The abovementioned program is stored in a storage device, or recorded on a computer-readable recording medium. For example, the recording medium is a portable medium such as a flexible disk, an optical disk, a magneto-optical disk and a semiconductor memory.

Although the present invention has been described above with reference to the exemplary embodiments and supplementary notes, the present invention is not limited to the abovementioned exemplary embodiments. The configuration and details of the present invention can be altered in various manners that can be understood by those skilled in the art within the scope of the present invention.

DESCRIPTION OF REFERENCE NUMERALS 1 storage system
2 accelerator node
3 storage node 4 backup system
5 backup target device
11 data writing part
12 data retrieving part
13 data specifying part
14 data deleting part
20 storage device
30 application
100 storage system
111 data writing means
112 data specifying means
120 storage device

The invention claimed is:

1. A storage system, comprising:
a processor;
a data writing unit implemented on the processor for storing actual data configuring storage data to be written into a storage device and, every time a content of the storage data is updated, newly storing actual data configuring the updated storage data into the storage device; and
a data specifying unit implemented on the processor for specifying latest storage data among same storage data stored in the storage device,
wherein:
the data writing unit is configured to store actual data configuring the storage data into the storage device in association with update information whose value increases by 1 every time the storage data is updated;
the data specifying unit is configured to check whether the update information whose value is $2^i$ (i represents an integer equal to or more than 0) exists in the storage device in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data; and
the data specifying unit is configured to:
set the largest value of $2^i$ that the corresponding update information exists in the storage device as first update information, and also set the value of $2^{i+1}$ as second update information;
execute an update information search process of checking whether the update information corresponding to an intermediate value between the first update information and the second update information exists in the storage device;
execute an intermediate value replacement process of setting the intermediate value as the first update information when the update information corresponding to the intermediate value exists in the storage device, whereas setting the intermediate value as the second update information when the update information corresponding to the intermediate value does not exist in the storage device; and
specify the largest value of the update information existing in the storage device by repeatedly executing the update information search process and the intermediate replacement process, and the storage system further comprising:
a data deleting unit implemented on the processor for deleting the actual data configuring the storage data that is not the latest and the update information associated with the actual data from the storage device, wherein:
the data specifying unit is configured to specify the update information that has been searched at the time of specification of the largest value of the update information and that is corresponding to the value of $2^i$ existing in the storage device, as non-deletion target update information;
the data deleting unit is configured to exclude the update information specified as the non-deletion target update information from information to be deleted from the storage device; and
the data specifying unit is configured to, when storage data, configured by the actual data associated with a smaller value of the update information than the largest value of the update information existing in the storage device, is being accessed:
include access target update information in the non-deletion target update information, wherein the access target information is:
the update information associated with the actual data configuring the storage data being accessed, and
the update information that is searched when the data specifying unit specifies the access target update information as the largest value of the update information and is specified as the non-deletion target information.

2. The storage system according to claim 1, wherein the data specifying unit is configured to specify the update information that has been searched at the time of specification of the largest value of the update information and that is corresponding to the value of $2^i$ existing in the storage device, the update information corresponding to the intermediate value, and the update information of the specified largest value, as the non-deletion target update information.

3. The storage system according to claim 1, wherein the data specifying unit is configured to include the update information whose value is smaller than the largest value of the update information existing in the storage device and larger than a value of the access target update information, in the non-deletion target information.

4. The storage system according to claim 1, wherein the data writing unit is configured to store the update information in association with data specification information specifying the same storage data.

5. The storage system according to claim 4, wherein the data writing unit is configured to:
divide the storage data into a plurality of actual data and store into the storage device, and also store respective reference data referring to the actual data and the data specification information accessible to the plurality of reference data referring to the plurality of actual data configuring the storage data;
at the time of update of the storage data, when storing other actual data having a same content as actual data already stored in the storage device, store the other actual data so as to refer to the actual data already stored in the storage device as the other actual data by using the reference data referring to the actual data already stored in the storage device, whereas when storing actual data that is not stored in the storage device, newly store the actual data into the storage device; and every time the storage data is updated, newly generate the data specification information accessible to the plurality of reference data referring to the plurality of actual data configuring the updated storage data.

6. A computer program stored in a non-transitory computer-readable medium comprising instructions for causing an information processing device comprising a processor to realize:

a data writing unit implemented on the processor for storing actual data configuring storage data to be written into a storage device and, every time a content of the storage data is updated, newly storing actual data configuring the updated storage data into the storage device; and a data specifying unit implemented on the processor for specifying latest storage data among same storage data stored in the storage device, wherein:

the data writing unit is configured to store actual data configuring the storage data into the storage device in association with update information whose value increases by 1 every time the storage data is updated;

the data specifying unit is configured to check whether the update information whose value is $2^i$ (i represents an integer equal to or more than 0) exists in the storage device in an increasing order of a value of i, specify a largest value of the existing update information from among values between a largest value of $2^i$ that the corresponding update information exists and a value of $2^{i+1}$, and specify storage data configured by actual data associated with the largest value of the update information, as the latest storage data; and the data specifying unit is configured to:

set the largest value of $2^i$ that the corresponding update information exists in the storage device as first update information, and also set the value of $2^{i+1}$ as second update information;

execute an update information search process of checking whether the update information corresponding to an intermediate value between the first update information and the second update information exists in the storage device;

execute an intermediate value replacement process of setting the intermediate value as the first update information when the update information corresponding to the intermediate value exists in the storage device, whereas setting the intermediate value as the second update information when the update information corresponding to the intermediate value does not exist in the storage device; and specify the largest value of the update information existing in the storage device by repeatedly executing the update information search process and the intermediate replacement process, and the computer program stored in the non-transitory computer-readable medium further comprising instructions for causing the information processing device to realize a data deleting unit implemented on the processor for deleting the actual data configuring the storage data that is not the latest and the update information associated with the actual data from the storage device, wherein:

the data specifying unit is configured to specify the update information that has been searched at the time of specification of the largest value of the update information and that is corresponding to the value of $2^i$ existing in the storage device, as non-deletion target update information;

the data deleting unit is configured to exclude the update information specified as the non-deletion target update information from information to be deleted from the storage device; and the data specifying unit is configured to, when storage data, configured by the actual data associated with a smaller value of the update information than the largest value of the update information existing in the storage device, is being accessed:

include access target update information in the non-deletion target update information, wherein the access target information is:

the update information associated with the actual data configuring the storage data being accessed, and the update information that is searched when the data specifying unit specifies the access target update information as the largest value of the update information and that is specified as the non-deletion target information.

7. The computer program according to claim 6, wherein the data specifying unit is configured to specify the update information that has been searched at the time of specification of the largest value of the update information and that is corresponding to the value of $2^i$ existing in the storage device, the update information corresponding to the intermediate value, and the update information of the specified largest value, as the non-deletion target update information.

8. An information processing method, comprising:

storing actual data configuring storage data to be written into a storage device and, every time a content of the storage data is updated, newly storing actual data configuring the updated storage data and writing the data into the storage device, and at this moment, storing actual data configuring the storage data into the storage device in association with update information whose value increases by 1 every time the storage data is updated;

when specifying latest storage data among same storage data stored in the storage device, checking whether the update information whose value is $2^i$ (i represents an integer equal to or more than 0) exists in the storage device in an increasing order of a value of i, specifying a largest value of the existing update information from among values between a largest value of $2^i$ that the corresponding update information exists and a value of $2^{i+1}$, and specifying storage data configured by actual data associated with the largest value of the update information, as the latest storage data;

at the time of specification of the latest data:

setting the largest value of $2^i$ that the corresponding update information exists in the storage device as first update information, and also setting the value of $2^{i+1}$ as second update information;

executing an update information search process of checking whether the update information corresponding to an intermediate value between the first update information and the second update information exists in the storage device;

executing an intermediate value replacement process of setting the intermediate value as the first update information when the update information corresponding to the intermediate value exists in the storage device, whereas setting the intermediate value as the second update information when the update information corresponding to the intermediate value does not exist in the storage device; and specifying the largest value of the update information existing in the storage device by repeatedly executing the update information search process and the intermediate replacement process;

when specifying the latest data, specifying the update information that has been searched at the time of specification of the largest value of the update information and that is corresponding to the value of $2^i$ existing in the storage device, as non-deletion target update information;

when deleting the actual data configuring the storage data that is not the latest and the update information associated with the actual data from the storage device, excluding the update information specified as the non-deletion target update information from information to be deleted from the storage device; and when accessing storage data configured by the actual data associated with the update information of a smaller value than the largest value of the update information existing in the storage device, including access target update information in the non-deletion target update information, wherein the access target update information is:

the update information associated with the actual data configuring the storage data being accessed, and the update information that is searched when specifying the access target update information as the largest value of the update information and that is specified as the non-deletion target information.

9. The information processing method according to claim 8, comprising, when specifying the latest data, specifying the update information that has been searched at the time of specification of the largest value of the update information and that is corresponding to the value of $2^i$ existing in the storage device, the update information corresponding to the intermediate value, and the update information of the specified largest value, as the non-deletion target update information.

* * * * *

UNITED STATES PATENT AND TRADEMARK OFFICE
CERTIFICATE OF CORRECTION

PATENT NO. : 9,665,304 B2  
APPLICATION NO. : 13/818226  
DATED : May 30, 2017  
INVENTOR(S) : Konrad Iwanicki and Kamil Nowosad Page 1 of 1

It is certified that error appears in the above-identified patent and that said Letters Patent is hereby corrected as shown below:

In the Specification

Column 24, Line 35:

"$S_{g1} = S_{2^N + s^i}$" has been replaced with -- $S_{g1} = S_{2^N + 2^i}$ --

Signed and Sealed this  
Twentieth Day of February, 2018

Andrei Iancu  
*Director of the United States Patent and Trademark Office*